United States Patent
Uchida et al.

(10) Patent No.: US 6,795,576 B2
(45) Date of Patent: *Sep. 21, 2004

(54) IMAGE PROCESSING METHOD AND APPARATUS

(75) Inventors: Yoshiki Uchida, Kawasaki (JP); Shinobu Arimoto, Yokohama (JP); Yushi Matsukubo, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 16 days.

(21) Appl. No.: 08/508,541

(22) Filed: Jul. 28, 1995

(65) Prior Publication Data

US 2003/0118231 A1 Jun. 26, 2003

(30) Foreign Application Priority Data

Jul. 29, 1994 (JP) .............................................. 6-178501
Jan. 30, 1995 (JP) .............................................. 7-013114

(51) Int. Cl.$^7$ ................................................ G06K 9/00
(52) U.S. Cl. ........................ 382/164; 382/173; 358/501
(58) Field of Search ................................ 382/171, 173, 382/185, 191, 197; 358/447, 448, 453, 462, 515, 529, 527, 300, 530, 466

(56) References Cited

U.S. PATENT DOCUMENTS

| 4,813,078 A | * | 3/1989 | Fujiwara et al. ............ 382/185 |
| 4,841,375 A | * | 6/1989 | Nakajima et al. | |
| 4,953,013 A |   | 8/1990 | Tsuji et al. .................... 358/75 |
| 4,958,219 A | * | 9/1990 | Kadowaki | |
| 5,239,383 A |   | 8/1993 | Ikeda et al. .................. 358/300 |
| 5,251,023 A | * | 10/1993 | Arimoto et al. | |
| 5,420,938 A | * | 5/1995 | Funada et al. | |
| 5,493,411 A | * | 2/1996 | Haneda et al. .............. 358/298 |
| 5,844,688 A | * | 12/1998 | Shimizu et al. | |

FOREIGN PATENT DOCUMENTS

| EP | 0106354 A2 | * | 4/1984 |
| EP | 0334472 B1 | * | 9/1989 |
| EP | 0348145 A1 | * | 12/1989 |
| EP | 0454457 |   | 10/1991 |
| EP | 0488797 |   | 6/1992 |
| EP | 0662765 |   | 7/1995 |
| JP | 7203198 |   | 8/1995 |

OTHER PUBLICATIONS

Microsoft press computer Dictionary, second edition, 1993.*

* cited by examiner

*Primary Examiner*—Samir Ahmed
(74) *Attorney, Agent, or Firm*—Fitzpatrick, Cella, Harper & Scinto

(57) ABSTRACT

This invention has as its object to perform smooth black color processing of a character, line, and the like and to prevent deterioration of image quality.

A character-thickness judgment unit in a black character judgment unit judges the thickness of a character/line image portion in an image on the basis of R, G, and B signals representing an image supplied from a host computer. An edge detection unit obtains edge information of a character/line image, and a saturation judgment unit obtains saturation information thereof. When image processing is performed by combining the edge information and the saturation information, the thickness judgment signal is corrected, so that the thickness of the character or line changes continuously. A UCR unit is arranged to perform black color processing in accordance with the substrate.

18 Claims, 60 Drawing Sheets

MAIN-SCAN DIRECTION

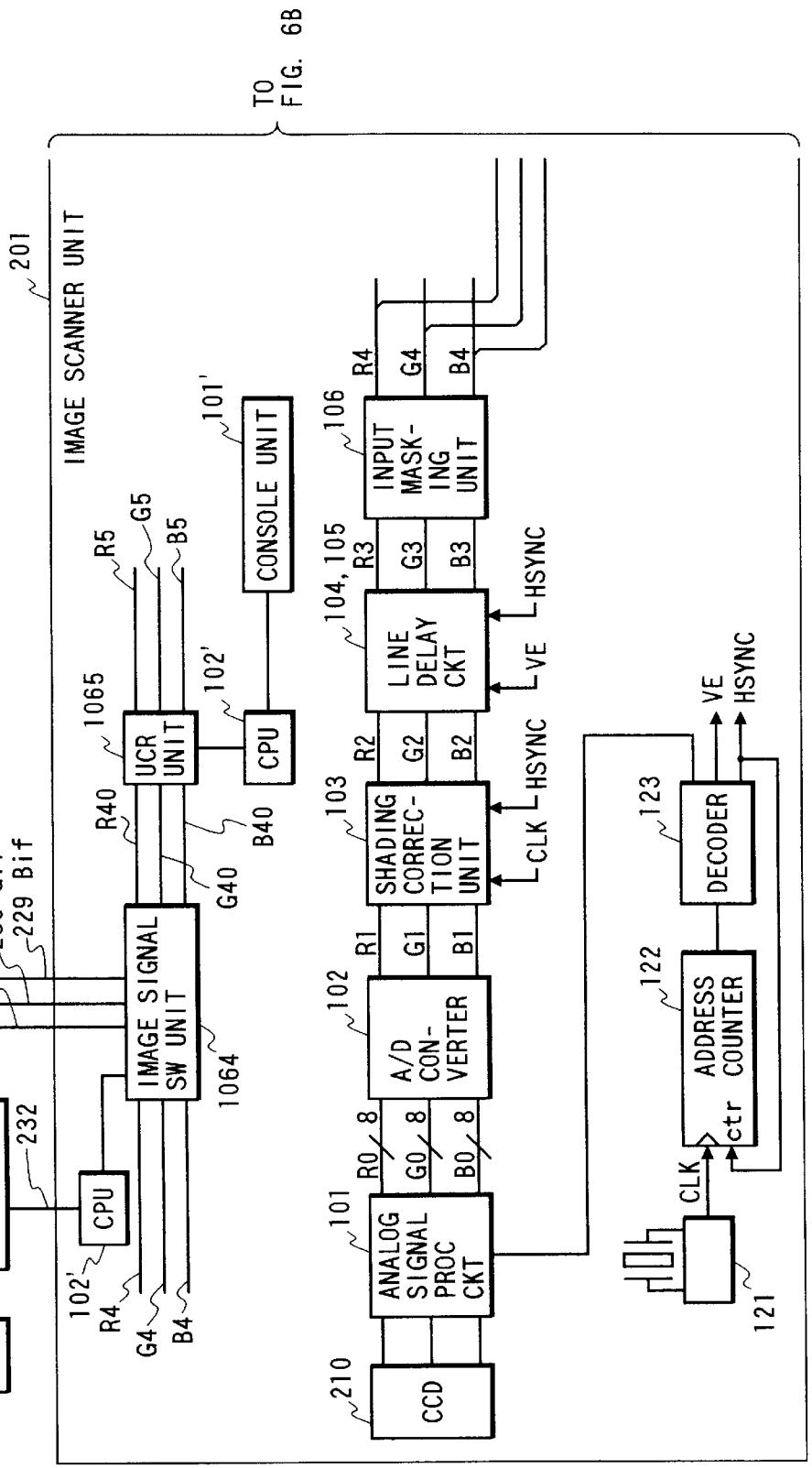

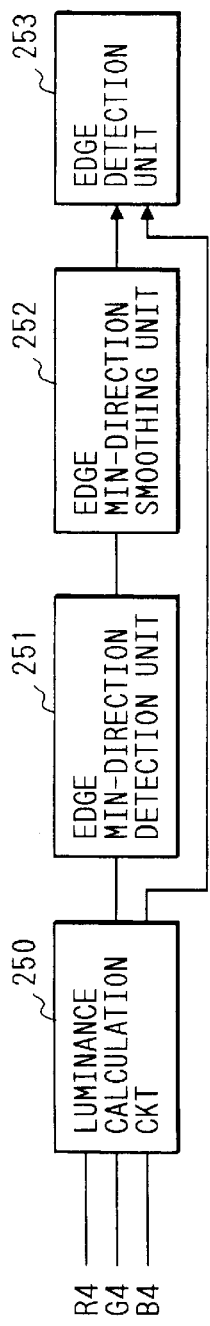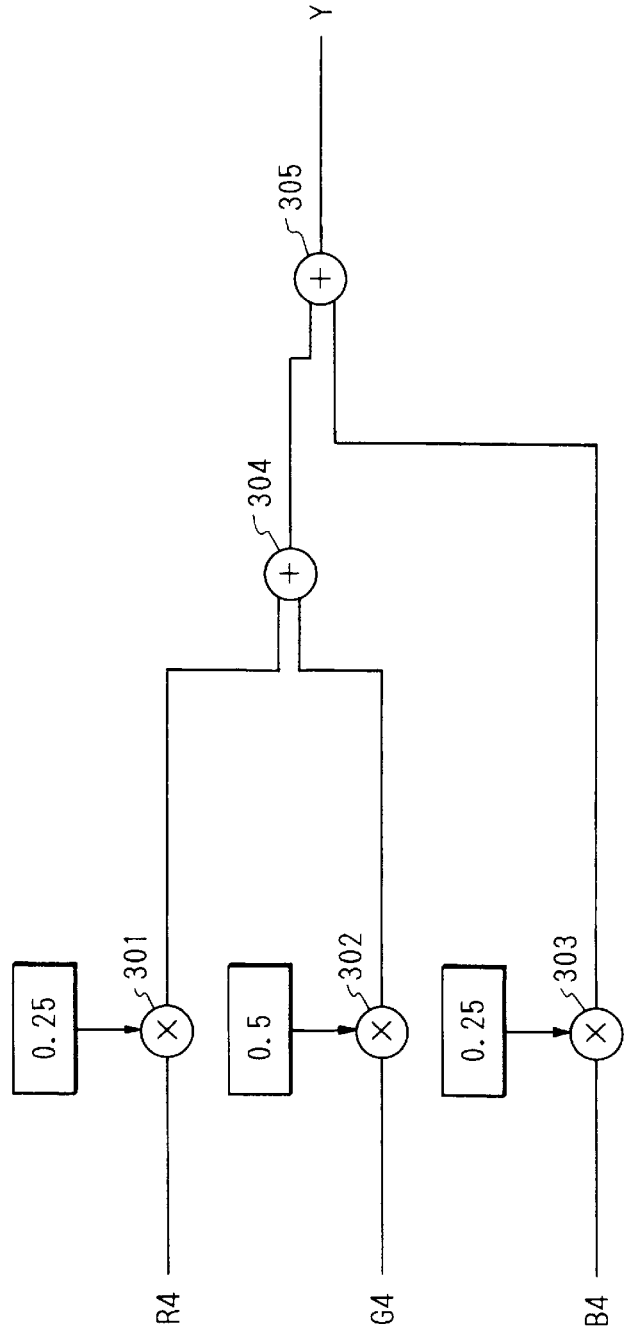

| X | X | X |
|---|---|---|
| H | X | L |
| X | X | X |

(0)
IN CASE OF SETTING
BIT 0 OF DIRAMI TO
HIGH

FIG. 17A

| X | X | X |
|---|---|---|
| L | X | H |
| X | X | X |

(1)
IN CASE OF SETTING
BIT 1 OF DIRAMI TO
HIGH

FIG. 17B

| X | H | X |
|---|---|---|
| X | X | X |
| X | L | X |

(2)
IN CASE OF SETTING
BIT 2 OF DIRAMI TO
HIGH

FIG. 17C

| X | L | X |
|---|---|---|
| X | X | X |
| X | H | X |

(3)
IN CASE OF SETTING
BIT 3 OF DIRAMI TO
HIGH

FIG. 17D

< WHERE X IS UNSTABLE >

FIG. 18

| A11 | A21 | A31 | A41 | A51 |
|-----|-----|-----|-----|-----|
| A12 | A22 | A32 | A42 | A52 |
| A13 | A23 | A33 | A43 | A53 |
| A14 | A24 | A34 | A44 | A54 |
| A15 | A25 | A35 | A45 | A55 |

DIRAMI VALUES OF TARGET PIXEL (AS A CENTER)
AND ITS PERIPHERAL PIXELES

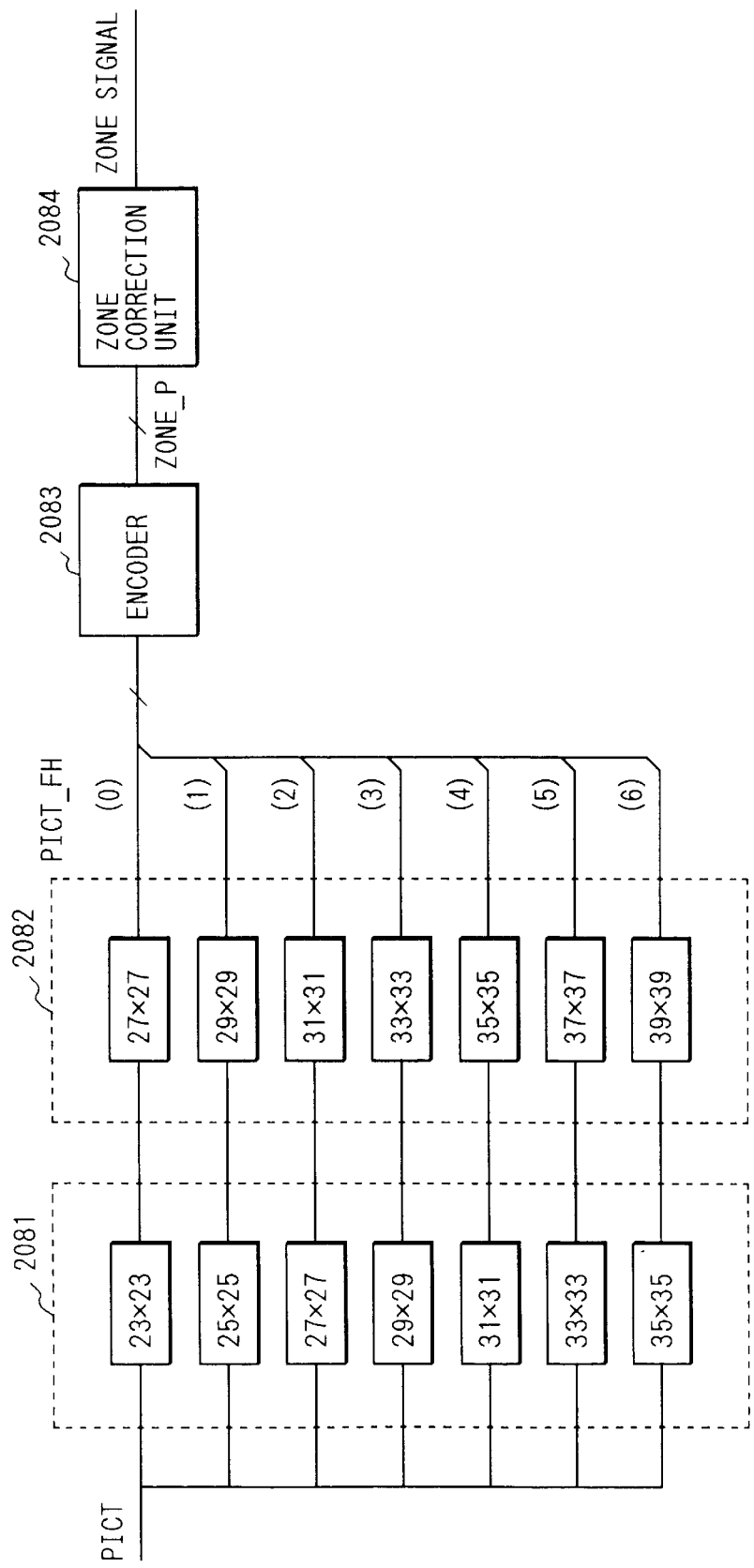

| 0 | 1 | 2 | 3 | 4 | 5 | 6 | CODE |
|---|---|---|---|---|---|---|------|
| H | H | H | H | H | H | H | 7 |
| H | H | H | H | H | H | L | 6 |
| H | H | H | H | H | L | L | 5 |
| H | H | H | H | L | L | L | 4 |
| H | H | H | L | L | L | L | 3 |
| H | H | L | L | L | L | L | 2 |
| H | L | L | L | L | L | L | 1 |
| L | L | L | L | L | L | L | 0 |

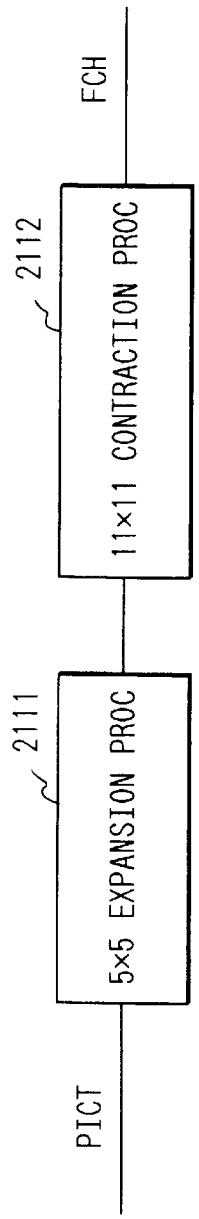
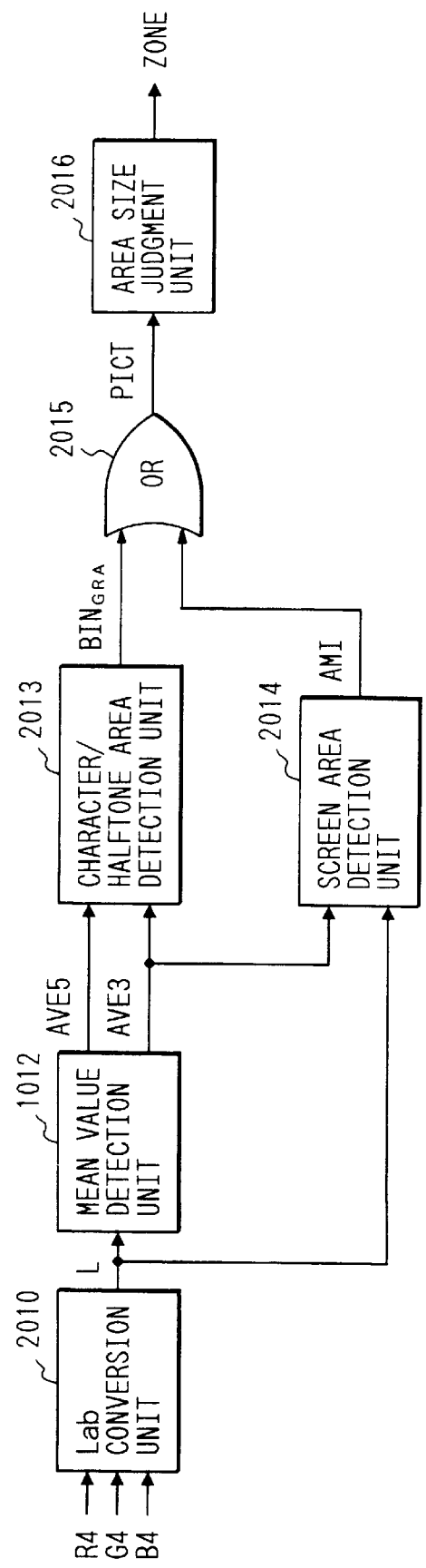

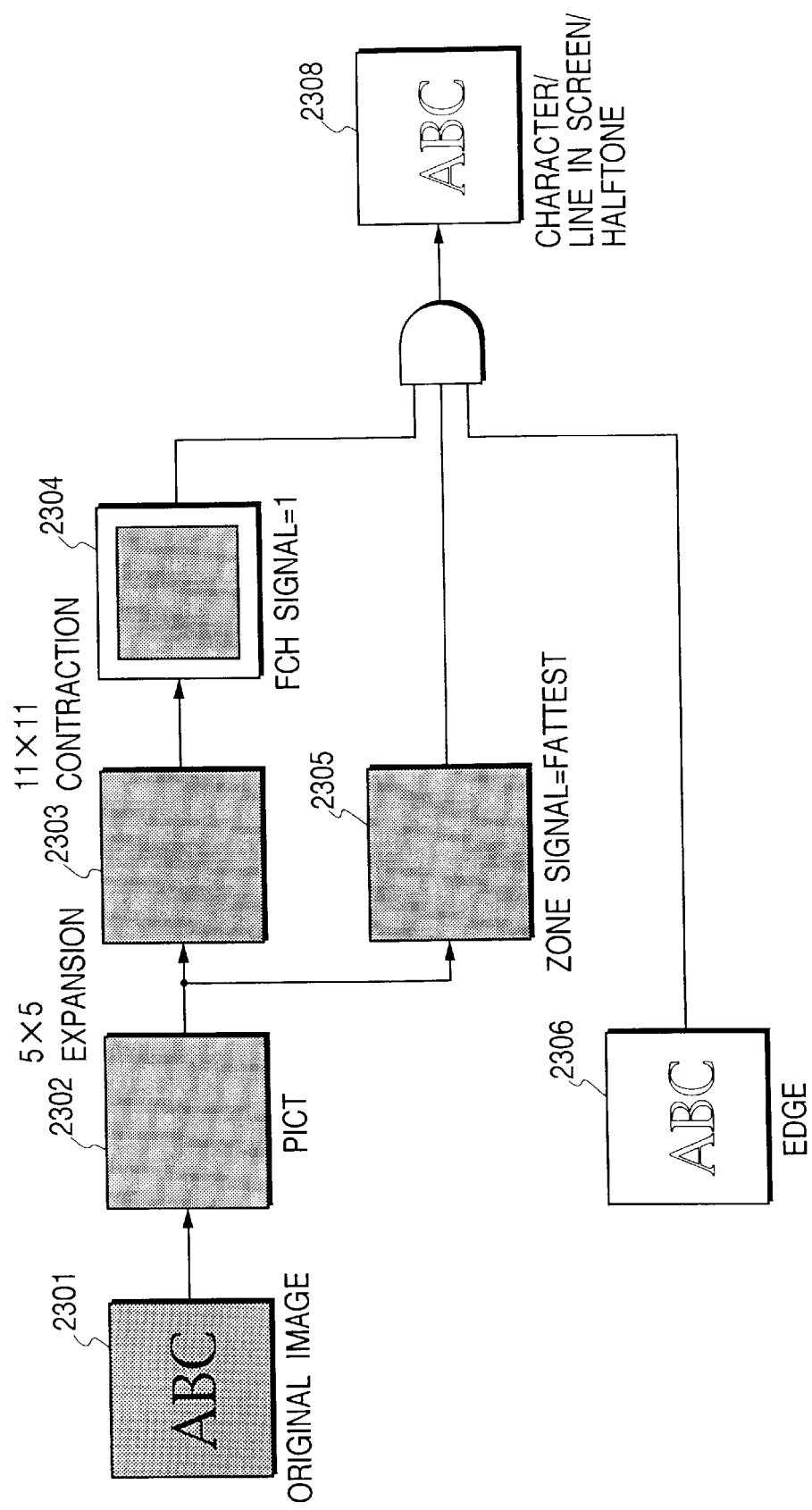

FIG. 26A

STANDARD

| col | INPUT | | | OUTPUT | | |
|---|---|---|---|---|---|---|
| | zone | edge | FCH | ucr | filter | sen |
| 1 (BLACK) | 0 | 0<br>1<br>2<br>3<br>4 | DON'T CARE<br>DON'T CARE<br>DON'T CARE<br>DON'T CARE<br>DON'T CARE | 7<br>0<br>0<br>0<br>0 | 0<br>1<br>1<br>1<br>1 | 0<br>1<br>1<br>1<br>1 |
| | 1 | 0<br>1<br>2<br>3<br>4 | DON'T CARE<br>DON'T CARE<br>DON'T CARE<br>DON'T CARE<br>DON'T CARE | 7<br>1<br>1<br>1<br>7 | 0<br>1<br>1<br>1<br>0 | 0<br>1<br>1<br>1<br>0 |
| | 2 | 0<br>1<br>2<br>3<br>4 | DON'T CARE<br>DON'T CARE<br>DON'T CARE<br>DON'T CARE<br>DON'T CARE | 7<br>2<br>2<br>2<br>7 | 0<br>1<br>1<br>0<br>0 | 0<br>1<br>1<br>0<br>0 |
| | 3 | 0<br>1<br>2<br>3<br>4 | DON'T CARE<br>DON'T CARE<br>DON'T CARE<br>DON'T CARE<br>DON'T CARE | 7<br>3<br>3<br>7<br>7 | 0<br>1<br>1<br>0<br>0 | 0<br>0<br>0<br>0<br>0 |
| | 4 | 0<br>1<br>2<br>3<br>4 | DON'T CARE<br>DON'T CARE<br>DON'T CARE<br>DON'T CARE<br>DON'T CARE | 7<br>4<br>4<br>7<br>7 | 0<br>2<br>2<br>0<br>0 | 0<br>0<br>0<br>0<br>0 |
| | 5 | 0<br>1<br>2<br>3<br>4 | DON'T CARE<br>DON'T CARE<br>DON'T CARE<br>DON'T CARE<br>DON'T CARE | 7<br>5<br>5<br>7<br>7 | 0<br>2<br>2<br>0<br>0 | 0<br>0<br>0<br>0<br>0 |
| | 6 | 0<br>1<br>2<br>3<br>4 | DON'T CARE<br>DON'T CARE<br>DON'T CARE<br>DON'T CARE<br>DON'T CARE | 7<br>6<br>7<br>7<br>7 | 0<br>2<br>0<br>0<br>0 | 0<br>0<br>0<br>0<br>0 |
| | 7 | 5<br>6 | 1<br>1 | 7<br>7 | 3<br>3 | 0<br>0 |
| | | 5<br>6 | 0<br>0 | 7<br>7 | 3<br>2 | 0<br>0 |

FIG. 26B

| INPUT | | | | OUTPUT | | |
|---|---|---|---|---|---|---|
| col | zone | edge | FCH | ucr | filter | sen |
| 0 (OTHER THAN BLACK) | 0 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>2 | 0<br>1<br>1<br>1<br>1 |
| | 1 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>0 | 0<br>1<br>1<br>1<br>0 |
| | 2 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>0<br>0 | 0<br>1<br>1<br>0<br>0 |
| | 3 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>0<br>0 | 0<br>0<br>0<br>0<br>0 |
| | 4 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>0<br>0 | 0<br>0<br>0<br>0<br>0 |
| | 5 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>0<br>0 | 0<br>0<br>0<br>0<br>0 |
| | 6 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>0<br>0<br>0 | 0<br>0<br>0<br>0<br>0 |
| | 7 | 5<br>6 | 1<br>1 | 7<br>7 | 3<br>3 | 0<br>0 |
| | | 5<br>6 | 0<br>0 | 7<br>7 | 3<br>2 | 0<br>0 |

FIG. 28

$$K_1 = -255 \times \log\left(\frac{\min CMY}{255}\right)\left(\frac{1}{1.52}\right) \quad \cdots (2101)$$

$$\begin{pmatrix} C2 \\ M2 \\ Y2 \\ K2 \end{pmatrix} = \begin{pmatrix} m11 \times k11 & m21 \times k21 & m31 \times k31 & m41 \times k41 & m51 \times k51 & m61 \times k61 & m71 \times k71 & m81 \times k81 \\ m12 \times k12 & m22 \times k22 & m32 \times k32 & m42 \times k42 & m52 \times k52 & m62 \times k62 & m72 \times k72 & m82 \times k82 \\ m13 \times k13 & m23 \times k23 & m33 \times k33 & m43 \times k43 & m53 \times k53 & m63 \times k63 & m73 \times k73 & m83 \times k83 \\ m14 \times k14 & m24 \times k24 & m34 \times k34 & m44 \times k44 & m54 \times k54 & m64 \times k64 & m74 \times k74 & m84 \times k84 \end{pmatrix} \begin{pmatrix} C1 \\ M1 \\ Y1 \\ K1 \\ C1M1 \\ M1Y1 \\ Y1C1 \\ K1K1 \end{pmatrix} \quad \cdots (2102)$$

FIG. 30

| | CHARACTER PRIORITY -4 | -3 | -2 | -1 | STANDARD | +1 | +2 | +3 | +4 PHOTOGRAPH PRIORITY |
|---|---|---|---|---|---|---|---|---|---|
| EDGE IN SCREEN | -40 | -30 | -20 | -10 | 0x60 | +20 | +40 | MAX | MAX |
| EDGE IN WHITE SUBSTRATE | -20 | -18 | -10 | -8 | 0x20 | +10 | +20 | +30 | +30 |
| SATURATION JUDGMENT Gr_BK | +4 | +3 | +2 | +1 | 0x07 | 0 | -1 | -2 | -3 |
| SATURATION JUDGMENT Gr_COL | +4 | +3 | +2 | +1 | 0x1C | 0 | -6 | -B | -13 |
| SATURATION JUDGMENT Gr_W | +8 | +6 | +4 | +2 | 0x70 | 0 | 0 | 0 | -10 |
| LIM1 | -25 | -15 | -7 | -5 | 0xC5 | +3 | +5 | +B | +B |
| LIM2 | -25 | -15 | -7 | -5 | 0xC5 | +3 | +5 | +B | +B |
| th_count | +3 | +3 | +2 | +2 | 0x25 | -9 | -B | -D | -D |
| OFST1 | -4 | -4 | -2 | 0 | 0x14 | +C | 1C | 2C | MAX |
| SIZE OF THICKNESS JUDGMENT WINDOW | SET_1 | SET_2 | SET_3 | SET_4 | SET_5 | SET_6 | SET_7 | SET_8 | SET_9 |

WHERE
SET_1≧SET_2≧SET_3≧SET_4≧SET_5≧SET_6≧SET_7≧SET_8≧SET_9

"MAX" REPRESENTING SETTABLE MAX VALUE
(MAX VALUE CAPABLE OF BEING TAKEN BY REFERENCE INPUT SIGNAL)

FIG. 31A

CHARACTER PRIORITY+4

| col | zone | edge | INPUT FCH | ucr | OUTPUT filter | sen |
|---|---|---|---|---|---|---|
| 1 (BLACK) | 0 | 0 | DON'T CARE | 4 | 0 | 0 |
| | | 1 | DON'T CARE | 0 | 1 | 1 |
| | | 2 | DON'T CARE | 0 | 1 | 1 |
| | | 3 | DON'T CARE | 0 | 1 | 1 |
| | | 4 | DON'T CARE | 0 | 1 | 1 |
| | 1 | 0 | DON'T CARE | 5 | 0 | 0 |
| | | 1 | DON'T CARE | 1 | 1 | 1 |
| | | 2 | DON'T CARE | 1 | 1 | 1 |
| | | 3 | DON'T CARE | 1 | 1 | 1 |
| | | 4 | DON'T CARE | 1 | 1 | 1 |
| | 2 | 0 | DON'T CARE | 6 | 0 | 0 |
| | | 1 | DON'T CARE | 2 | 1 | 1 |
| | | 2 | DON'T CARE | 2 | 1 | 1 |
| | | 3 | DON'T CARE | 2 | 2 | 1 |
| | | 4 | DON'T CARE | 6 | 2 | 0 |
| | 3 | 0 | DON'T CARE | 7 | 0 | 0 |
| | | 1 | DON'T CARE | 3 | 1 | 0 |
| | | 2 | DON'T CARE | 3 | 1 | 0 |
| | | 3 | DON'T CARE | 7 | 2 | 0 |
| | | 4 | DON'T CARE | 7 | 0 | 0 |
| | 4 | 0 | DON'T CARE | 7 | 0 | 0 |
| | | 1 | DON'T CARE | 4 | 2 | 0 |
| | | 2 | DON'T CARE | 4 | 2 | 0 |
| | | 3 | DON'T CARE | 7 | 2 | 0 |
| | | 4 | DON'T CARE | 7 | 0 | 0 |
| | 5 | 0 | DON'T CARE | 7 | 0 | 0 |
| | | 1 | DON'T CARE | 5 | 2 | 0 |
| | | 2 | DON'T CARE | 5 | 2 | 0 |
| | | 3 | DON'T CARE | 7 | 0 | 0 |
| | | 4 | DON'T CARE | 7 | 0 | 0 |
| | 6 | 0 | DON'T CARE | 7 | 0 | 0 |
| | | 1 | DON'T CARE | 6 | 2 | 0 |
| | | 2 | DON'T CARE | 7 | 0 | 0 |
| | | 3 | DON'T CARE | 7 | 0 | 0 |
| | | 4 | DON'T CARE | 7 | 0 | 0 |
| | 7 | 5 | 1 | 7 | 3 | 0 |
| | | 6 | 1 | 3 | 3 | 0 |
| | | 5 | 0 | 7 | 3 | 0 |
| | | 6 | 0 | 3 | 2 | 0 |

FIG. 31B

| INPUT | | | | OUTPUT | | |
|---|---|---|---|---|---|---|
| col | zone | edge | FCH | ucr | filter | sen |
| 0 (OTHER THAN BLACK) | 0 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>2 | 0<br>1<br>1<br>1<br>1 |
| | 1 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>2 | 0<br>1<br>1<br>1<br>0 |
| | 2 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>2 | 0<br>1<br>1<br>0<br>0 |
| | 3 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>0 | 0<br>0<br>0<br>0<br>0 |
| | 4 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>0 | 0<br>0<br>0<br>0<br>0 |
| | 5 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>0<br>0 | 0<br>0<br>0<br>0<br>0 |
| | 6 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>0<br>0<br>0 | 0<br>0<br>0<br>0<br>0 |
| | 7 | 5<br>6 | 1<br>1 | 7<br>3 | 3<br>3 | 0<br>0 |
| | | 5<br>6 | 0<br>0 | 7<br>3 | 3<br>2 | 0<br>0 |

FIG. 32A

CHARACTER PRIORITY+3

| INPUT | | | | OUTPUT | | |
|---|---|---|---|---|---|---|
| col | zone | edge | FCH | ucr | filter | sen |
| 1 (BLACK) | 0 | 0<br>1<br>2<br>3<br>4 | DON'T CARE<br>DON'T CARE<br>DON'T CARE<br>DON'T CARE<br>DON'T CARE | 4<br>0<br>0<br>0<br>0 | 0<br>1<br>1<br>1<br>1 | 0<br>1<br>1<br>1<br>1 |
| | 1 | 0<br>1<br>2<br>3<br>4 | DON'T CARE<br>DON'T CARE<br>DON'T CARE<br>DON'T CARE<br>DON'T CARE | 5<br>1<br>1<br>1<br>1 | 0<br>1<br>1<br>1<br>1 | 0<br>1<br>1<br>1<br>1 |
| | 2 | 0<br>1<br>2<br>3<br>4 | DON'T CARE<br>DON'T CARE<br>DON'T CARE<br>DON'T CARE<br>DON'T CARE | 6<br>2<br>2<br>2<br>6 | 0<br>1<br>1<br>2<br>2 | 0<br>1<br>1<br>1<br>0 |
| | 3 | 0<br>1<br>2<br>3<br>4 | DON'T CARE<br>DON'T CARE<br>DON'T CARE<br>DON'T CARE<br>DON'T CARE | 7<br>3<br>3<br>7<br>7 | 0<br>1<br>1<br>2<br>0 | 0<br>0<br>0<br>0<br>0 |
| | 4 | 0<br>1<br>2<br>3<br>4 | DON'T CARE<br>DON'T CARE<br>DON'T CARE<br>DON'T CARE<br>DON'T CARE | 7<br>4<br>4<br>7<br>7 | 0<br>2<br>2<br>2<br>0 | 0<br>0<br>0<br>0<br>0 |
| | 5 | 0<br>1<br>2<br>3<br>4 | DON'T CARE<br>DON'T CARE<br>DON'T CARE<br>DON'T CARE<br>DON'T CARE | 7<br>5<br>5<br>7<br>7 | 0<br>2<br>2<br>0<br>0 | 0<br>0<br>0<br>0<br>0 |
| | 6 | 0<br>1<br>2<br>3<br>4 | DON'T CARE<br>DON'T CARE<br>DON'T CARE<br>DON'T CARE<br>DON'T CARE | 7<br>6<br>7<br>7<br>7 | 0<br>2<br>0<br>0<br>0 | 0<br>0<br>0<br>0<br>0 |
| | 7 | 5<br>6 | 1<br>1 | 7<br>7 | 3<br>3 | 0<br>0 |
| | | 5<br>6 | 0<br>0 | 7<br>3 | 3<br>2 | 0<br>0 |

FIG. 32B

| INPUT | | | | OUTPUT | | |
|---|---|---|---|---|---|---|
| col | zone | edge | FCH | ucr | filter | sen |
| 0 (OTHER THAN BLACK) | 0 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>2 | 0<br>1<br>1<br>1<br>1 |
| | 1 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>2 | 0<br>1<br>1<br>1<br>0 |
| | 2 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>2 | 0<br>1<br>1<br>0<br>0 |
| | 3 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>0 | 0<br>0<br>0<br>0<br>0 |
| | 4 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>0 | 0<br>0<br>0<br>0<br>0 |
| | 5 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>0<br>0 | 0<br>0<br>0<br>0<br>0 |
| | 6 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>0<br>0<br>0 | 0<br>0<br>0<br>0<br>0 |
| | 7 | 5<br>6 | 1<br>1 | 7<br>7 | 3<br>3 | 0<br>0 |
| | | 5<br>6 | 0<br>0 | 7<br>3 | 3<br>2 | 0<br>0 |

FIG. 33A

CHARACTER PRIORITY+2

| INPUT | | | | OUTPUT | | |
|---|---|---|---|---|---|---|
| col | zone | edge | FCH | ucr | filter | sen |
| 1 (BLACK) | 0 | 0<br>1<br>2<br>3<br>4 | DON'T CARE<br>DON'T CARE<br>DON'T CARE<br>DON'T CARE<br>DON'T CARE | 7<br>0<br>0<br>0<br>0 | 0<br>1<br>1<br>1<br>1 | 0<br>1<br>1<br>1<br>1 |
| | 1 | 0<br>1<br>2<br>3<br>4 | DON'T CARE<br>DON'T CARE<br>DON'T CARE<br>DON'T CARE<br>DON'T CARE | 7<br>1<br>1<br>1<br>1 | 0<br>1<br>1<br>1<br>1 | 0<br>1<br>1<br>1<br>1 |
| | 2 | 0<br>1<br>2<br>3<br>4 | DON'T CARE<br>DON'T CARE<br>DON'T CARE<br>DON'T CARE<br>DON'T CARE | 7<br>2<br>2<br>2<br>7 | 0<br>1<br>1<br>2<br>2 | 0<br>1<br>1<br>1<br>0 |
| | 3 | 0<br>1<br>2<br>3<br>4 | DON'T CARE<br>DON'T CARE<br>DON'T CARE<br>DON'T CARE<br>DON'T CARE | 7<br>3<br>3<br>7<br>7 | 0<br>1<br>1<br>2<br>0 | 0<br>0<br>0<br>0<br>0 |
| | 4 | 0<br>1<br>2<br>3<br>4 | DON'T CARE<br>DON'T CARE<br>DON'T CARE<br>DON'T CARE<br>DON'T CARE | 7<br>4<br>4<br>7<br>7 | 0<br>2<br>2<br>2<br>0 | 0<br>0<br>0<br>0<br>0 |
| | 5 | 0<br>1<br>2<br>3<br>4 | DON'T CARE<br>DON'T CARE<br>DON'T CARE<br>DON'T CARE<br>DON'T CARE | 7<br>5<br>5<br>7<br>7 | 0<br>2<br>2<br>0<br>0 | 0<br>0<br>0<br>0<br>0 |
| | 6 | 0<br>1<br>2<br>3<br>4 | DON'T CARE<br>DON'T CARE<br>DON'T CARE<br>DON'T CARE<br>DON'T CARE | 7<br>6<br>7<br>7<br>7 | 0<br>2<br>0<br>0<br>0 | 0<br>0<br>0<br>0<br>0 |
| | 7 | 5<br>6 | 1<br>1 | 7<br>7 | 3<br>3 | 0<br>0 |
| | | 5<br>6 | 0<br>0 | 7<br>4 | 3<br>2 | 0<br>0 |

FIG. 33B

| INPUT | | | | OUTPUT | | |
|---|---|---|---|---|---|---|
| col | zone | edge | FCH | ucr | filter | sen |
| 0<br>(OTHER<br>THAN<br>BLACK) | 0 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>2 | 0<br>1<br>1<br>1<br>1 |
| | 1 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>2 | 0<br>1<br>1<br>1<br>0 |
| | 2 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>2 | 0<br>1<br>1<br>0<br>0 |
| | 3 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>0 | 0<br>0<br>0<br>0<br>0 |
| | 4 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>0 | 0<br>0<br>0<br>0<br>0 |
| | 5 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>0<br>0 | 0<br>0<br>0<br>0<br>0 |
| | 6 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>0<br>0<br>0 | 0<br>0<br>0<br>0<br>0 |
| | 7 | 5<br>6 | 1<br>1 | 7<br>7 | 3<br>3 | 0<br>0 |
| | | 5<br>6 | 0<br>0 | 7<br>4 | 3<br>2 | 0<br>0 |

FIG. 34A

CHARACTER PRIORITY+1

| col | zone | edge | FCH | ucr | filter | sen |
|---|---|---|---|---|---|---|
| 1 (BLACK) | 0 | 0 | DON'T CARE | 7 | 0 | 0 |
| | | 1 | DON'T CARE | 0 | 1 | 1 |
| | | 2 | DON'T CARE | 0 | 1 | 1 |
| | | 3 | DON'T CARE | 0 | 1 | 1 |
| | | 4 | DON'T CARE | 0 | 1 | 1 |
| | 1 | 0 | DON'T CARE | 7 | 0 | 0 |
| | | 1 | DON'T CARE | 1 | 1 | 1 |
| | | 2 | DON'T CARE | 1 | 1 | 1 |
| | | 3 | DON'T CARE | 1 | 1 | 0 |
| | | 4 | DON'T CARE | 7 | 0 | 0 |
| | 2 | 0 | DON'T CARE | 7 | 0 | 0 |
| | | 1 | DON'T CARE | 2 | 1 | 1 |
| | | 2 | DON'T CARE | 2 | 1 | 1 |
| | | 3 | DON'T CARE | 2 | 2 | 1 |
| | | 4 | DON'T CARE | 7 | 0 | 0 |
| | 3 | 0 | DON'T CARE | 7 | 0 | 0 |
| | | 1 | DON'T CARE | 3 | 1 | 0 |
| | | 2 | DON'T CARE | 3 | 1 | 0 |
| | | 3 | DON'T CARE | 7 | 2 | 0 |
| | | 4 | DON'T CARE | 7 | 0 | 0 |
| | 4 | 0 | DON'T CARE | 7 | 0 | 0 |
| | | 1 | DON'T CARE | 4 | 2 | 0 |
| | | 2 | DON'T CARE | 4 | 2 | 0 |
| | | 3 | DON'T CARE | 7 | 2 | 0 |
| | | 4 | DON'T CARE | 7 | 0 | 0 |
| | 5 | 0 | DON'T CARE | 7 | 0 | 0 |
| | | 1 | DON'T CARE | 5 | 2 | 0 |
| | | 2 | DON'T CARE | 5 | 2 | 0 |
| | | 3 | DON'T CARE | 7 | 0 | 0 |
| | | 4 | DON'T CARE | 7 | 0 | 0 |
| | 6 | 0 | DON'T CARE | 7 | 0 | 0 |
| | | 1 | DON'T CARE | 6 | 2 | 0 |
| | | 2 | DON'T CARE | 7 | 0 | 0 |
| | | 3 | DON'T CARE | 7 | 0 | 0 |
| | | 4 | DON'T CARE | 7 | 0 | 0 |
| | 7 | 5 | 1 | 7 | 3 | 0 |
| | | 6 | 1 | 7 | 3 | 0 |
| | | 5 | 0 | 7 | 3 | 0 |
| | | 6 | 0 | 5 | 2 | 0 |

FIG. 34B

| INPUT | | | | OUTPUT | | |
|---|---|---|---|---|---|---|
| col | zone | edge | FCH | ucr | filter | sen |
| 0 (OTHER THAN BLACK) | 0 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>2 | 0<br>1<br>1<br>1<br>1 |
| | 1 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>0 | 0<br>1<br>1<br>1<br>0 |
| | 2 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>0 | 0<br>1<br>1<br>0<br>0 |
| | 3 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>0 | 0<br>0<br>0<br>0<br>0 |
| | 4 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>0 | 0<br>0<br>0<br>0<br>0 |
| | 5 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>0<br>0 | 0<br>0<br>0<br>0<br>0 |
| | 6 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>0<br>0<br>0 | 0<br>0<br>0<br>0<br>0 |
| | 7 | 5<br>6 | 1<br>1 | 7<br>7 | 3<br>3 | 0<br>0 |
| | | 5<br>6 | 0<br>0 | 7<br>5 | 3<br>2 | 0<br>0 |

FIG. 35A

PHOTOGRAPH PRIORITY+1

| INPUT | | | | OUTPUT | | |
|---|---|---|---|---|---|---|
| col | zone | edge | FCH | ucr | filter | sen |
| 1 (BLACK) | 0 | 0 | DON'T CARE | 7 | 0 | 0 |
| | | 1 | DON'T CARE | 0 | 1 | 1 |
| | | 2 | DON'T CARE | 0 | 1 | 1 |
| | | 3 | DON'T CARE | 0 | 1 | 1 |
| | | 4 | DON'T CARE | 7 | 0 | 0 |
| | 1 | 0 | DON'T CARE | 7 | 0 | 0 |
| | | 1 | DON'T CARE | 1 | 1 | 1 |
| | | 2 | DON'T CARE | 1 | 1 | 1 |
| | | 3 | DON'T CARE | 1 | 2 | 1 |
| | | 4 | DON'T CARE | 7 | 0 | 0 |
| | 2 | 0 | DON'T CARE | 7 | 0 | 0 |
| | | 1 | DON'T CARE | 2 | 1 | 1 |
| | | 2 | DON'T CARE | 2 | 1 | 1 |
| | | 3 | DON'T CARE | 7 | 0 | 0 |
| | | 4 | DON'T CARE | 7 | 0 | 0 |
| | 3 | 0 | DON'T CARE | 7 | 0 | 0 |
| | | 1 | DON'T CARE | 3 | 1 | 0 |
| | | 2 | DON'T CARE | 3 | 2 | 0 |
| | | 3 | DON'T CARE | 7 | 0 | 0 |
| | | 4 | DON'T CARE | 7 | 0 | 0 |
| | 4 | 0 | DON'T CARE | 7 | 0 | 0 |
| | | 1 | DON'T CARE | 4 | 2 | 0 |
| | | 2 | DON'T CARE | 4 | 2 | 0 |
| | | 3 | DON'T CARE | 7 | 0 | 0 |
| | | 4 | DON'T CARE | 7 | 0 | 0 |
| | 5 | 0 | DON'T CARE | 7 | 0 | 0 |
| | | 1 | DON'T CARE | 5 | 2 | 0 |
| | | 2 | DON'T CARE | 7 | 0 | 0 |
| | | 3 | DON'T CARE | 7 | 0 | 0 |
| | | 4 | DON'T CARE | 7 | 0 | 0 |
| | 6 | 5 | 1 | 7 | 3 | 0 |
| | | 6 | 1 | 7 | 3 | 0 |
| | | 5 | 0 | 7 | 3 | 0 |
| | | 6 | 0 | 7 | 2 | 0 |
| | 7 | DON'T CARE | DON'T CARE | 7 | 3 | 0 |

FIG. 35B

| INPUT | | | | OUTPUT | | |
|---|---|---|---|---|---|---|
| col | zone | edge | FCH | ucr | filter | sen |
| 0 (OTHER THAN BLACK) | 0 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>0 | 0<br>1<br>1<br>1<br>0 |
| | 1 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>2<br>0 | 0<br>1<br>1<br>1<br>0 |
| | 2 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>0<br>0 | 0<br>1<br>1<br>0<br>0 |
| | 3 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>0<br>0 | 0<br>0<br>0<br>0<br>0 |
| | 4 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>0<br>0 | 0<br>0<br>0<br>0<br>0 |
| | 5 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>0<br>0<br>0 | 0<br>0<br>0<br>0<br>0 |
| | 6 | 5<br>6 | 1<br>1 | 7<br>7 | 3<br>3 | 0<br>0 |
| | | 5<br>6 | 0<br>0 | 7<br>7 | 3<br>2 | 0<br>0 |
| | 7 | DON'T CARE | DON'T CARE | 7 | 3 | 0 |

FIG. 36A

PHOTOGRAPH PRIORITY+2

| INPUT | | | | OUTPUT | | |
|---|---|---|---|---|---|---|
| col | zone | edge | FCH | ucr | filter | sen |
| 1 (BLACK) | 0 | 0 | DON'T CARE | 7 | 0 | 0 |
| | | 1 | DON'T CARE | 0 | 1 | 1 |
| | | 2 | DON'T CARE | 0 | 1 | 1 |
| | | 3 | DON'T CARE | 7 | 0 | 0 |
| | | 4 | DON'T CARE | 7 | 0 | 0 |
| | 1 | 0 | DON'T CARE | 7 | 0 | 0 |
| | | 1 | DON'T CARE | 1 | 1 | 1 |
| | | 2 | DON'T CARE | 1 | 1 | 1 |
| | | 3 | DON'T CARE | 7 | 2 | 0 |
| | | 4 | DON'T CARE | 7 | 0 | 0 |
| | 2 | 0 | DON'T CARE | 7 | 0 | 0 |
| | | 1 | DON'T CARE | 2 | 1 | 1 |
| | | 2 | DON'T CARE | 2 | 2 | 0 |
| | | 3 | DON'T CARE | 7 | 0 | 0 |
| | | 4 | DON'T CARE | 7 | 0 | 0 |
| | 3 | 0 | DON'T CARE | 7 | 0 | 0 |
| | | 1 | DON'T CARE | 3 | 1 | 0 |
| | | 2 | DON'T CARE | 7 | 2 | 0 |
| | | 3 | DON'T CARE | 7 | 0 | 0 |
| | | 4 | DON'T CARE | 7 | 0 | 0 |
| | 4 | 0 | DON'T CARE | 7 | 0 | 0 |
| | | 1 | DON'T CARE | 4 | 2 | 0 |
| | | 2 | DON'T CARE | 7 | 0 | 0 |
| | | 3 | DON'T CARE | 7 | 0 | 0 |
| | | 4 | DON'T CARE | 7 | 0 | 0 |
| | 5 | 5 | 1 | 7 | 3 | 0 |
| | | 6 | 1 | 7 | 3 | 0 |
| | | 5 | 0 | 7 | 3 | 0 |
| | | 6 | 0 | 7 | 2 | 0 |
| | 6 | DON'T CARE | DON'T CARE | 7 | 3 | 0 |
| | 7 | DON'T CARE | DON'T CARE | 7 | 3 | 0 |

FIG. 36B

| | INPUT | | | OUTPUT | | |
|---|---|---|---|---|---|---|
| col | zone | edge | FCH | ucr | filter | sen |
| 0 (OTHER THAN BLACK) | 0 | 0 | DON'T CARE | 7 | 0 | 0 |
| | | 1 | DON'T CARE | 7 | 2 | 1 |
| | | 2 | DON'T CARE | 7 | 2 | 1 |
| | | 3 | DON'T CARE | 7 | 0 | 0 |
| | | 4 | DON'T CARE | 7 | 0 | 0 |
| | 1 | 0 | DON'T CARE | 7 | 0 | 0 |
| | | 1 | DON'T CARE | 7 | 2 | 1 |
| | | 2 | DON'T CARE | 7 | 2 | 1 |
| | | 3 | DON'T CARE | 7 | 2 | 0 |
| | | 4 | DON'T CARE | 7 | 0 | 0 |
| | 2 | 0 | DON'T CARE | 7 | 0 | 0 |
| | | 1 | DON'T CARE | 7 | 2 | 1 |
| | | 2 | DON'T CARE | 7 | 2 | 0 |
| | | 3 | DON'T CARE | 7 | 0 | 0 |
| | | 4 | DON'T CARE | 7 | 0 | 0 |
| | 3 | 0 | DON'T CARE | 7 | 0 | 0 |
| | | 1 | DON'T CARE | 7 | 2 | 0 |
| | | 2 | DON'T CARE | 7 | 2 | 0 |
| | | 3 | DON'T CARE | 7 | 0 | 0 |
| | | 4 | DON'T CARE | 7 | 0 | 0 |
| | 4 | 0 | DON'T CARE | 7 | 0 | 0 |
| | | 1 | DON'T CARE | 7 | 2 | 0 |
| | | 2 | DON'T CARE | 7 | 2 | 0 |
| | | 3 | DON'T CARE | 7 | 0 | 0 |
| | | 4 | DON'T CARE | 7 | 0 | 0 |
| | 5 | 5 | 1 | 7 | 3 | 0 |
| | | 6 | 1 | 7 | 3 | 0 |
| | | 5 | 0 | 7 | 3 | 0 |
| | | 6 | 0 | 7 | 2 | 0 |
| | 6 | DON'T CARE | DON'T CARE | 7 | 3 | 0 |
| | 7 | DON'T CARE | DON'T CARE | 7 | 3 | 0 |

FIG. 37A

PHOTOGRAPH PRIORITY+3

| INPUT | | | | OUTPUT | | |
|---|---|---|---|---|---|---|
| col | zone | edge | FCH | ucr | filter | sen |
| 1 (BLACK) | 0 | 0<br>1<br>2<br>3<br>4 | DON'T CARE<br>DON'T CARE<br>DON'T CARE<br>DON'T CARE<br>DON'T CARE | 7<br>0<br>0<br>7<br>7 | 0<br>1<br>2<br>0<br>0 | 0<br>1<br>1<br>0<br>0 |
| | 1 | 0<br>1<br>2<br>3<br>4 | DON'T CARE<br>DON'T CARE<br>DON'T CARE<br>DON'T CARE<br>DON'T CARE | 7<br>1<br>1<br>7<br>7 | 0<br>2<br>2<br>0<br>0 | 0<br>1<br>1<br>0<br>0 |
| | 2 | 0<br>1<br>2<br>3<br>4 | DON'T CARE<br>DON'T CARE<br>DON'T CARE<br>DON'T CARE<br>DON'T CARE | 7<br>2<br>2<br>7<br>7 | 0<br>2<br>0<br>0<br>0 | 0<br>0<br>0<br>0<br>0 |
| | 3 | 0<br>1<br>2<br>3<br>4 | DON'T CARE<br>DON'T CARE<br>DON'T CARE<br>DON'T CARE<br>DON'T CARE | 7<br>3<br>7<br>7<br>7 | 0<br>2<br>0<br>0<br>0 | 0<br>0<br>0<br>0<br>0 |
| | 4 | 5<br>6 | 1<br>1 | 7<br>7 | 3<br>3 | 0<br>0 |
| | | 5<br>6 | 0<br>0 | 7<br>7 | 3<br>2 | 0<br>0 |
| | 5 | DON'T CARE | DON'T CARE | 7 | 3 | 0 |
| | 6 | DON'T CARE | DON'T CARE | 7 | 3 | 0 |
| | 7 | DON'T CARE | DON'T CARE | 7 | 3 | 0 |

FIG. 37B

| INPUT | | | | OUTPUT | | |
|---|---|---|---|---|---|---|
| col | zone | edge | FCH | ucr | filter | sen |
| 0 (OTHER THAN BLACK) | 0 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>0<br>0 | 0<br>1<br>1<br>0<br>0 |
| | 1 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>2<br>0<br>0 | 0<br>1<br>1<br>0<br>0 |
| | 2 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>0<br>0<br>0 | 0<br>0<br>0<br>0<br>0 |
| | 3 | 0<br>1<br>2<br>3<br>4 | DON'T CARE<br>DON'T CARE<br>DON'T CARE<br>DON'T CARE<br>DON'T CARE | 7<br>7<br>7<br>7<br>7 | 0<br>2<br>0<br>0<br>0 | 0<br>0<br>0<br>0<br>0 |
| | 4 | 5<br>6 | 1<br>1 | 7<br>7 | 3<br>3 | 0<br>0 |
| | | 5<br>6 | 0<br>0 | 7<br>7 | 3<br>2 | 0<br>0 |
| | 5 | DON'T CARE | DON'T CARE | 7 | 3 | 0 |
| | 6 | DON'T CARE | DON'T CARE | 7 | 3 | 0 |
| | 7 | DON'T CARE | DON'T CARE | 7 | 3 | 0 |

PHOTOGRAPH PRIORITY+4

FIG. 38A

| INPUT | | | | OUTPUT | | |
|---|---|---|---|---|---|---|
| col | zone | edge | FCH | ucr | filter | sen |
| 1 (BLACK) | 0 | 0 | DON'T CARE | 7 | 0 | 0 |
| | | 1 | DON'T CARE | 0 | 1 | 1 |
| | | 2 | DON'T CARE | 0 | 2 | 1 |
| | | 3 | DON'T CARE | 7 | 0 | 0 |
| | | 4 | DON'T CARE | 7 | 0 | 0 |
| | 1 | DON'T CARE | DON'T CARE | 7 | 3 | 0 |
| | 2 | DON'T CARE | DON'T CARE | 7 | 3 | 0 |
| | 3 | DON'T CARE | DON'T CARE | 7 | 3 | 0 |
| | 4 | DON'T CARE | DON'T CARE | 7 | 3 | 0 |
| | 5 | DON'T CARE | DON'T CARE | 7 | 3 | 0 |
| | 6 | DON'T CARE | DON'T CARE | 7 | 3 | 0 |
| | 7 | DON'T CARE | DON'T CARE | 7 | 3 | 0 |

FIG. 38B

| INPUT | | | | OUTPUT | | |
|---|---|---|---|---|---|---|
| col | zone | edge | FCH | ucr | filter | sen |
| 0 (OTHER THAN BLACK) | 0 | 0 | DON'T CARE | 7 | 0 | 0 |
| | | 1 | DON'T CARE | 7 | 2 | 1 |
| | | 2 | DON'T CARE | 7 | 2 | 1 |
| | | 3 | DON'T CARE | 7 | 0 | 0 |
| | | 4 | DON'T CARE | 7 | 0 | 0 |
| | 1 | DON'T CARE | DON'T CARE | 7 | 3 | 0 |
| | 2 | DON'T CARE | DON'T CARE | 7 | 3 | 0 |
| | 3 | DON'T CARE | DON'T CARE | 7 | 3 | 0 |
| | 4 | DON'T CARE | DON'T CARE | 7 | 3 | 0 |
| | 5 | DON'T CARE | DON'T CARE | 7 | 3 | 0 |
| | 6 | DON'T CARE | DON'T CARE | 7 | 3 | 0 |
| | 7 | DON'T CARE | DON'T CARE | 7 | 3 | 0 |

| FIG. 40A | FIG. 40B |

FIG. 45

| | CHARACTER PRIORITY | | STANDARD | | PHOTOGRAPH PRIORITY |
|---|---|---|---|---|---|
| EDGE IN SCREEN | 0x20 | 0x40 | 0x60 | 0x80 | MAX |
| EDGE IN WHITE SUBSTRATE | 0x05 | 0x10 | 0x20 | 0x25 | MAX |
| SATURATION JUDGMENT Gr_BK | 0x15 | 0x12 | 0x10 | 0x08 | 0x07 |
| SATURATION JUDGMENT Gr_COL | 0x28 | 0x24 | 0x20 | 0x1E | 0x1c |
| SATURATION JUDGMENT Gr_W | 0x80 | 0x7A | 0x78 | 0x74 | 0x70 |
| LIM1 | 0xF8 | 0xF0 | 0xE8 | 0xE0 | 0xC5 |
| LIM2 | 0xF8 | 0xF0 | 0xE8 | 0xE0 | 0xC5 |
| th_count | MAX | 0x60 | 0x40 | 0x30 | 0x25 |
| OFST1 | 0x40 | 0x60 | 0x80 | 0x90 | MAX |
| SIZE OF THICKNESS JUDGMENT WINDOW | SET_1 | SET_2 | SET_3 | SET_4 | SET_5 |

WHERE
SET_1≧SET_2≧SET_3≧SET_4≧SET_5

"MAX" REPRESENTING SETTABLE MAX VALUE
(MAX VALUE CAPABLE OF BEING TAKEN BY REFERENCE INPUT SIGNAL)

FIG. 46A

| INPUT | | | | OUTPUT | | |
|---|---|---|---|---|---|---|
| col | zone | edge | FCH | ucr | filter | sen |
| 1 (BLACK) | 0 | INSIDE<br>1×1<br>3×3<br>5×5<br>7×7 | DON'T CARE<br>DON'T CARE<br>DON'T CARE<br>DON'T CARE<br>DON'T CARE | 3<br>0<br>3<br>3<br>3 | 3<br>3<br>3<br>3<br>3 | 0<br>1<br>0<br>0<br>0 |
| | 1 | INSIDE<br>1×1<br>3×3<br>5×5<br>7×7 | DON'T CARE<br>DON'T CARE<br>DON'T CARE<br>DON'T CARE<br>DON'T CARE | 3<br>1<br>3<br>3<br>3 | 3<br>3<br>3<br>3<br>3 | 0<br>1<br>0<br>0<br>0 |
| | 2 | INSIDE<br>1×1<br>3×3<br>5×5<br>7×7 | DON'T CARE<br>DON'T CARE<br>DON'T CARE<br>DON'T CARE<br>DON'T CARE | 4<br>2<br>4<br>4<br>4 | 3<br>3<br>3<br>3<br>3 | 0<br>1<br>0<br>0<br>0 |
| | 3 | INSIDE<br>1×1<br>3×3<br>5×5<br>7×7 | DON'T CARE<br>DON'T CARE<br>DON'T CARE<br>DON'T CARE<br>DON'T CARE | 5<br>3<br>5<br>5<br>5 | 3<br>3<br>3<br>3<br>3 | 0<br>0<br>0<br>0<br>0 |
| | 4 | INSIDE<br>1×1<br>3×3<br>5×5<br>7×7 | DON'T CARE<br>DON'T CARE<br>DON'T CARE<br>DON'T CARE<br>DON'T CARE | 6<br>4<br>6<br>6<br>6 | 3<br>3<br>3<br>3<br>3 | 0<br>0<br>0<br>0<br>0 |
| | 5 | INSIDE<br>1×1<br>3×3<br>5×5<br>7×7 | DON'T CARE<br>DON'T CARE<br>DON'T CARE<br>DON'T CARE<br>DON'T CARE | 7<br>5<br>7<br>7<br>7 | 3<br>3<br>3<br>3<br>3 | 0<br>0<br>0<br>0<br>0 |
| | 6 | INSIDE<br>1×1<br>3×3<br>5×5<br>7×7 | DON'T CARE<br>DON'T CARE<br>DON'T CARE<br>DON'T CARE<br>DON'T CARE | 7<br>6<br>7<br>7<br>7 | 3<br>3<br>3<br>3<br>3 | 0<br>0<br>0<br>0<br>0 |
| | 7 | INSIDE<br>1×1<br>3×3<br>5×5<br>7×7 | 1<br>1<br>1<br>1<br>1 | 7<br>7<br>7<br>7<br>7 | 3<br>3<br>3<br>3<br>3 | 0<br>0<br>0<br>0<br>0 |
| | | INSIDE<br>1×1<br>3×3<br>5×5<br>7×7 | 0<br>0<br>0<br>0<br>0 | 7<br>3<br>7<br>7<br>7 | 3<br>3<br>3<br>3<br>3 | 0<br>0<br>0<br>0<br>0 |

FIG. 46B

| INPUT | | | | OUTPUT | | |
|---|---|---|---|---|---|---|
| col | zone | edge | FCH | ucr | filter | sen |
| 0<br>(OTHER<br>THAN<br>BLACK) | 0 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 3<br>3<br>3<br>3<br>3 | 0<br>1<br>0<br>0<br>0 |
| | 1 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 3<br>3<br>3<br>3<br>3 | 0<br>1<br>0<br>0<br>0 |
| | 2 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 3<br>3<br>3<br>3<br>3 | 0<br>1<br>0<br>0<br>0 |
| | 3 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 3<br>3<br>3<br>3<br>3 | 0<br>0<br>0<br>0<br>0 |
| | 4 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 3<br>3<br>3<br>3<br>3 | 0<br>0<br>0<br>0<br>0 |
| | 5 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 3<br>3<br>3<br>3<br>3 | 0<br>0<br>0<br>0<br>0 |
| | 6 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 3<br>3<br>3<br>3<br>3 | 0<br>0<br>0<br>0<br>0 |
| | 7 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 3<br>3<br>3<br>3<br>3 | 0<br>0<br>0<br>0<br>0 |

FIG. 47A

| INPUT | | | | OUTPUT | | |
|---|---|---|---|---|---|---|
| col | zone | edge | FCH | ucr | filter | sen |
| 1 (BLACK) | 0 | INSIDE<br>1×1<br>3×3<br>5×5<br>7×7 | DON'T CARE<br>DON'T CARE<br>DON'T CARE<br>DON'T CARE<br>DON'T CARE | 3<br>0<br>0<br>3<br>3 | 2<br>2<br>2<br>2<br>2 | 0<br>1<br>1<br>0<br>0 |
| | 1 | INSIDE<br>1×1<br>3×3<br>5×5<br>7×7 | DON'T CARE<br>DON'T CARE<br>DON'T CARE<br>DON'T CARE<br>DON'T CARE | 3<br>1<br>1<br>3<br>3 | 2<br>2<br>2<br>2<br>2 | 0<br>1<br>1<br>0<br>0 |
| | 2 | INSIDE<br>1×1<br>3×3<br>5×5<br>7×7 | DON'T CARE<br>DON'T CARE<br>DON'T CARE<br>DON'T CARE<br>DON'T CARE | 4<br>2<br>2<br>4<br>4 | 2<br>2<br>2<br>2<br>2 | 0<br>1<br>0<br>0<br>0 |
| | 3 | INSIDE<br>1×1<br>3×3<br>5×5<br>7×7 | DON'T CARE<br>DON'T CARE<br>DON'T CARE<br>DON'T CARE<br>DON'T CARE | 5<br>3<br>5<br>5<br>5 | 2<br>2<br>2<br>2<br>3 | 0<br>0<br>0<br>0<br>0 |
| | 4 | INSIDE<br>1×1<br>3×3<br>5×5<br>7×7 | DON'T CARE<br>DON'T CARE<br>DON'T CARE<br>DON'T CARE<br>DON'T CARE | 6<br>4<br>6<br>6<br>6 | 2<br>2<br>2<br>2<br>2 | 0<br>0<br>0<br>0<br>0 |
| | 5 | INSIDE<br>1×1<br>3×3<br>5×5<br>7×7 | DON'T CARE<br>DON'T CARE<br>DON'T CARE<br>DON'T CARE<br>DON'T CARE | 7<br>5<br>7<br>7<br>7 | 2<br>2<br>2<br>2<br>2 | 0<br>0<br>0<br>0<br>0 |
| | 6 | INSIDE<br>1×1<br>3×3<br>5×5<br>7×7 | DON'T CARE<br>DON'T CARE<br>DON'T CARE<br>DON'T CARE<br>DON'T CARE | 7<br>6<br>7<br>7<br>7 | 2<br>2<br>2<br>2<br>2 | 0<br>0<br>0<br>0<br>0 |
| | 7 | INSIDE<br>1×1<br>3×3<br>5×5<br>7×7 | 1<br>1<br>1<br>1<br>1 | 7<br>7<br>7<br>7<br>7 | 2<br>2<br>2<br>2<br>2 | 0<br>0<br>0<br>0<br>0 |
| | | INSIDE<br>1×1<br>3×3<br>5×5<br>7×7 | 0<br>0<br>0<br>0<br>0 | 7<br>3<br>7<br>7<br>7 | 2<br>2<br>2<br>2<br>2 | 0<br>0<br>0<br>0<br>0 |

FIG. 47B

| INPUT | | | | OUTPUT | | |
|---|---|---|---|---|---|---|
| col | zone | edge | FCH | ucr | filter | sen |
| 0 (OTHER THAN BLACK) | 0 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 2<br>2<br>2<br>2<br>2 | 0<br>1<br>1<br>0<br>0 |
| | 1 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 2<br>2<br>2<br>2<br>2 | 0<br>1<br>1<br>0<br>0 |
| | 2 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 2<br>2<br>2<br>2<br>2 | 0<br>1<br>0<br>0<br>0 |
| | 3 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 2<br>2<br>2<br>2<br>3 | 0<br>0<br>0<br>0<br>0 |
| | 4 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 2<br>2<br>2<br>2<br>2 | 0<br>0<br>0<br>0<br>0 |
| | 5 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 2<br>2<br>2<br>2<br>2 | 0<br>0<br>0<br>0<br>0 |
| | 6 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 2<br>2<br>2<br>2<br>2 | 0<br>0<br>0<br>0<br>0 |
| | 7 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 2<br>2<br>2<br>2<br>2 | 0<br>0<br>0<br>0<br>0 |

FIG. 48A

| INPUT | | | | OUTPUT | | |
|---|---|---|---|---|---|---|
| col | zone | edge | FCH | ucr | filter | sen |
| 1 (BLACK) | 0 | INSIDE<br>1×1<br>3×3<br>5×5<br>7×7 | DON'T CARE<br>DON'T CARE<br>DON'T CARE<br>DON'T CARE<br>DON'T CARE | 3<br>0<br>0<br>3<br>3 | 0<br>1<br>1<br>3<br>3 | 0<br>1<br>1<br>0<br>0 |
| | 1 | INSIDE<br>1×1<br>3×3<br>5×5<br>7×7 | DON'T CARE<br>DON'T CARE<br>DON'T CARE<br>DON'T CARE<br>DON'T CARE | 3<br>1<br>1<br>3<br>3 | 0<br>1<br>1<br>3<br>3 | 0<br>1<br>1<br>0<br>0 |
| | 2 | INSIDE<br>1×1<br>3×3<br>5×5<br>7×7 | DON'T CARE<br>DON'T CARE<br>DON'T CARE<br>DON'T CARE<br>DON'T CARE | 4<br>2<br>2<br>4<br>4 | 0<br>1<br>3<br>3<br>3 | 0<br>1<br>0<br>0<br>0 |
| | 3 | INSIDE<br>1×1<br>3×3<br>5×5<br>7×7 | DON'T CARE<br>DON'T CARE<br>DON'T CARE<br>DON'T CARE<br>DON'T CARE | 5<br>3<br>5<br>5<br>5 | 0<br>1<br>3<br>3<br>3 | 0<br>0<br>0<br>0<br>0 |
| | 4 | INSIDE<br>1×1<br>3×3<br>5×5<br>7×7 | DON'T CARE<br>DON'T CARE<br>DON'T CARE<br>DON'T CARE<br>DON'T CARE | 6<br>4<br>6<br>6<br>6 | 0<br>2<br>3<br>3<br>3 | 0<br>0<br>0<br>0<br>0 |
| | 5 | INSIDE<br>1×1<br>3×3<br>5×5<br>7×7 | DON'T CARE<br>DON'T CARE<br>DON'T CARE<br>DON'T CARE<br>DON'T CARE | 7<br>5<br>7<br>7<br>7 | 0<br>2<br>3<br>3<br>3 | 0<br>0<br>0<br>0<br>0 |
| | 6 | INSIDE<br>1×1<br>3×3<br>5×5<br>7×7 | DON'T CARE<br>DON'T CARE<br>DON'T CARE<br>DON'T CARE<br>DON'T CARE | 7<br>6<br>7<br>7<br>7 | 0<br>2<br>3<br>3<br>3 | 0<br>0<br>0<br>0<br>0 |
| | 7 | INSIDE<br>1×1<br>3×3<br>5×5<br>7×7 | 1<br>1<br>1<br>1<br>1 | 7<br>7<br>7<br>7<br>7 | 3<br>3<br>3<br>3<br>3 | 0<br>0<br>0<br>0<br>0 |
| | | INSIDE<br>1×1<br>3×3<br>5×5<br>7×7 | 0<br>0<br>0<br>0<br>0 | 7<br>3<br>7<br>7<br>7 | 3<br>2<br>3<br>3<br>3 | 0<br>0<br>0<br>0<br>0 |

FIG. 48B

| INPUT | | | | OUTPUT | | |
|---|---|---|---|---|---|---|
| col | zone | edge | FCH | ucr | filter | sen |
| 0 (OTHER THAN BLACK) | 0 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>1<br>1<br>3<br>3 | 0<br>1<br>1<br>0<br>0 |
| | 1 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>1<br>1<br>3<br>3 | 0<br>1<br>1<br>0<br>0 |
| | 2 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>1<br>3<br>3<br>3 | 0<br>1<br>0<br>0<br>0 |
| | 3 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>1<br>3<br>3<br>3 | 0<br>0<br>0<br>0<br>0 |
| | 4 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>2<br>3<br>3<br>3 | 0<br>0<br>0<br>0<br>0 |
| | 5 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>2<br>3<br>3<br>3 | 0<br>0<br>0<br>0<br>0 |
| | 6 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>2<br>3<br>3<br>3 | 0<br>0<br>0<br>0<br>0 |
| | 7 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 3<br>3<br>3<br>3<br>3 | 0<br>0<br>0<br>0<br>0 |

FIG. 49A

| INPUT | | | | OUTPUT | | |
|---|---|---|---|---|---|---|
| col | zone | edge | FCH | ucr | filter | sen |
| 1 (BLACK) | 0 | INSIDE<br>1×1<br>3×3<br>5×5<br>7×7 | DON'T CARE<br>DON'T CARE<br>DON'T CARE<br>DON'T CARE<br>DON'T CARE | 3<br>0<br>0<br>3<br>3 | 0<br>1<br>1<br>3<br>3 | 0<br>1<br>1<br>0<br>0 |
| | 1 | INSIDE<br>1×1<br>3×3<br>5×5<br>7×7 | DON'T CARE<br>DON'T CARE<br>DON'T CARE<br>DON'T CARE<br>DON'T CARE | 3<br>1<br>1<br>3<br>3 | 0<br>1<br>1<br>3<br>3 | 0<br>1<br>1<br>0<br>0 |
| | 2 | INSIDE<br>1×1<br>3×3<br>5×5<br>7×7 | DON'T CARE<br>DON'T CARE<br>DON'T CARE<br>DON'T CARE<br>DON'T CARE | 4<br>2<br>2<br>4<br>4 | 0<br>1<br>1<br>3<br>3 | 0<br>1<br>1<br>0<br>0 |
| | 3 | INSIDE<br>1×1<br>3×3<br>5×5<br>7×7 | DON'T CARE<br>DON'T CARE<br>DON'T CARE<br>DON'T CARE<br>DON'T CARE | 5<br>3<br>3<br>5<br>5 | 0<br>1<br>2<br>3<br>3 | 0<br>1<br>1<br>0<br>0 |
| | 4 | INSIDE<br>1×1<br>3×3<br>5×5<br>7×7 | DON'T CARE<br>DON'T CARE<br>DON'T CARE<br>DON'T CARE<br>DON'T CARE | 6<br>4<br>4<br>6<br>6 | 0<br>2<br>2<br>3<br>3 | 0<br>1<br>1<br>0<br>0 |
| | 5 | INSIDE<br>1×1<br>3×3<br>5×5<br>7×7 | DON'T CARE<br>DON'T CARE<br>DON'T CARE<br>DON'T CARE<br>DON'T CARE | 7<br>5<br>7<br>7<br>7 | 0<br>2<br>3<br>3<br>3 | 0<br>1<br>1<br>0<br>0 |
| | 6 | INSIDE<br>1×1<br>3×3<br>5×5<br>7×7 | DON'T CARE<br>DON'T CARE<br>DON'T CARE<br>DON'T CARE<br>DON'T CARE | 7<br>6<br>7<br>7<br>7 | 0<br>2<br>3<br>3<br>3 | 0<br>1<br>0<br>0<br>0 |
| | 7 | INSIDE<br>1×1<br>3×3<br>5×5<br>7×7 | 1<br>1<br>1<br>1<br>1 | 7<br>7<br>7<br>7<br>7 | 3<br>3<br>3<br>3<br>3 | 0<br>1<br>0<br>0<br>0 |
| | | INSIDE<br>1×1<br>3×3<br>5×5<br>7×7 | 0<br>0<br>0<br>0<br>0 | 7<br>3<br>7<br>7<br>7 | 3<br>2<
3<br>3<br>3 | 0<br>1<br>0<br>0<br>0 |

FIG. 49B

| INPUT | | | | OUTPUT | | |
|---|---|---|---|---|---|---|
| col | zone | edge | FCH | ucr | filter | sen |
| 0<br>(OTHER<br>THAN<br>BLACK) | 0 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>1<br>1<br>3<br>3 | 0<br>1<br>1<br>0<br>0 |
| | 1 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>1<br>1<br>3<br>3 | 0<br>1<br>1<br>0<br>0 |
| | 2 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>1<br>2<br>1<br>3 | 0<br>1<br>1<br>0<br>0 |
| | 3 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>1<br>2<br>3<br>3 | 0<br>1<br>1<br>0<br>0 |
| | 4 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>2<br>2<br>3<br>3 | 0<br>1<br>1<br>0<br>0 |
| | 5 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>2<br>3<br>3<br>3 | 0<br>1<br>1<br>0<br>0 |
| | 6 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>2<br>3<br>3<br>3 | 0<br>1<br>0<br>0<br>0 |
| | 7 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 3<br>3<br>3<br>3<br>3 | 0<br>1<br>0<br>0<br>0 |

FIG. 50A

| INPUT | | | | OUTPUT | | |
|---|---|---|---|---|---|---|
| col | zone | edge | FCH | ucr | filter | sen |
| 1 (BLACK) | 0 | INSIDE<br>1×1<br>3×3<br>5×5<br>7×7 | DON'T CARE<br>DON'T CARE<br>DON'T CARE<br>DON'T CARE<br>DON'T CARE | 3<br>0<br>0<br>3<br>3 | 0<br>1<br>1<br>3<br>3 | 0<br>1<br>1<br>0<br>0 |
| | 1 | INSIDE<br>1×1<br>3×3<br>5×5<br>7×7 | DON'T CARE<br>DON'T CARE<br>DON'T CARE<br>DON'T CARE<br>DON'T CARE | 3<br>1<br>1<br>3<br>3 | 0<br>1<br>1<br>3<br>3 | 0<br>1<br>1<br>0<br>0 |
| | 2 | INSIDE<br>1×1<br>3×3<br>5×5<br>7×7 | DON'T CARE<br>DON'T CARE<br>DON'T CARE<br>DON'T CARE<br>DON'T CARE | 4<br>2<br>2<br>4<br>4 | 0<br>1<br>1<br>3<br>3 | 0<br>1<br>0<br>0<br>0 |
| | 3 | INSIDE<br>1×1<br>3×3<br>5×5<br>7×7 | DON'T CARE<br>DON'T CARE<br>DON'T CARE<br>DON'T CARE<br>DON'T CARE | 5<br>3<br>3<br>5<br>5 | 0<br>1<br>2<br>3<br>3 | 0<br>0<br>0<br>0<br>0 |
| | 4 | INSIDE<br>1×1<br>3×3<br>5×5<br>7×7 | DON'T CARE<br>DON'T CARE<br>DON'T CARE<br>DON'T CARE<br>DON'T CARE | 6<br>4<br>4<br>6<br>6 | 0<br>2<br>2<br>3<br>3 | 0<br>0<br>0<br>0<br>0 |
| | 5 | INSIDE<br>1×1<br>3×3<br>5×5<br>7×7 | DON'T CARE<br>DON'T CARE<br>DON'T CARE<br>DON'T CARE<br>DON'T CARE | 7<br>5<br>7<br>7<br>7 | 0<br>2<br>3<br>3<br>3 | 0<br>0<br>0<br>0<br>0 |
| | 6 | INSIDE<br>1×1<br>3×3<br>5×5<br>7×7 | DON'T CARE<br>DON'T CARE<br>DON'T CARE<br>DON'T CARE<br>DON'T CARE | 7<br>6<br>7<br>7<br>7 | 0<br>2<br>3<br>3<br>3 | 0<br>0<br>0<br>0<br>0 |
| | 7 | INSIDE<br>1×1<br>3×3<br>5×5<br>7×7 | 1<br>1<br>1<br>1<br>1 | 7<br>7<br>7<br>7<br>7 | 3<br>3<br>3<br>3<br>3 | 0<br>0<br>0<br>0<br>0 |
| | | INSIDE<br>1×1<br>3×3<br>5×5<br>7×7 | 0<br>0<br>0<br>0<br>0 | 7<br>3<br>7<br>7<br>7 | 3<br>2<br>3<br>3<br>3 | 0<br>0<br>0<br>0<br>0 |

FIG. 50B

| INPUT | | | | OUTPUT | | |
|---|---|---|---|---|---|---|
| col | zone | edge | FCH | ucr | filter | sen |
| 0 (OTHER THAN BLACK) | 0 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>1<br>1<br>3<br>3 | 0<br>1<br>1<br>0<br>0 |
| | 1 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>1<br>1<br>3<br>3 | 0<br>1<br>1<br>0<br>0 |
| | 2 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>1<br>1<br>3<br>3 | 0<br>1<br>0<br>0<br>0 |
| | 3 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>1<br>2<br>3<br>3 | 0<br>0<br>0<br>0<br>0 |
| | 4 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>2<br>2<br>3<br>3 | 0<br>0<br>0<br>0<br>0 |
| | 5 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>2<br>3<br>3<br>3 | 0<br>0<br>0<br>0<br>0 |
| | 6 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 0<br>2<br>3<br>3<br>3 | 0<br>0<br>0<br>0<br>0 |
| | 7 | INSIDE<br>1×1<br>3×3<br>5×5<br>7×7 | DON'T CARE<br>DON'T CARE<br>DON'T CARE<br>DON'T CARE<br>DON'T CARE | 7<br>7<br>7<br>7<br>7 | 3<br>3<br>3<br>3<br>3 | 0<br>0<br>0<br>0<br>0 |

IMAGE PROCESSING METHOD AND APPARATUS

BACKGROUND OF THE INVENTION

1. Field of the Invention

The present invention relates to an image processing apparatus for processing an output image on the basis of the feature of an image extracted from an input image.

2. Related Background Art

In recent years, remarkable advances have been made in color printing systems such as a color printing apparatus for digitally processing color image data, and outputting the processed color image data to a color printer to obtain a color image, a digital color copying machine for color-separating and electrically reading a color original image, and printing obtained color image data on a paper sheet, and the like.

Along with the spread of these systems, a demand for a higher printing quality of color images is becoming stronger. In particular, it is required to print black characters and black thin lines to be sharp black ones. More specifically, when a black original image is color-separated, yellow, magenta, cyan, and black signals are generated as those for reproducing black. When image data is directly printed on the basis of the obtained signals, since a black image is reproduced by superposing four colors, color smearing occurs in a black thin line due to slight misregistrations among colors, and an original black image cannot be seen in black or is blurred, thus considerably deteriorating printing quality.

In order to solve this problem, the following method is proposed. That is, the areas of black characters, color characters, and the like are detected or an original image is divided into a halftone image area, a screen image area, and the like by extracting the features such as color information of black or other colors in an image signal, and the spatial frequencies of thin lines, screens, and the like, and processing is executed in correspondence with the detected or divided areas. If the detected area is a black character area, the area is printed using black alone.

Furthermore, the present applicant proposed, in Japanese Laid-Open Patent Application No. 7-203198, an improved method which can obtain clearly different processing results at the boundary lines of black character processing by discriminating the thickness of each character, and executing black character processing in correspondence with the discriminated thickness.

Japanese Laid-Open Patent Application No. 7-203198 also proposed a method of setting the black character processing area and the degree of black character processing in correspondence with a user's favor.

However, the conventional method does not take into account the above-mentioned black character processing for image data supplied from a host computer. For this reason, black character processing with noise-free, sharp edge, and good gray balance features, and the like cannot be performed for computer graphics images.

SUMMARY OF THE INVENTION

The present invention has been made in consideration of the above situation, and has as its object to execute feature detection processing suitable for images input from a plurality of input means.

In order to achieve the above object, according to the present invention, there is disclosed an image processing apparatus comprising:

first input means for inputting a first set of plural color component signals;

second input means for inputting a second set of plural color component signals;

judging means for judging a line image portion having a specific color of an image represented by the first or second set of plural color component signals; and setting means for setting a judging standard for the judging means.

It is another object of the present invention to provide an image processing method and apparatus, which can realize black character processing that can set coefficients suitable for image processing for image data supplied from a host computer (external apparatus) without requiring any instruction for setting image processing coefficients to be supplied from the host computer when black character processing is performed for an image supplied from the host computer.

It is still another object of the present invention to provide an image processing method and apparatus, which can realize black character processing that can change the degree of black character processing in accordance with an instruction from a host computer or a console unit of the main body.

It is still another object of the present invention to provide an image processing method and apparatus, which can perform optimal image processing when an image supplied from a host computer and an original image read from a scanner are mixed.

It is still another object of the present invention to provide a multi-functional interface between a host computer and an image forming apparatus.

It is still another object of the present invention to satisfactorily control UCR processing for an image supplied from a host computer.

Other objects and features of the present invention will become apparent from the following description of the embodiments taken in conjunction with the accompanying drawings and the appended claims.

BRIEF DESCRIPTION OF THE DRAWINGS

FIG. 8 is a block diagram showing the internal arrangement of an edge detection unit 115;

FIG. 9 is a diagram for explaining a character-thickness judgment circuit 114;

FIGS. 17A to 17D are views showing the edge direction detection rules in an edge direction detection circuit 2044;

FIG. 18 is a view showing the opposite edge detection rule;

FIG. 20 is a block diagram showing the internal arrangement of an area size judgment unit 2016;

FIG. 24 is a diagram showing the algorithm for character detection in a screen/halftone image;

FIG. 25 is a detailed diagram showing the processing state based on the algorithm shown in FIG. 23;

FIGS. 26A and 26B are views showing the contents of the I/O relationship of an LUT 117;.

FIG. 27 is a block diagram showing a modification of the character-thickness judgment circuit 114;

FIG. 28 shows masking/UCR formulas;

FIG. 30 is a view showing judgment parameters;

FIGS. 31A and 31B are views showing an LUT representing the degree of character processing;

FIGS. 32A and 32B are views showing an LUT- representing the degree of character processing;

FIGS. 33A and 33B are views showing an LUT representing the degree of character processing;

FIGS. 34A and 34B are views showing an LUT representing the degree of character processing;

FIGS. 35A and 35B are views showing an LUT representing the degree of character processing;

FIGS. 36A and 36B are views showing an LUT representing the degree of character processing;

FIGS. 37A and 37B are views showing an LUT representing the degree of character processing;

FIGS. 38A and 38B are views showing an LUT representing the degree of character processing;

FIG. 45 is a view showing judgment parameters;

FIGS. 46A and 46B are views showing an LUT representing the degree of character processing;

FIGS. 47A and 47B are views showing an LUT representing the degree of character processing;

FIGS. 48A and 48B are views showing an LUT representing the degree of character processing;

FIGS. 49A and 49B are views showing an LUT representing the degree of character processing;

FIGS. 50A and 50B are views showing an LUT representing the degree of character processing.

DETAILED DESCRIPTION OF THE PREFERRED EMBODIMENTS

The preferred embodiments of the present invention will be described in detail hereinafter with reference to the accompanying drawings.

First Embodiment

Figure 1:
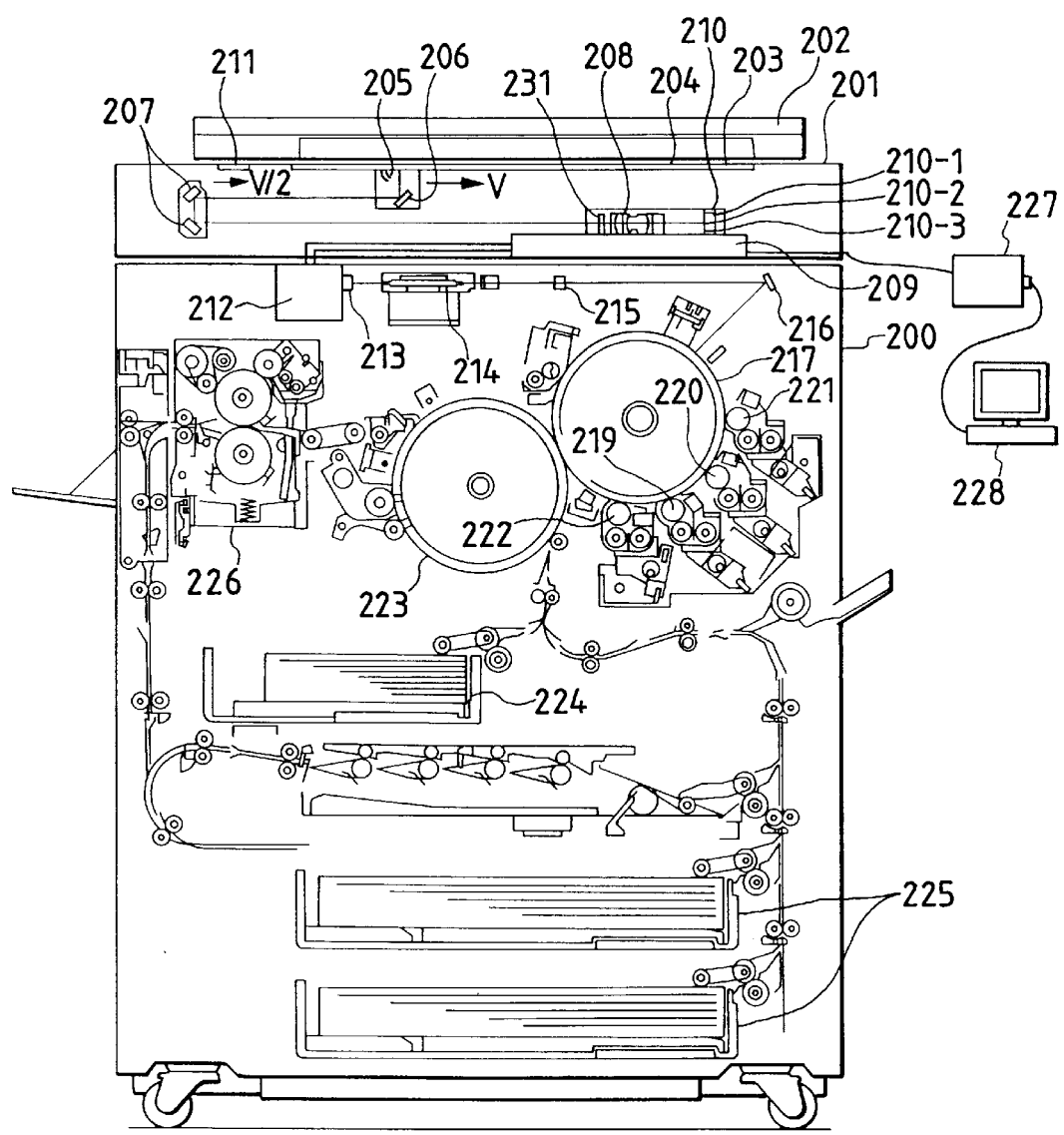
FIG. 1 is a sectional view showing the arrangement of an image processing apparatus according to the first embodiment of the present invention.

FIG. 1 is a sectional view showing the arrangement of an image processing apparatus according to the first embodiment of the present invention. Referring to FIG. 1, an image scanner unit 201 reads an original image and performs digital signal processing. A printer unit 200 prints a full-color image on a paper sheet in correspondence with the original image read by the image scanner unit 201. A host computer (to be referred to as "host" hereinafter) 228 outputs, e.g., an image created by computer graphics, and outputs commands associated with image formation control, as will be described later. A controller 227 connects the host 228 and the image scanner unit 201, and can bidirectionally communicate with the host 228 and the image scanner unit 201.

The original modes of this embodiment will be explained below.

Figure 39:
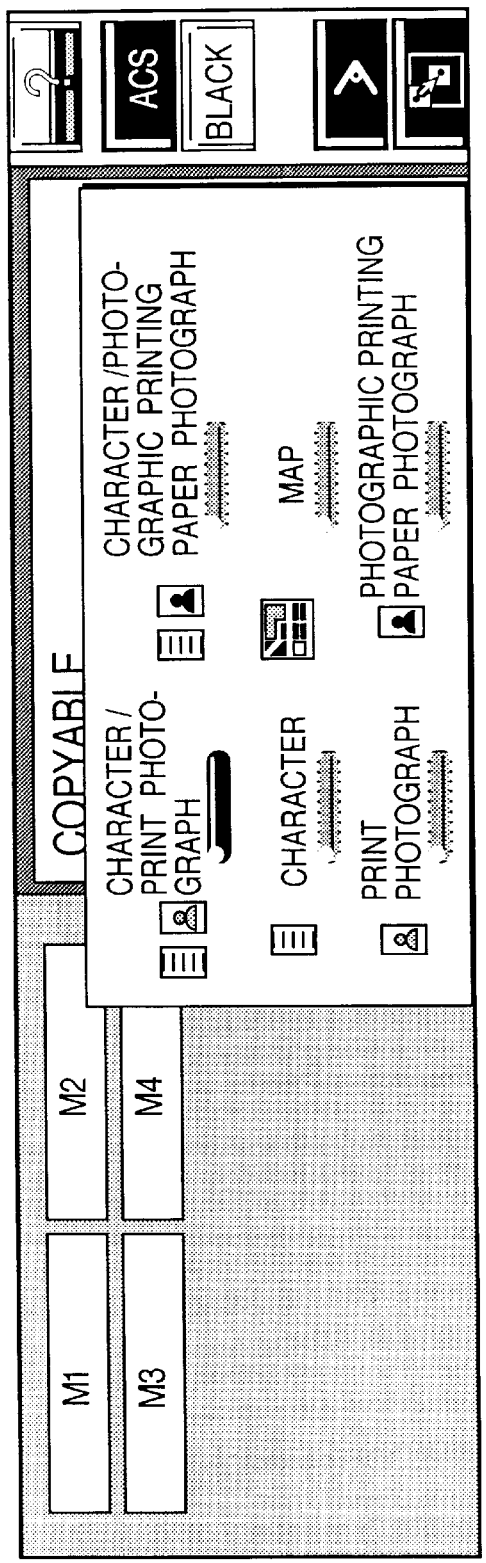
FIG. 39 is a view showing the display state of an original mode on a console unit.

An operator selects one of six different original modes shown in FIG. 39 using a console unit 101' in correspondence with an original to be copied. Processing operations corresponding to the respective original modes are as follows.

(i) In the character mode, the recording resolution is set to be 400 dpi (dots per inch), black character processing (to be described later) is performed for a portion which is discriminated as a black character portion upon discrimination of the colors of an original, and edge emphasis processing is performed for an area other than black. With this processing, since the recording resolution is increased, characters with sharp details can be reproduced, and since black characters are recorded using only a black toner, sharp black characters free from color smearing can be reproduced.

(ii) In the map mode, edge emphasis processing is performed, and image data is recorded at a recording resolution of 400 dpi. In this case, UCR-enhanced masking/UCR coefficients are used. With this processing, a map original image including many fine characters and lines can be reproduced with high resolution. Since no area separation (to be described later) is performed, an output image free from deterioration of image quality caused by discrimination errors in the area separation can be obtained. Since the UCR effect is enhanced, black characters present in an original can be recorded by increasing the ratio of black toner while suppressing color toners as much as possible.

(iii) In the photographic printing paper photograph mode, edge emphasis processing for a photograph printed on photographic printing paper is performed, and image data is recorded at a recording resolution of 200 dpi. With this processing, a high-contrast image with high halftone characteristics and emphasized sharpness can be output.

(iv) In the print photograph mode, smoothing processing is performed to suppress generation of moire, and thereafter, edge emphasis processing is performed. Then, image data is recorded at a recording resolution of 200 dpi. With this processing, an image with high halftone characteristics and emphasized sharpness can be output without generating any moire.

(v) In the character/print photograph mode, a character area and a print photograph area are automatically discriminated. Processing for characters is performed for an area which is determined as a character area, and processing for a print photograph is performed for an area which is determined as a print photograph area.

(vi) In the character/photographic printing paper photograph mode, a character area and a photographic printing paper photograph area are automatically discriminated. Processing for characters is performed for an area which is determined as a character area, and processing for a print photograph is performed for an area which is determined as a photographic printing paper photograph area.

Figure 29:
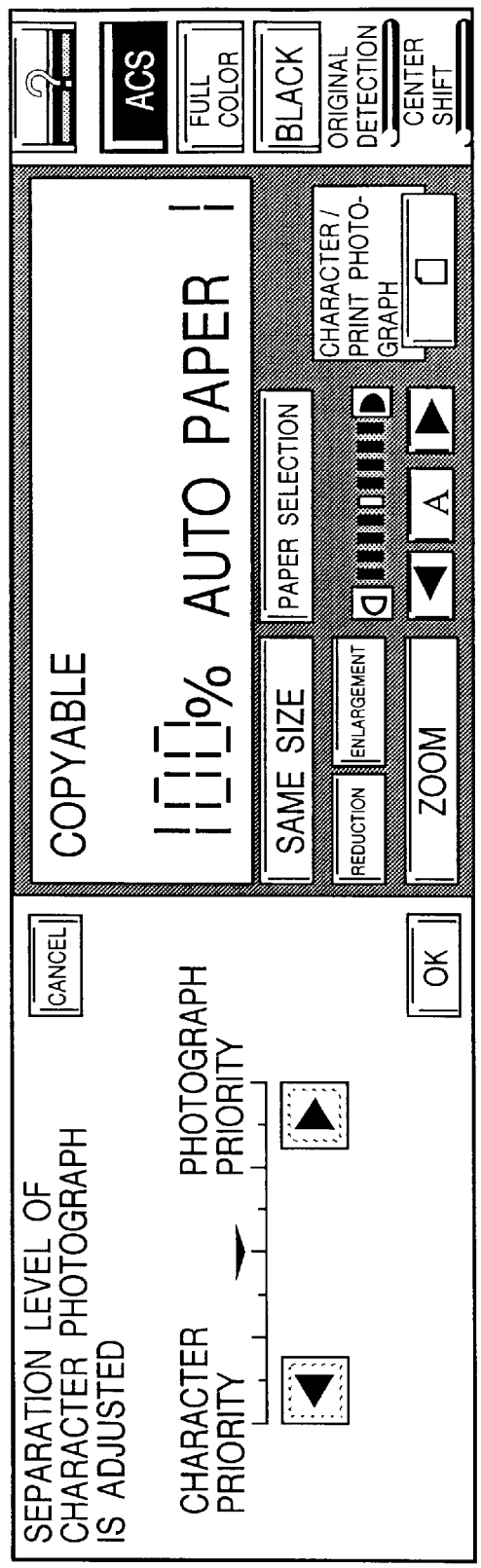
FIG. 29 is a view showing a display state for adjustment of a character/photograph separation level.
Figures 40, 40A:
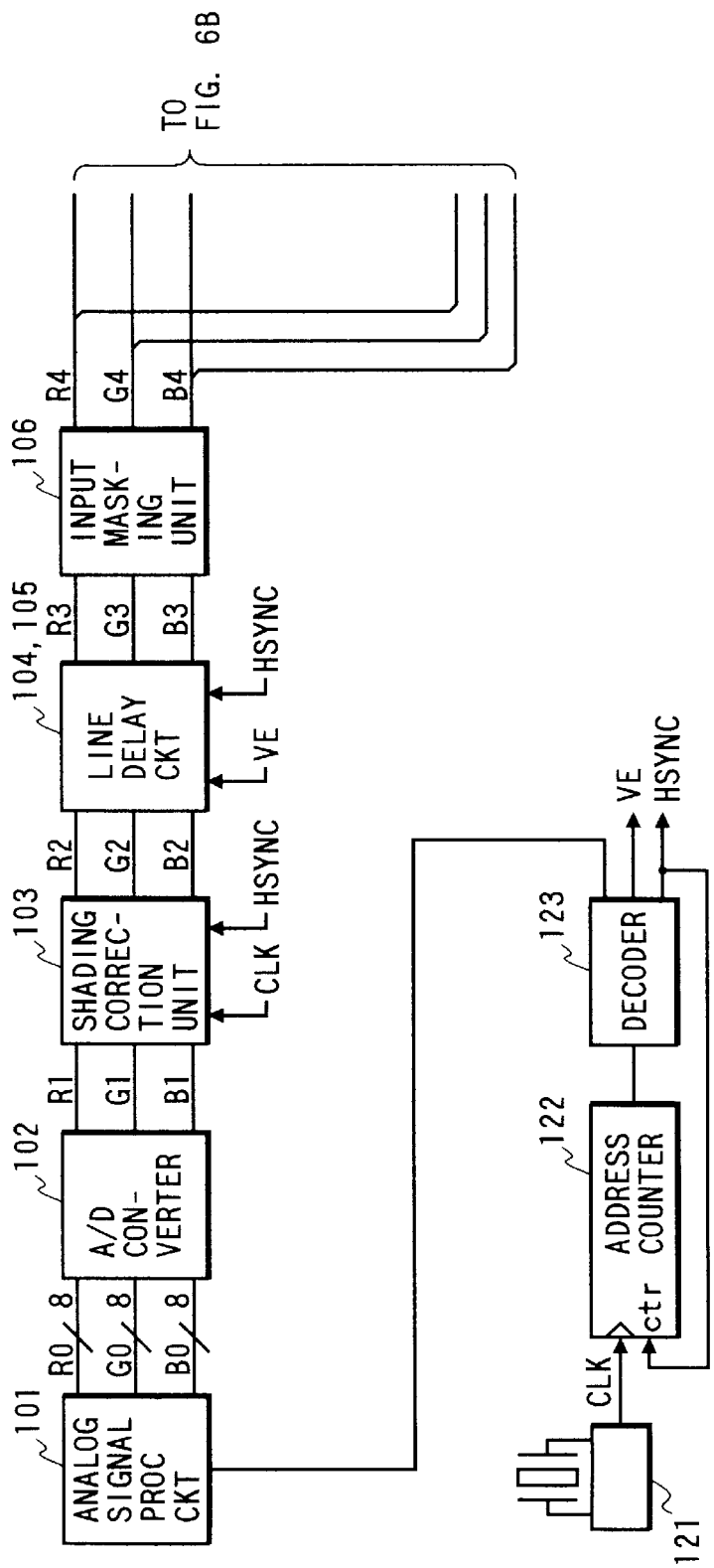
FIG. 40 is comprised of FIGS. 40A and 40B showing block diagrams for explaining the arrangement according to the second embodiment of the present invention.
Figure 40B:
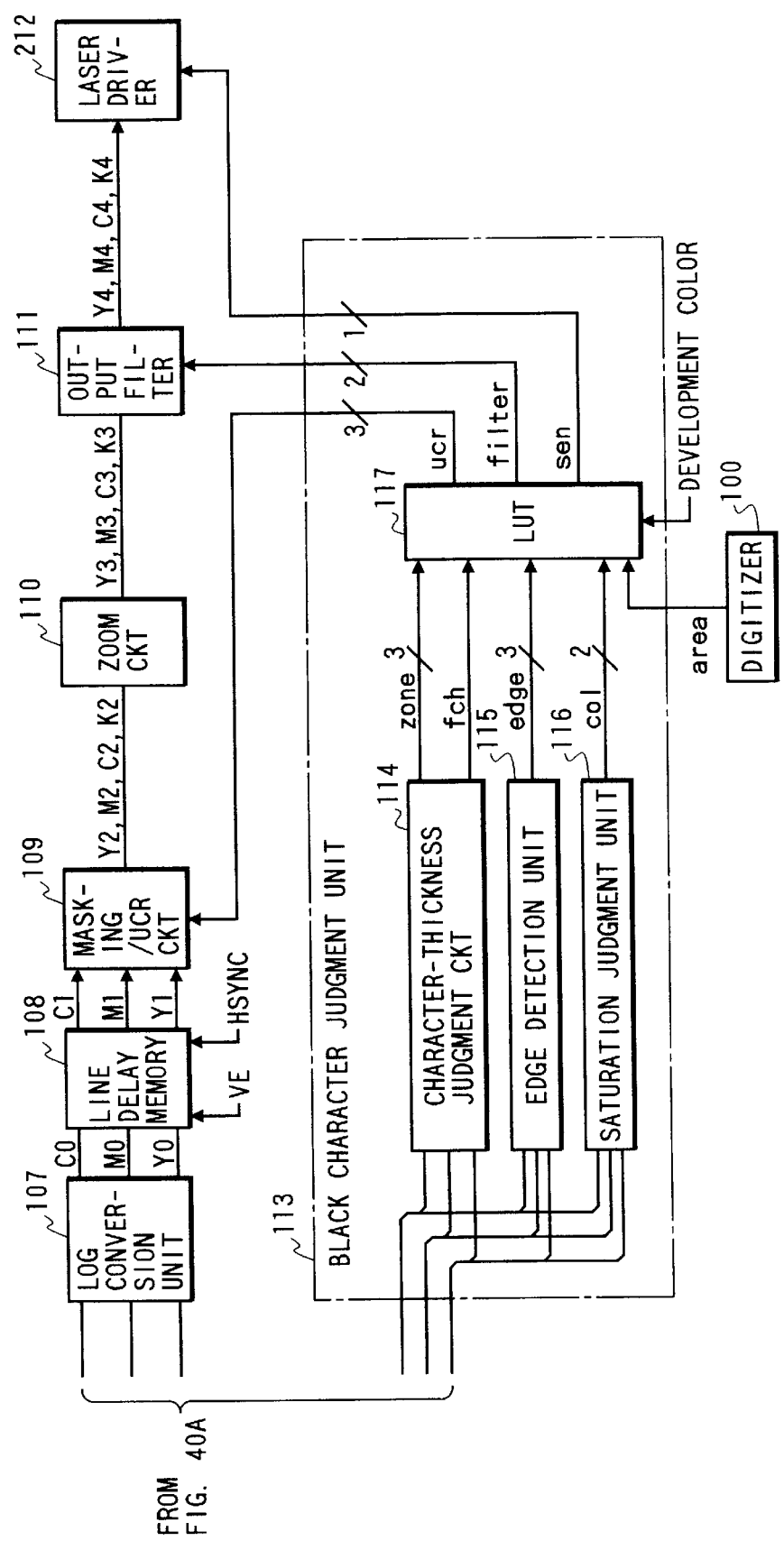
Figure 41:
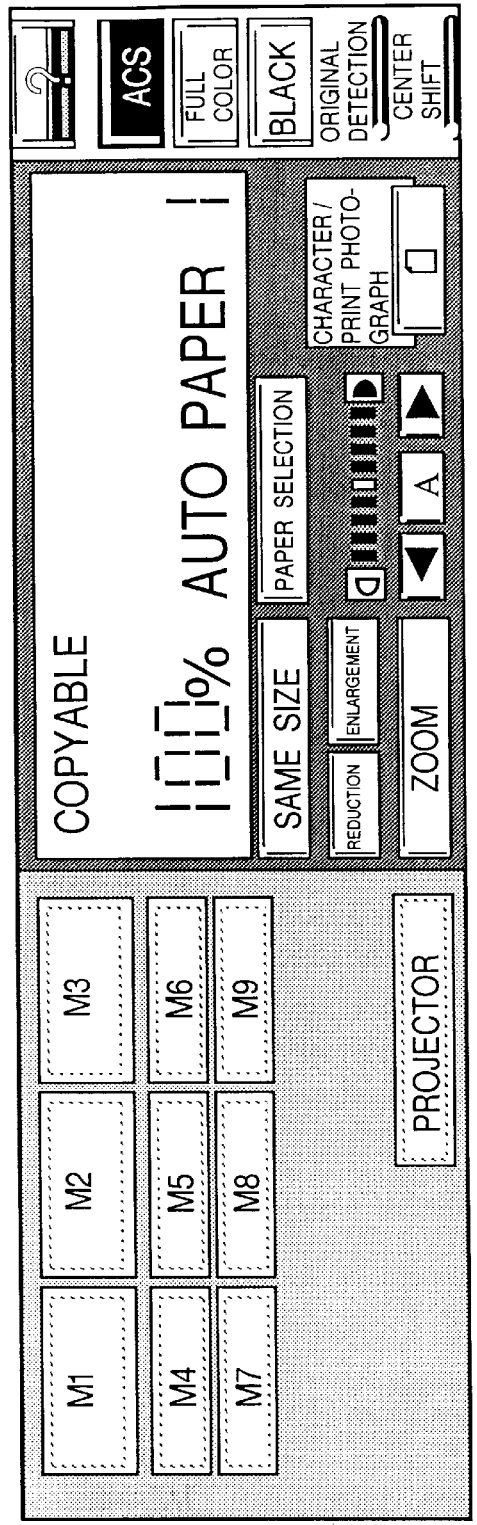
FIG. 41 is a view showing a console unit.
Figure 42:
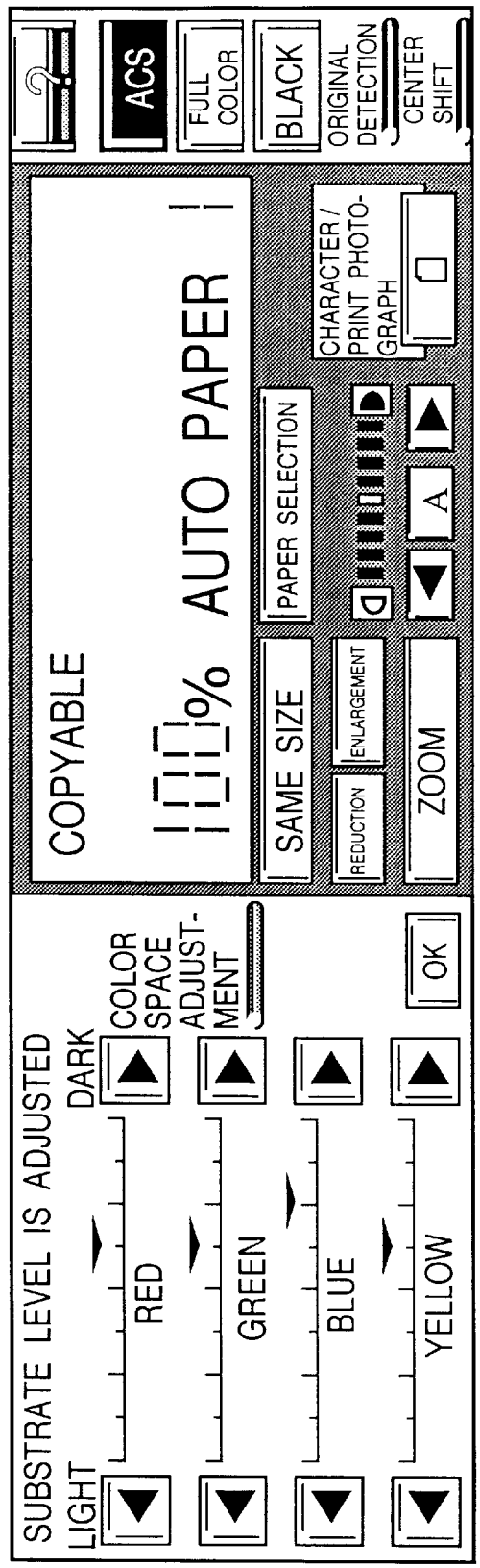
FIG. 42 is a view showing substrate level adjustment using the console unit.

A user can not only select one of the above-mentioned original modes using a console unit 101' shown in FIGS. 29 and 39 for the entire original image but also set different original modes in units of areas by setting a plurality of original mode areas on an original using a digitizer 100 as area designation means shown in FIGS. 40A and 40B. The above-mentioned mode setting operation can be realized by controlling the output from an LUT 117 by a CPU 102'.

A predetermined original mode can be set for an image portion input from the host 228 in accordance with a command supplied from the host 228. The above-mentioned mode setting operation can be-realized by controlling the output from the LUT 117 by the CPU 102'.

When a user selects the AE function using the console unit 101', a substrate color in an original image can be automatically removed. By manually inputting a UCR amount, a substrate color required by a user can be removed. Furthermore, the UCR amount for an image input from the host 228 can be designated by a command supplied from the host 228.

When the user depresses a copy start key, the copying operation is started.

In the image scanner unit 201, an original 204 which is placed on an original table glass (platen) 203 and is pressed by an original pressing plate 202 is illuminated with light emitted by a halogen lamp 205. Light reflected by the original 204 is guided by mirrors 206 and 207, and forms an image on a 3-line sensor (to be referred to as a "CCD" hereinafter) 210 via a lens 208. Note that the lens 208 is provided with an infrared cut filter 231.

The CCD 210 color-separates optical information from the original 204, and reads the red (R), green (G), and blue (B) components of full-color information. The CCD 210 supplies the read R, G, and B component signals to a signal processing unit 209. Each of color component reading sensor arrays of the CCD 210 consists of 5,000 pixels. Thus, the widthwise direction (297 mm) of an A3-size original as a maximum size of those of originals to be placed on the original table glass 203 is read at a resolution of 400 dpi.

Note that the halogen lamp 205 and the mirror 206 are mechanically moved at a velocity v and the mirror 207 is mechanically moved at a velocity (1/2)v in a direction (to be referred to as a sub-scan direction hereinafter) perpendicular to the electrical scanning direction (to be referred to as a main-scan direction hereinafter) of the line sensor 210, thereby scanning the entire surface of the original 204.

A standard white plate 211 generates correction data for data read by R, G, and B sensors 210-1 to 210-3. The standard white plate 211 has almost uniform reflection characteristics for visible light, and has a white color under the visible light. In this case, using the standard white plate 211, output data from the R, G, and B sensors 210-1 to 210-3 are corrected.

The image signal processing unit 209 selects one of the signals read by the CCD 201 and an image signal supplied from the host 228, electrically processes these signals to separate them into magenta (M), cyan (C), yellow (Y), and black (Bk) components, and supplies these color component signals to the printer unit 200. One of M, C, Y, and Bk components is supplied to the printer unit 200 per original scan in the image scanner unit 201, and a single print-out is completed by a total of four original scans.

The controller 227 supplies R, G, and B image signals in synchronism with the image formation timing of the printer unit 200 on the basis of a synchronization signal supplied from the image scanner unit 201.

In the printer unit 200, the image-processed M, C, Y, and Bk image signals are supplied to a laser driver 212. The laser driver 212 modulates and drives a semiconductor laser 213 in correspondence with the image signals. A laser beam scans the surface of a photosensitive drum 217 via a polygonal mirror 214, an f-θ lens 215, and a mirror 216.

A developer is constituted by a magenta developer 219, a cyan developer 220, a yellow developer 221, and a black developer 222. One of these four developers is alternately brought into contact with the photosensitive drum 217 to develop a corresponding one of M, C, Y, and Bk electrostatic latent images formed on the photosensitive drum 217 with a corresponding toner. A paper sheet fed from a paper feed cassette 224 or 225 is wound around a transfer drum 223, and the toner image developed on the photosensitive drum 217 is transferred onto the paper sheet.

In this manner, after toner images of four colors M, C, Y, and Bk are sequentially transferred, the paper sheet is exhausted via a fixing unit 226.

The image scanner unit 201 according to this embodiment will be described in detail below.

Figure 2:
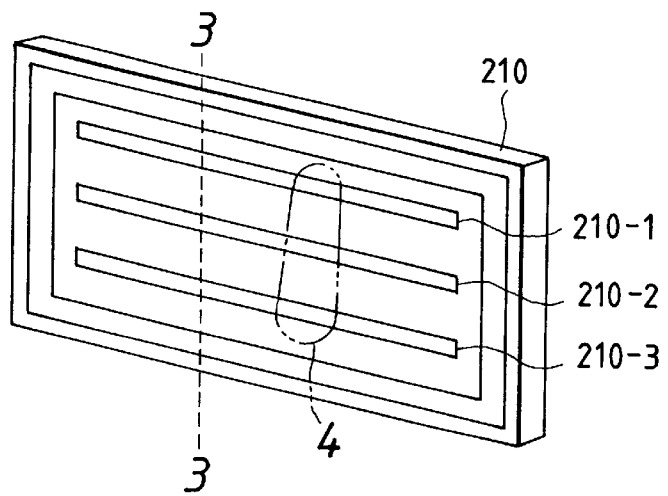
FIG. 2 is a perspective view showing the outer appearance of a CCD 210.

FIG. 2 shows the outer appearance of the CCD 210. The light-receiving element array (photosensor) 210-1 reads red light (R), and the light-receiving element arrays 210-2 and 210-3 respectively read the wavelength components of green light (G) and blue light (B). These R, G, and B sensors 210-1 to 210-3 have a 10-$\mu$m opening in the main- and sub-scan directions.

The three light-receiving element arrays having different optical characteristics adopt a monolithic structure on a single silicon chip, so that the R, G, and B sensors are arranged to be parallel to each other so as to read an identical line on an original. When the CCD with this structure is used, a common optical system such as lenses for color-separation reading can be used, thereby simplifying optical adjustment in units of R, G, and B colors.

Figure 3:
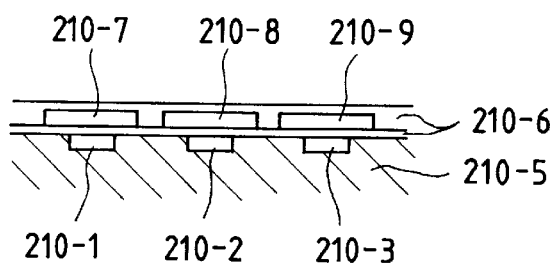
FIG. 3 is a sectional view of an image scanner unit 201 taken along a dotted line 3—3 in FIG. 2.

FIG. 3 is a sectional view showing the image scanner 201 taken along a dotted line 3—3 in FIG. 2. As shown in FIG. 3, the photosensor 210-1 for reading R color and the photosensors 210-2 and 210-3 for reading visible information of G and B are disposed on a silicon substrate 210-5.

Figure 4:
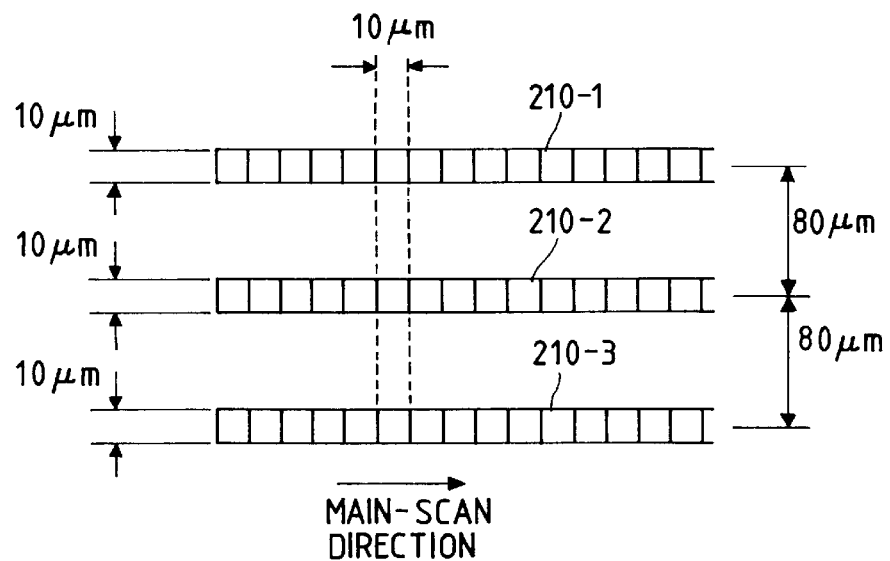
FIG. 4 is an enlarged view of light-receiving elements indicated by 4 in FIG. 2.

An R filter 210-7 for transmitting a wavelength component of R color of visible light is disposed on the R photosensor 210-1. Similarly, a G filter 210-8 is disposed on the G photosensor 210-2, and a B filter 210-9 is disposed on the B photosensor 210-3. Note that a planarizing layer 210-6 consists of a transparent organic film. FIG. 4 is an enlarged view of light-receiving elements indicated by a reference numeral 4 in FIG. 2. Each sensor has a length of 10 μm per pixel in the main-scan direction, as shown in FIG. 4. Each sensor has 5,000 pixels in the main-scan direction to be able to read the widthwise direction (length=297 mm) of an A3-size original at a resolution of 400 dpi. The distance between adjacent ones of the R, G, and B sensor lines is 80 μm, i.e., these sensors are separated by 8 lines with respect to the resolution of 400 dpi in the sub-scan direction.

The density reproduction method in the printer unit of the image processing apparatus according to this embodiment will be described below.

In this embodiment, the ON time of the semiconductor laser 213 is controlled in accordance with an image density signal by the well-known PWM (pulse-width modulation) method so as to attain density reproduction of the printer. Thus, an electrostatic latent image with a potential corresponding to the ON time of the laser is formed on the photosensitive drum 217. By developing the latent image with a toner in an amount corresponding to the potential of the electrostatic latent image by the developers 219 to 222, density reproduction is attained.

Figure 5:
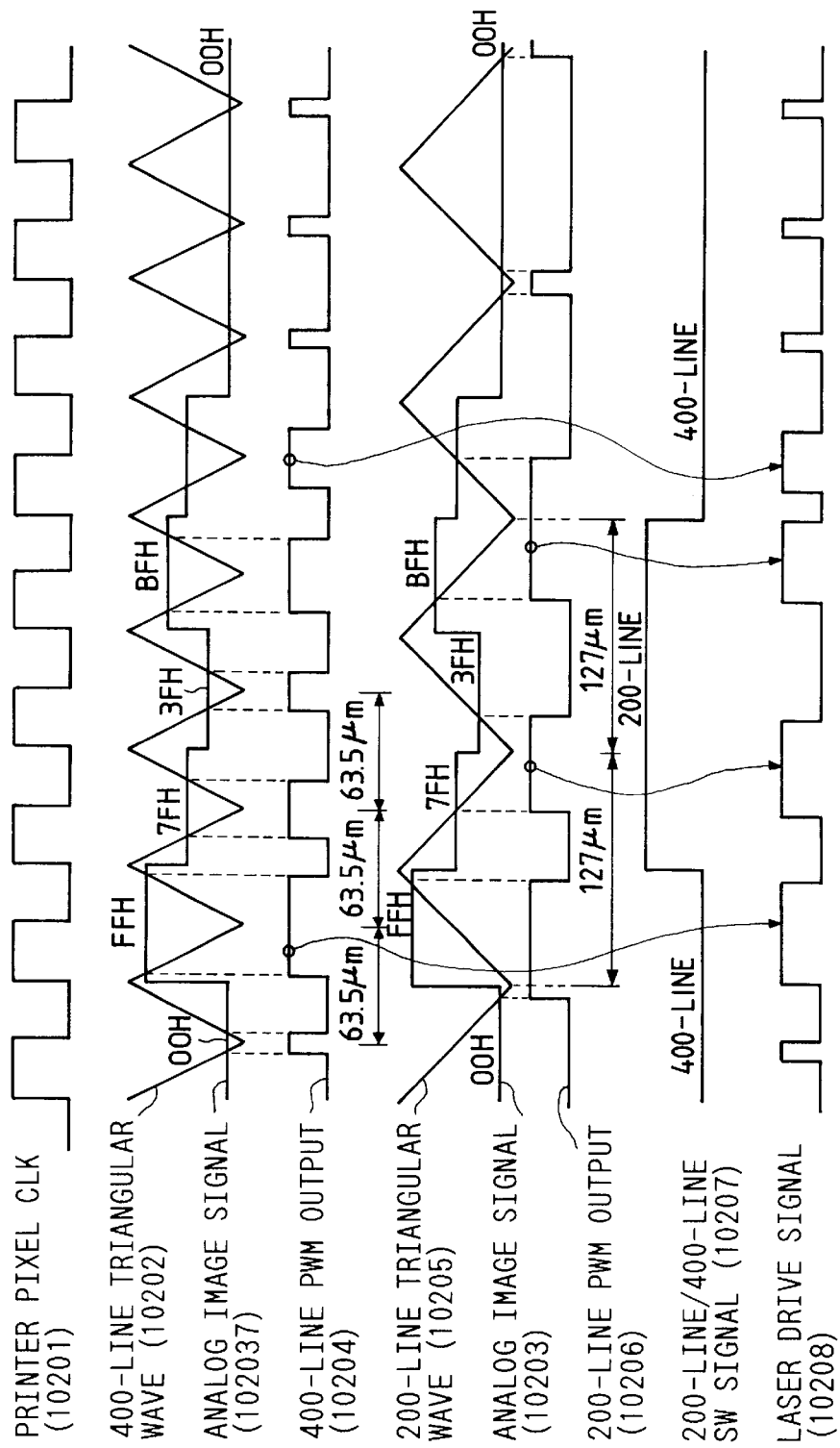
FIG. 5 is a timing chart showing the control operation of density reproduction in a printer unit according to the first embodiment.

FIG. 5 is a timing chart showing the density reproduction control operation in the printer unit according to this embodiment. Printer pixel clocks 10201 correspond to the resolution of 400 dpi (dots per inch). Note that these clocks are generated by the laser driver 212. A 400-line (lines per inch) triangular wave 10202 is generated in synchronism with the printer pixel clocks 10201. Note that the period of the 400-line triangular wave 10202 is the same as that of the pixel clocks 10201.

M, C, Y, and Bk 256-gradation (8-bit) image data at a resolution of 400 dpi, and a 200-line/400-line switching signal, which are supplied from the image signal processing unit 209, are transmitted in synchronism with the above-mentioned CLOCK signal. In this case, these data and the signal are synchronized with the printer pixel clocks 10201 by the laser driver 212 using a FIFO memory (not shown). The 8-bit image data is converted into an analog image signal 10203 by a D/A converter (not shown). The analog image signal is compared with the above-mentioned 400-line triangular wave 10202 in an analog manner, thereby generating a 400-line PWM output 10204.

Digital pixel data changes from OOH (H represents hexadecimal) to FFH, and the 400-line PWM output 10204 has a pulse width corresponding to these values. One period of the 400-line PWM output is 63.5 μm on the photosensitive drum.

The laser driver 212 also generates a 200-line triangular wave 10205 having a period twice that of the 400-line triangular wave in synchronism with the printer pixel clocks 10201 in addition to the 400-line triangular wave. By comparing the 200-line triangular wave 10205 and the 400-dpi analog image signal 10203, a 200-line PWM output signal 10206 is generated. The 200-line PWM output 10206 forms a latent image on the photosensitive drum at a period of 127 μm, as shown in FIG. 5.

Upon comparison between 200- and 400-line density reproductions, the 200-line density reproduction has high gradation reproducibility since its minimum unit for density reproduction is 127 μm, i.e., twice that of 400-line density reproduction. However, in terms of the resolution, the 400-line density reproduction which reproduces a density in units of 63.5 μm is suitable for high-resolution image recording. In this manner, the 200-line PWM recording is suitable for gradation reproduction, and the 400-line PWM recording is superior to the 200-line recording in terms of the resolution. For this reason, the 200- and 400-line PWM recording modes are switched depending on the nature of an image.

The signal for attaining the above-mentioned switching is a 200-line/400-line switching signal 10207 shown in FIG. 5, and is input from the image signal processing unit 209 to the laser driver 212 in units of pixels in synchronism with a 400-dpi image signal. When the 200-line/400-line switching signal is logically Low (to be referred to as L level hereinafter), a 400-line PWM output is selected; when the signal is logically High (to be referred to as H level hereinafter), a 200-line PWM output is selected.

The image signal processing unit 209 will be described below.

Figure 6B:
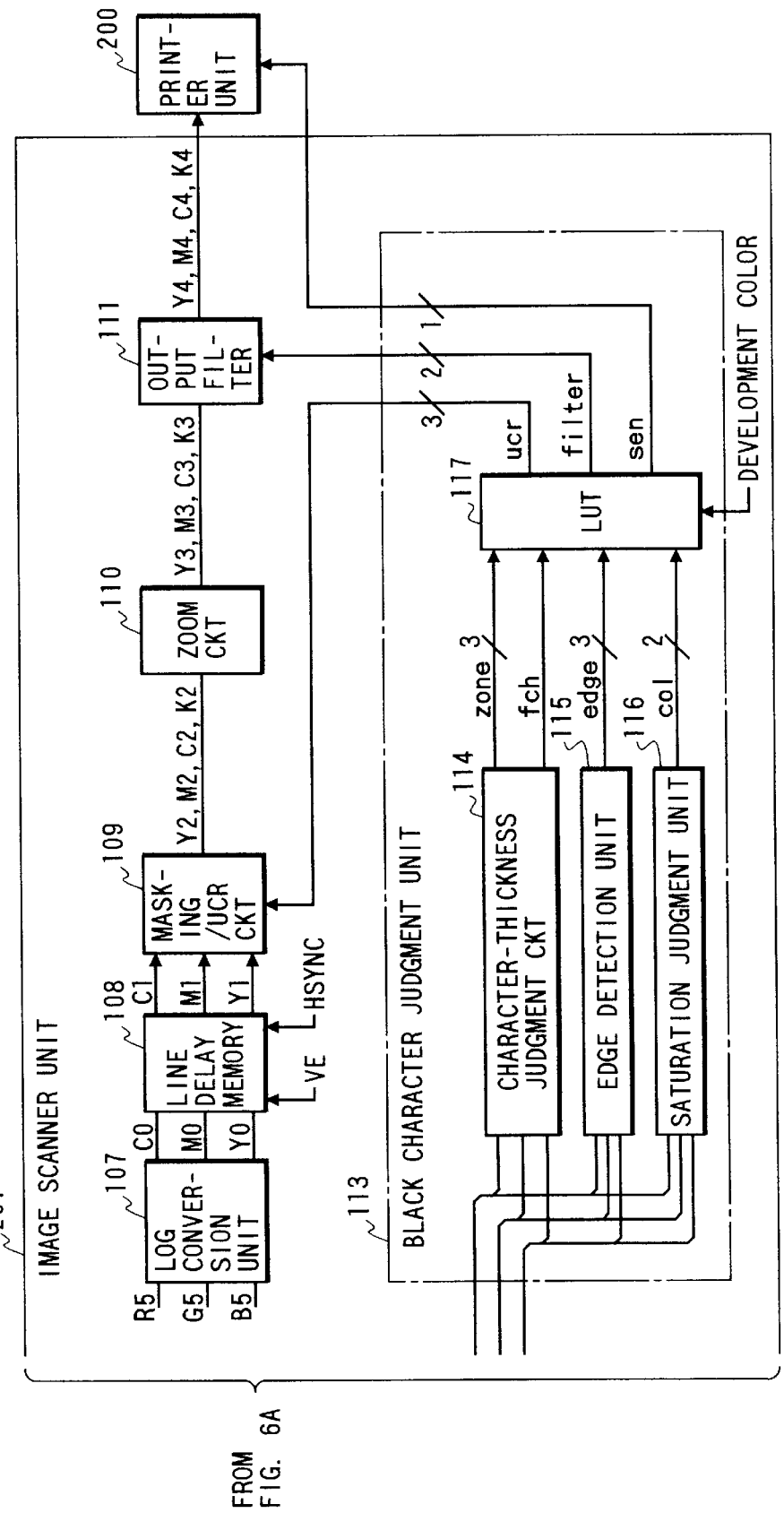
FIG. 6 is comprised of FIGS. 6A and 6B showing block diagrams of the flow of an image signal in an image signal processor 209 in the image scanner unit 201 according to the first embodiment.

FIGS. 6A and 6B are block diagrams showing the flow of an image signal in the image signal processing unit 209 in the image scanner unit 201 according to this embodiment.

The image scanner unit 201 and the controller 227 are connected via transmission lines 229 to 231 for transmitting R, G, and B image signals, and a transmission line 232 for transmitting command data, a timing signal, and the like. The host 228 and the controller 227 are connected via an interface 233 such as a SCSI or GPIB interface. Command data from the host 228 is transmitted to the CPU 102' via the controller 227.

As shown in FIGS. 6A and 6B, image signals output from the CCD 210 are input to an analog signal processing circuit 101, and are subjected to gain adjustment and offset adjustment. Thereafter, the image signals are converted by an A/D converter 102 into 8-bit digital image signals R1, G1, and B1 in units of color signals. Thereafter, the digital image signals are input to a shading correction unit 103, and are subjected to known shading correction in units of colors using a signal obtained by reading the standard white plate 211.

A clock generator 121 generates clocks in units of pixels. A main-scan address counter 122 counts clocks generated by the clock generator 121, and generates a pixel address output for one line. A decoder 123 decodes the main-scan addresses from the main-scan address counter 122, and generates CCD drive signals such as shift pulses, reset pulses, and the like in units of lines, a VE signal representing an effective area in a 1-line reading signal from the CCD, and a line synchronization signal HSYNC. Note that the main-scan address counter 122 is cleared in response to the signal HSYNC, and starts counting of the main-scan addresses of the next line.

Since the light-receiving units 210-1, 210-2, and 210-3 of the CCD 210 are disposed to be separated from each other by the predetermined distances, as shown in FIG. 2, spatial shifts in the sub-scan direction are corrected using line delay circuits 104 and 105-in FIGS. 6A and 6B. More specifically, R and G signals are line-delayed in the sub-scan direction with respect to the B signal to adjust the R and G signals to the B signal.

An input masking unit 106 converts a reading color space determined by the spectral characteristics of the R, G, and B filters 210-7, 210-8, and 210-9 of the CCD 210 into an NTSC standard color space, and performs a matrix calculation given by an equation below:

$$\begin{bmatrix} R4 \\ G4 \\ B4 \end{bmatrix} = \begin{bmatrix} a11 & a12 & a13 \\ a21 & a22 & a23 \\ a31 & a32 & a33 \end{bmatrix} \begin{bmatrix} R3 \\ G3 \\ B3 \end{bmatrix} \quad (1)$$

An image signal switching unit 1064 switches output signals between signals R4, G4, and B4 (representing a scanner image) supplied from the image scanner unit and image signals Rif, Gif, and Bif (representing a host image) supplied from the host 228 via the controller 227 on the basis of a control signal tit supplied from the host 228.

Figure 43:
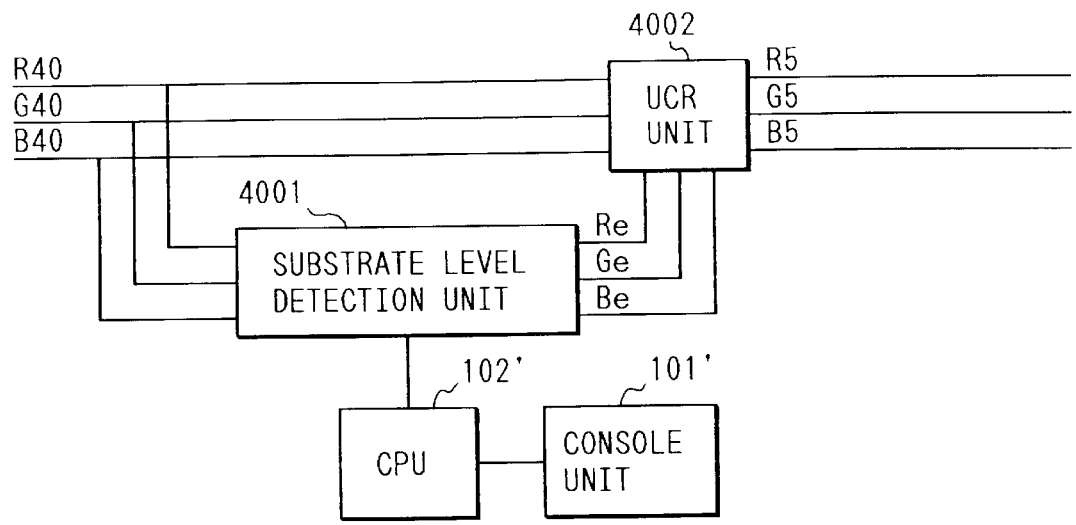
FIG. 43 is a block diagram showing the arrangement of a UCR unit.

A UCR unit 1065 detects and removes the substrate components of image signals R40, G40, and B40. FIG. 43 shows the arrangement of the UCR unit.

Referring to FIG. 43, when an AE mode signal for removing substrate components is input from the console unit 101', a substrate level detection unit 4001 samples an original image upon prescanning of the image scanner unit 201 to generate the density histograms of the signals R40, G40, and B40.

Figure 44:
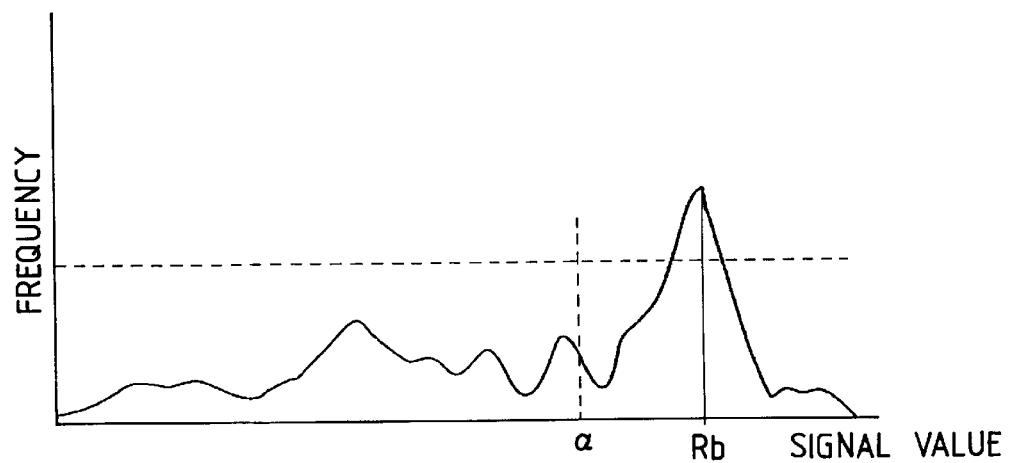
FIG. 44 is a graph for explaining the substrate detection.

From the obtained histograms, values having the highest levels are selected from signal levels which correspond to signal values equal to or larger than a predetermined value a and have frequencies larger than a predetermined ratio, and are respectively determined as Rb, Gb, and Bb. FIG. 44 shows an example of the histogram for obtaining Rb. More specifically, in the case of R, the substrate level is obtained from the histogram shown in FIG. 44.

The substrate level signals Rb, Gb, and Bb obtained by the substrate level detection unit 4001 are converted into signals Re, Ge, and Be using equations below, and the signals Re, Ge, and Be are input to a UCR unit 4002:

$Re=(255-Rb)*255*255/(RbGbBb)$ $Ge=(255-Gb)*255*255/(RbGbBb)$ $Be=(255-Bb)*255*255/(RbGbBb)$

The UCR unit 4002 performs arithmetic processing using an equation below to remove substrate components, and outputs signals R5, G5, and B5. Re, Ge, and Be required for the arithmetic processing are input from the substrate level detection unit 4001 upon prescanning.

$$\begin{pmatrix} R5 \\ G5 \\ B5 \end{pmatrix} = \begin{pmatrix} 100 & Re \\ 010 & Ge \\ 001 & Be \end{pmatrix} \begin{pmatrix} R4 \\ G4 \\ B4 \\ R4G4B4 \end{pmatrix}$$

When a user manually inputs a substrate level adjustment key on the console unit 101', adjustment level signals are input to the substrate level detection unit 4001. The substrate level detection unit 4001 outputs values, which are prepared in advance in correspondence with the input levels, to the UCR unit 4002 as the signals Re, Ge, and Be.

Note that the detection processing operation of the substrate level detection unit 4001 may be attained in a software manner by an arithmetic operation, based on the program, of the CPU 102'.

When a user wants to cancel UCR processing for an image supplied from the host 228, a UCR OFF (AE mode cancel) command is supplied from the host 228, thereby canceling the UCR processing.

On the other hand, when the user wants to apply the UCR processing for an image supplied from the host 228, an AE command is supplied from the host 228. When the AE command is supplied, the host 228 supplies image signals corresponding to the above-mentioned prescanned image, and the UCR unit 1065 obtains the substrate level signals Rb, Gb, and BB, and the signals Re, Ge, and Be. Thereafter, when the host 228 transmits image signals, image processing including the AE processing is performed for the image signals from the host 228. Furthermore, when a substrate level adjustment command is supplied from the host 228, the UCR processing for an image from the host 228 can be manually adjusted.

Whether or not the UCR processing is performed for an image from the host 228 can be automatically discriminated by the controller 227 or can be manually selected at the host 228 depending on, e.g., whether the host image is a document or pictorial image.

On the other hand, when a scanner image and a host image are to be synthesized in one frame, even when the AE mode is enabled for the scanner image at the main body side, the AE mode is automatically canceled by a command supplied from the host 228.

However, when the host image is a document, the AE mode canceling operation may be disabled. In this case, an operation corresponding to the above-mentioned prescanning operation is performed for a host image, substrate detection is performed for a scanner image, and thereafter, the UCR processing may be performed for these images using different parameters in units of areas.

Areas to be synthesized may be designated from the host 228 side or using the digitizer 100 shown in FIGS. 40A and 40B.

A light amount/density conversion unit (LOG conversion unit) 107 comprises a look-up table ROM, and converts luminance signals R5, G5, and B5 into density signals CO, MO, and YO. A line delay memory 108 delays the image signals CO, MO, and YO by a line delay amount required until a black character judgment unit 113 generates judgment signals UCR, FILTER, SEN, and the like on the basis of the signals R5, G5, and B5. As a result, image signals C1, M1, and Y1 and the signal UCR of the black character judgment signals for an identical pixel are simultaneously input to a masking/UCR circuit 109.

The masking/UCR circuit 109 extracts a black signal (Bk) from the input three primary signals Y1, M1, and C1, and performs calculations for correcting any color muddiness of recording color agents in the printer unit 200. Then, the circuit 109 frame-sequentially outputs signals Y2, M2, C2, and Bk2 each having a predetermined number of bits (8 bits) every time the image scanner unit 201 performs a reading operation. Since this embodiment uses the printer for frame-sequentially forming images, the controller outputs the same image data from the host 228 a plurality of number of times in synchronism with the image formation by the printer unit 200.

A main-scan zoom circuit 110 performs enlargement/reduction processing, in the main-scan direction, of the image signals and the black character judgment signals by known interpolation calculations. A spatial filter processing unit (output filter) 111 switches the processing mode between edge emphasis and smoothing processing on the basis of a 2-bit signal FILTER supplied from an LUT 117, as will be described later.

The frame-sequential image signals M4, C4, Y4, and Bk4 processed as described above and a signal SEN as a 200-line/400-line switching signal are supplied to the laser driver 212, and the printer unit 200 performs PWM density recording.

Figure 7:
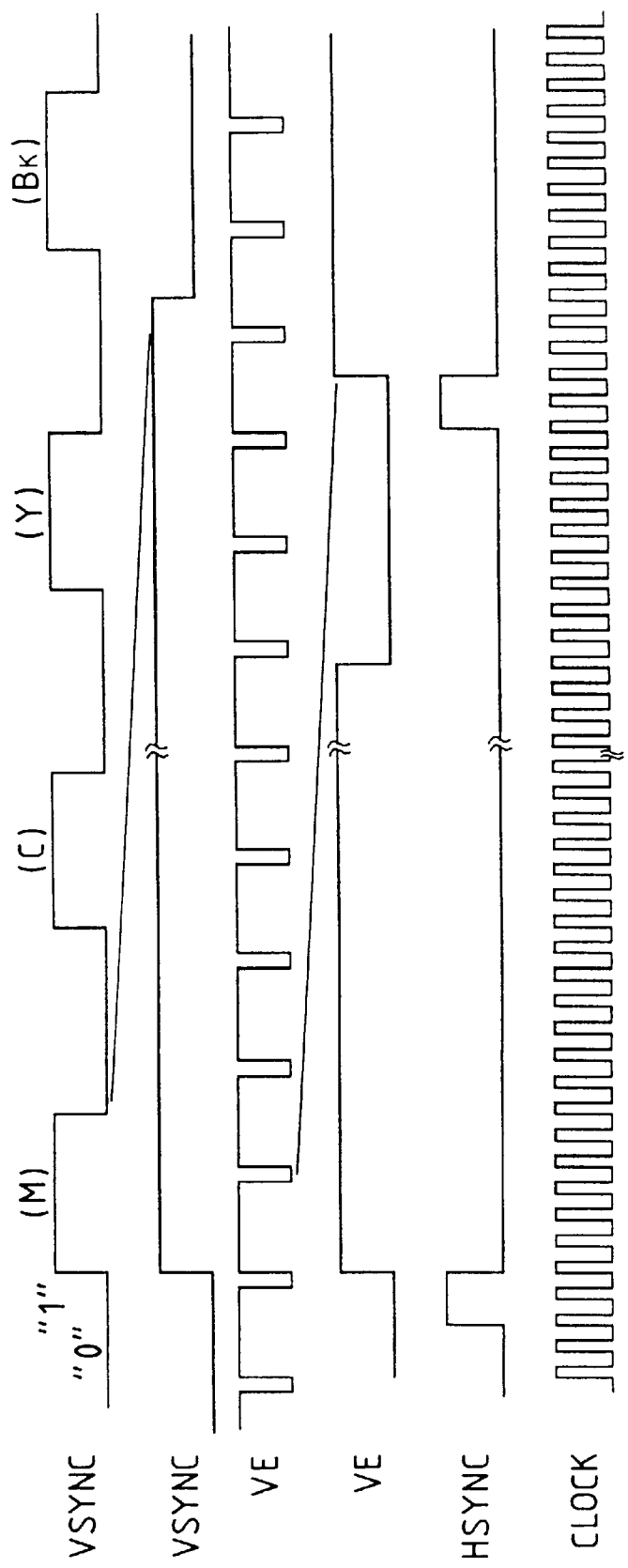
FIG. 7 is a timing chart showing the respective control signals in the image signal processor 209 shown in FIGS. 6A and 6B.

FIG. 7 shows the timings of the respective control signals in the image signal processing unit 209 shown in FIGS. 6A and 6B. Referring to FIG. 7, a signal VSYNC is an image valid period signal in the sub-scan direction. During a period of logic "1" of this signal, an image reading (scanning) operation is performed, and output signals (M), (C), (Y), and (Bk) are sequentially formed. A signal VE is an image valid period signal in the main-scan direction. This signal is used for defining the timing of the main-scan start position during a period of logic "1", and is mainly used in line count control for line delay processing. A signal CLOCK is a pixel synchronization signal, and is used for transferring image data at rise timing of "0"→"1" to supply data to the respective signal processing units such as the A/D converter 102, the black character judgment unit 113, and the like, and to transmit image signals and the 200-line/400-line switching signal to the laser driver 212.

In the above-mentioned arrangement, the CPU 201' controls the respective processing units, and determines a judgment standard of area judgment for black character processing (to be described later).

The black character processing based on area separation executed when the original mode is the character mode, character/print photograph mode, or character/photographic printing paper photograph mode will be described below.
(Description of Edge Detection Unit)

As described above, the signals R4, G4, and B4 which are masking-converted by the input masking unit 106, are input to an edge detection unit 115 in the black character judgment unit 113, and a luminance signal Y is calculated from these signals in accordance with an equation below. Note that FIG. 8 is a block diagram showing the internal arrangement of the edge detection unit 115, and FIG. 9 is a diagram showing the detailed arrangement of a luminance calculation circuit 250.

$$Y=0.25R+0.5G+0.25B \quad (2)$$

Referring to FIG. 9, input color signals R, G, and B are respectively multiplied with coefficients 0.25, 0.5, and 0.25 by multipliers 301, 302, and 303, and are then added by adders 304 and 305, thus calculating the luminance signal Y in accordance with equation (2) above.

Figure 10:
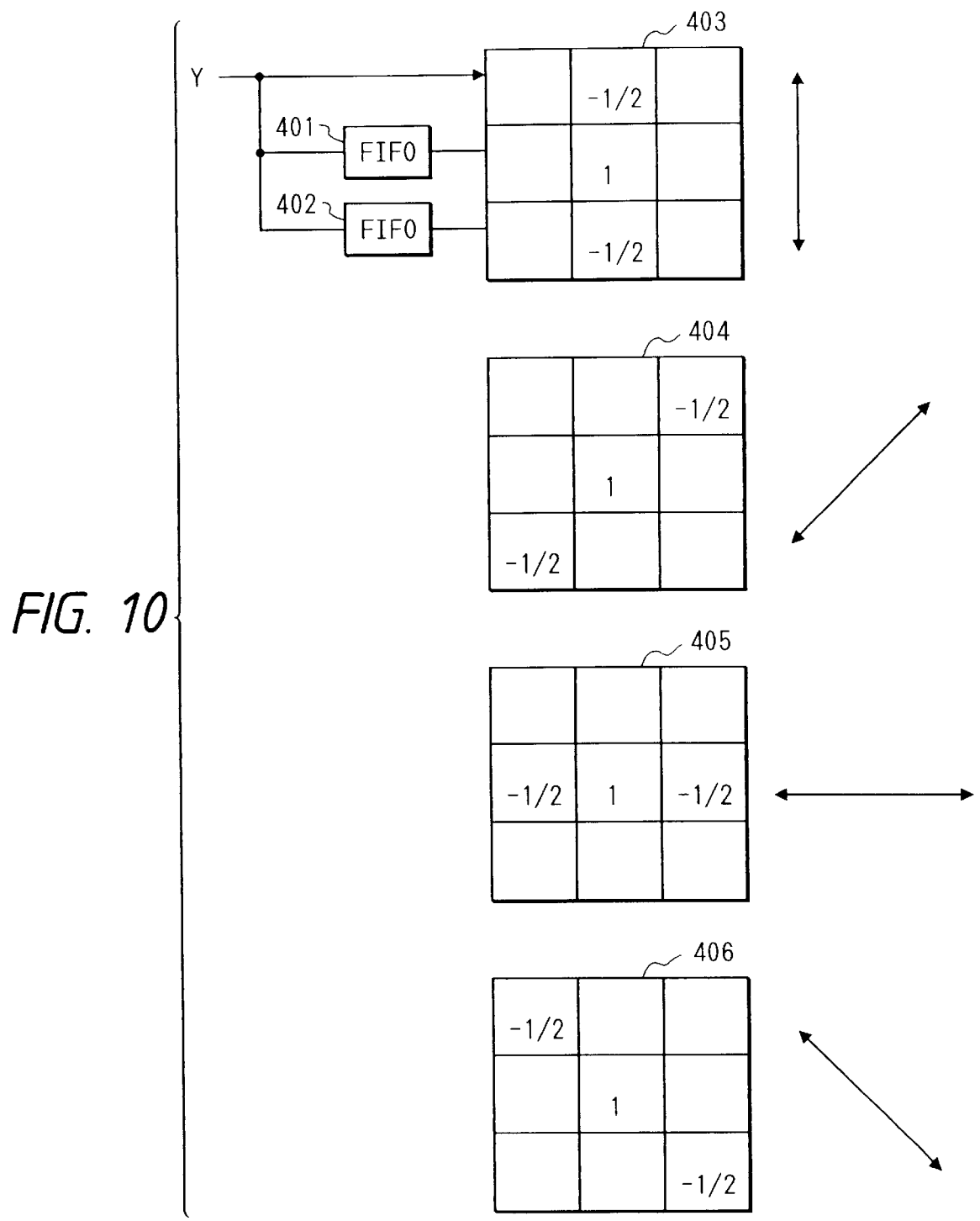
FIG. 10 is a view showing the line delay state attained by FIFOs and a Laplacian filter.

The luminance signal Y is delayed by one line by FIFOs 401 and 402 shown in FIG. 10, and is expanded to signals for three lines. Then, these signals are filtered by known Laplacian filters 403 to 406. Of the four directions shown in FIG. 10, a direction in which the absolute value, a, of the edge amount as the output from the filter assumes a minimum value is obtained, and this direction is determined as an edge min direction. This operation is performed by an edge min-direction detection unit 251 shown in FIG. 8.

Then, an edge min-direction smoothing unit 252 performs smoothing processing in the edge min direction detected by the edge min-direction detection unit 251. With this processing, only a direction corresponding to the largest edge component is preserved, and other directions can be smoothed.

More specifically, the following effect is obtained. That is, upon the above-mentioned processing, the feature of screen components including large edge components in a plurality of directions decreases since the edge components are smoothed while the feature of a character/thin line including edge components in only one direction is preserved. By repeating this processing as needed, line components and screen components can be separated more effectively, and a character component present in a screen area, which cannot be detected by a conventional edge detection method, can be detected.

Thereafter, an edge detection unit 253 shown in FIG. 8 removes signals equal to or smaller than an appropriate threshold value th_edge1, which is set in the edge detection unit 253 via the CPU 102', from signals directly input from a luminance calculation circuit 250 to the edge detection unit 253, and outputs signals larger than th_edge1 as signals of logic "1". Furthermore, the signals input via the edge min-direction smoothing unit 252 are filtered by the above-mentioned Laplacian filters, and the absolute value of the edge amount is compared with a threshold value th_edge2, which is set in the edge detection unit 253 via the CPU 102', thus coding the output value in accordance with a given rule (to be described later). In this manner, edges having two different natures are selectively used. For characters in a white background or substrate, edge detection is performed using edges which do not pass the edge min-direction smoothing unit, thus detecting edges up to fine details of characters. On the contrary, for characters in a screen area, edge detection is performed using edges which pass the edge min-direction smoothing unit, thus detecting only characters and lines without detecting screen components.

Note that threshold values th_edge1(h) and th_edge2(h) used for a host image are respectively larger than threshold values th_edge1(s) and th_edge2(s) used for a scanner image. Since a host image has good MTF, proper detection can be attained even when a strict edge judgment standard is set.

Figure 11B:
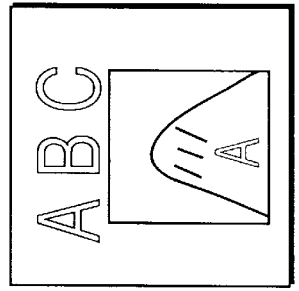
FIGS. 11A and 11B are views showing an example of edge detection.
Figure 11A:
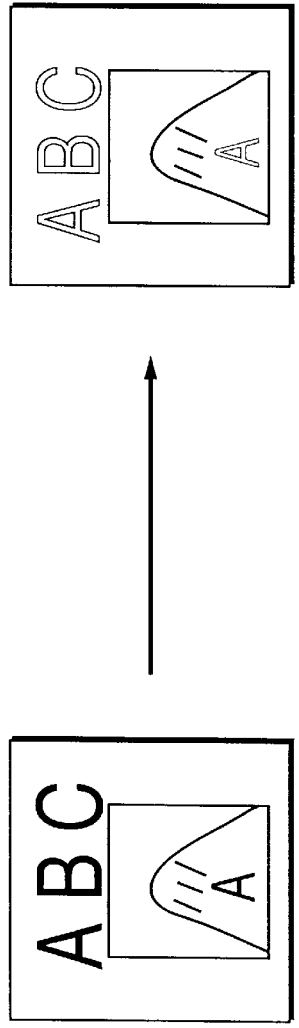

Note that FIGS. 11A and 11B show an example of edge detection. That is, an edge detection signal (FIG. 11B) is generated from image data (FIG. 11A) associated with luminance data Y.

In the edge detection unit 115, furthermore, a signal expressed by seven codes as a combination of signals obtained by expanding judgment results, using th_edge, of the above-mentioned judgment signals in 7×7, 5×5, and 3×3 block sizes, judgment results without expansion, and a signal judged by th_edge2 is output as an output signal "edge" (3 bits). Note that the expansion of the signal means logical ORing of signals of all the pixels in a block.
(Description of Saturation Judgment Unit)

Figure 12:
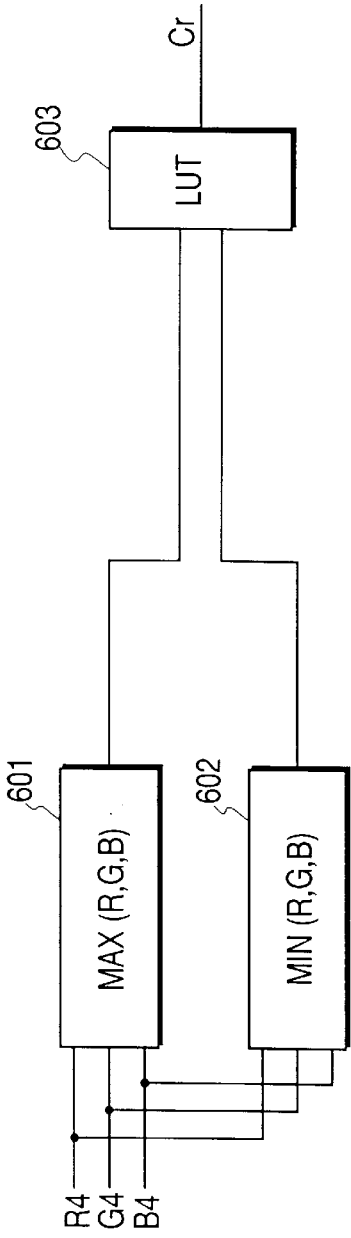
FIG. 12 is a block diagram showing the detailed arrangement of a saturation judgment unit 116 constituting a black character judgment unit 113.

FIG. 12 is a block diagram showing the detailed arrangement of a saturation judgment unit 116 constituting the black character judgment unit 113. In this unit, maximum and minimum value detection units 601 and 602 respectively extract a maximum value max(R,G,B) and a minimum value min(R,G,B) from input color signals R4, G4, and B5. An LUT (look-up table) 603 generates a saturation signal Cr using threshold values Cr_BK, Cr_COL, and Cr_W for dividing data into areas shown in FIG. 13.

Figure 13A:
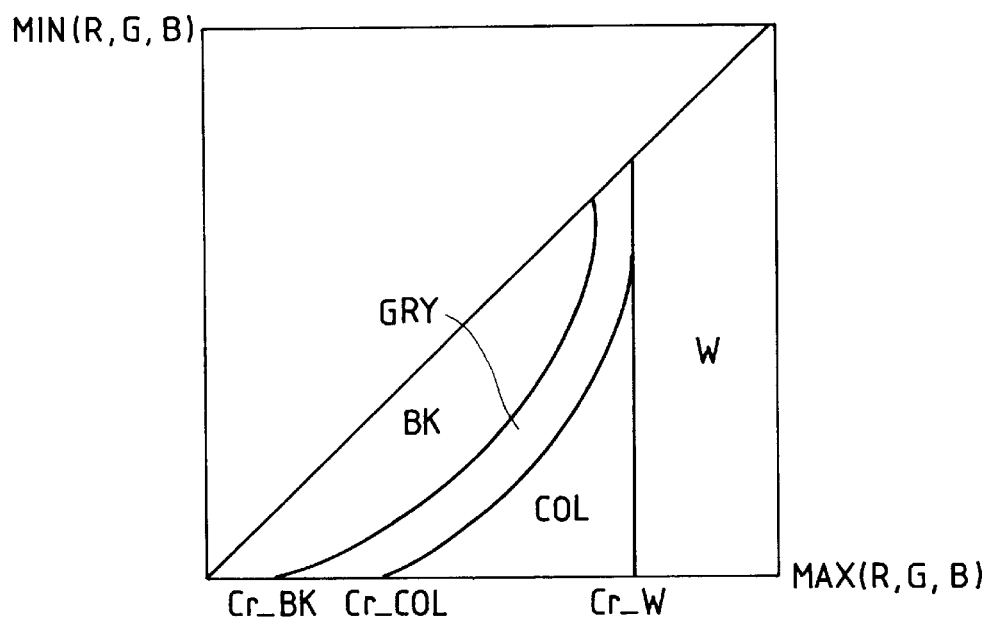
FIGS. 13A and 13B are graphs showing the data conversion characteristics of an LUT.
Figure 13B:
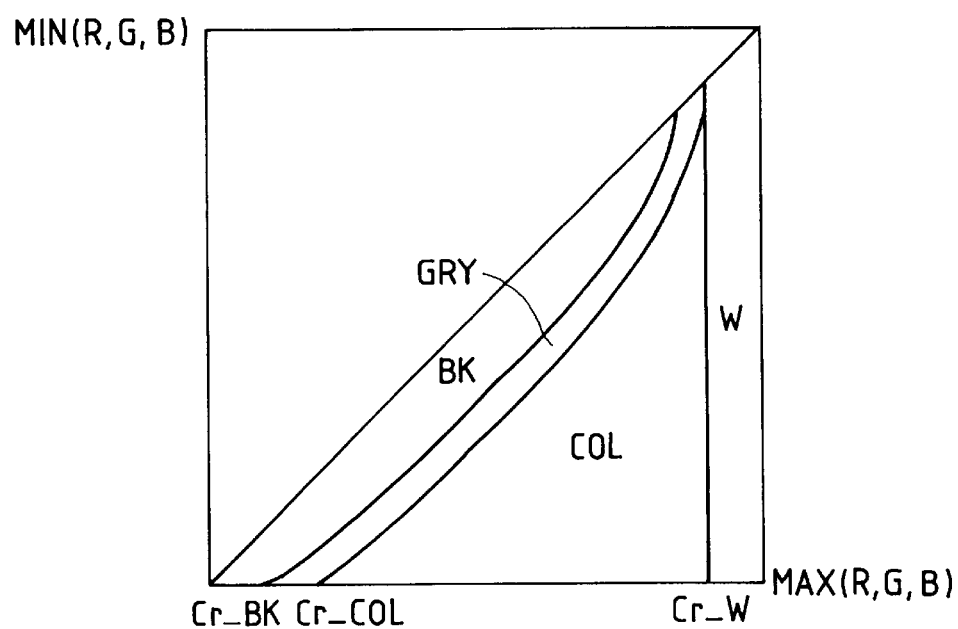

Note that an output signal "col" from the saturation judgment unit 116 shown in FIG. 6B represents black by a 2-bit code when data falls within an area Bk shown in FIGS. 13A and 13B; an intermediate color (a color between a given color and black) when data falls within an area GRAY; and white when data falls within an area W.

FIG. 13A shows an LUT for a scanner image, and FIG. 13B shows an LUT for a host image. In the table shown in FIG. 13B, the values Cr_BK and Cr_COL are smaller than those in the table in FIG. 13A, and the value Cr_W is larger than that in FIG. 13A. Thus, the areas Bk, GRY, and W in FIG. 13B are smaller than those in FIG. 13A. This is because the host image need not take reading characteristics into account unlike in the scanner image. Thus, in the case of the host image, colors other than black, e.g., light colors can be satisfactorily reproduced.
(Description of Character-thickness Judgment Unit)

Figure 14:
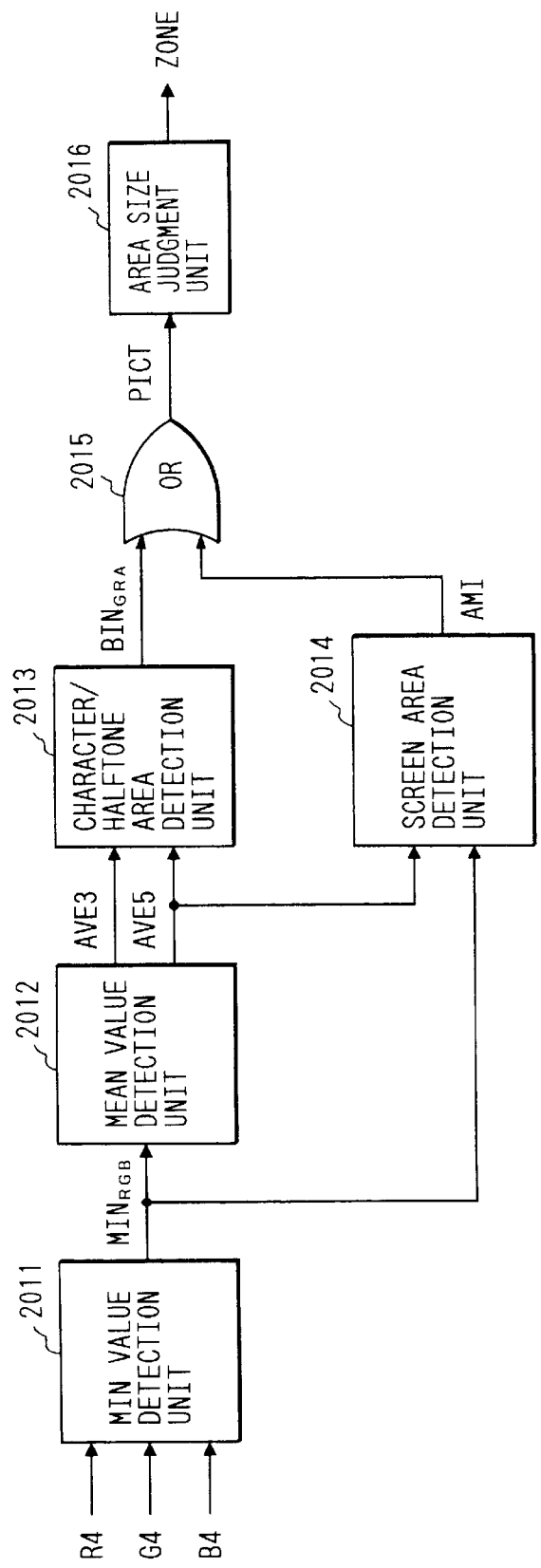
FIG. 14 is a block diagram showing the arrangement of the character-thickness judgment circuit 114 constituting the black character judgment unit 113.

FIG. 14 is a block diagram showing the arrangement of a character-thickness judgment circuit 114 constituting the black character judgment unit 113.

Referring to FIG. 14, a red signal R4, a green signal G4, and a blue signal B4 as outputs from the input masking unit 106 are input to a minimum value detection unit 2011. The minimum value detection unit 2011 calculates a minimum value $MIN_{RGB}$ of the input R, G, and B signals. The value $MIN_{RGB}$ is input to a mean value detection unit 2012, and calculates a mean value AVE5 of the values $MIN_{RGB}$ of 5 pixels×5 pixels around a target pixel, and a mean value AVE3 of the values $MIN_{RGB}$ of 3 pixels×3 pixels around the target pixel.

The values AVE5 and AVE3 are input to a character/halftone area detection unit 2013. The unit 2013 judges if the target pixel is a portion of a character or halftone area by detecting the density of the target pixel and the change amount between the density of the target pixel and the mean density of surrounding pixels in units of pixels.

Figure 15:
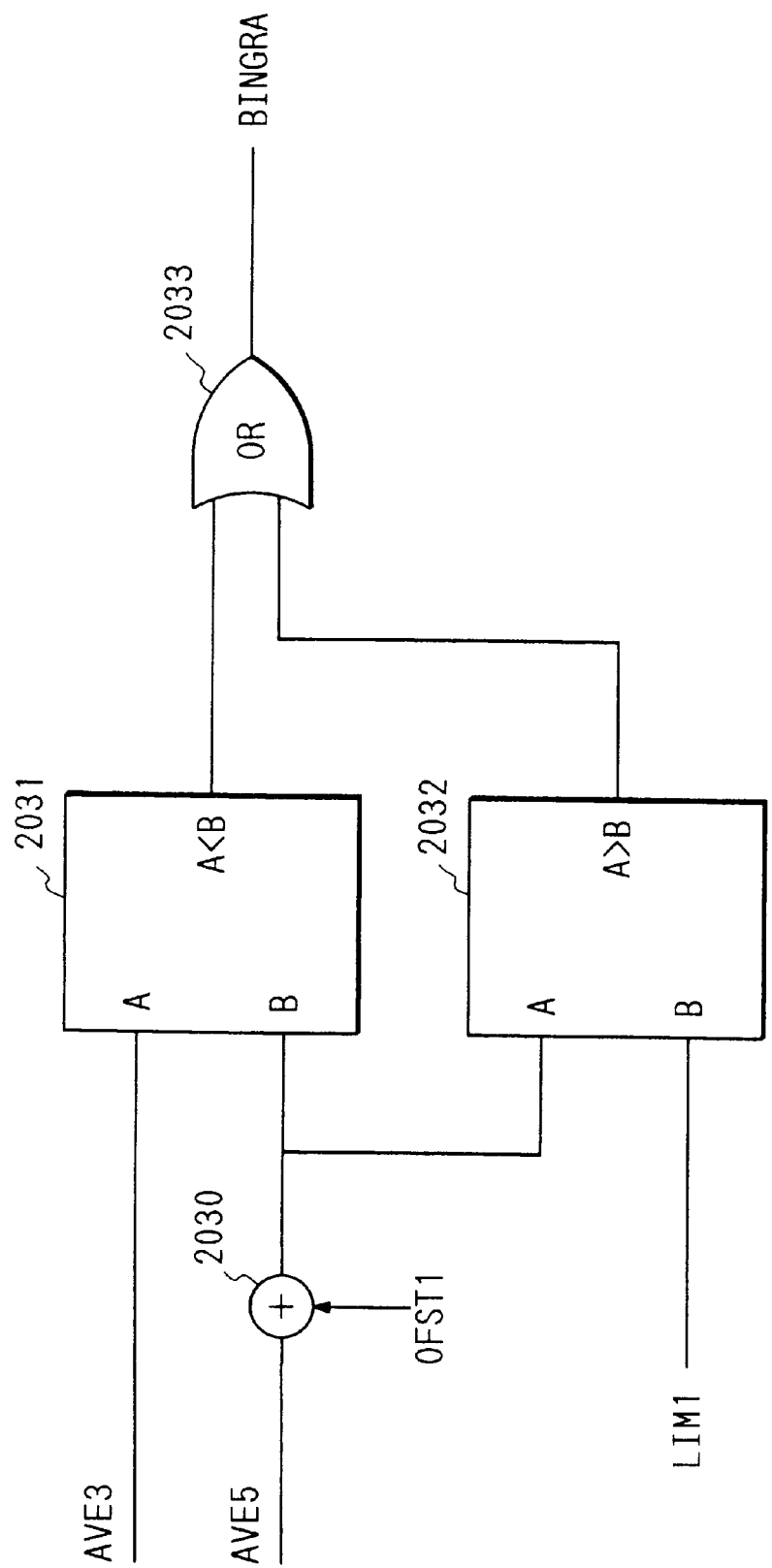
FIG. 15 is a block diagram showing the internal arrangement of a character/halftone area detection unit 2013.
Figure 16:
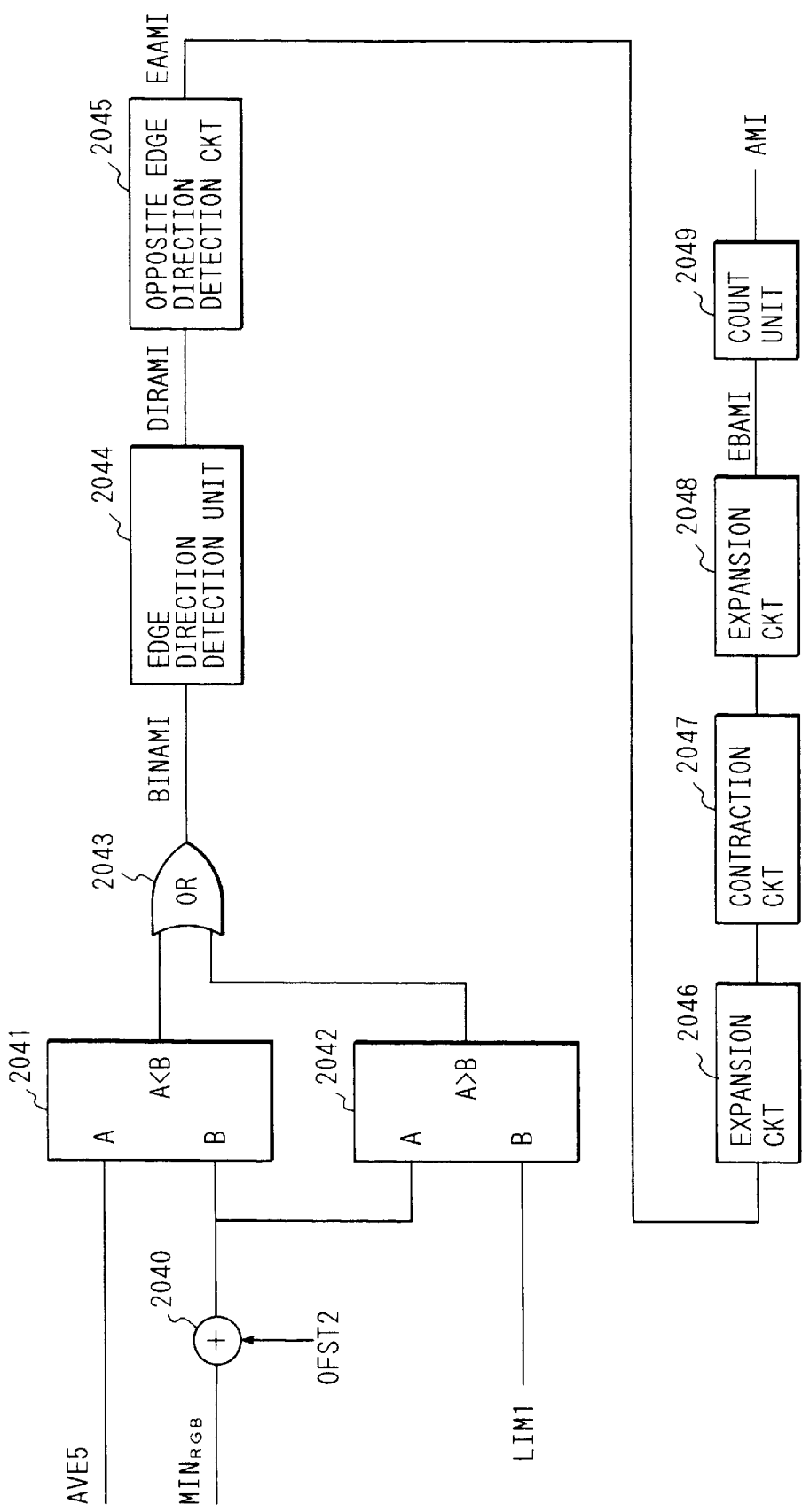
FIG. 16 is a block diagram showing the detailed arrangement of a screen area detection unit 2014.
Figure 19A:
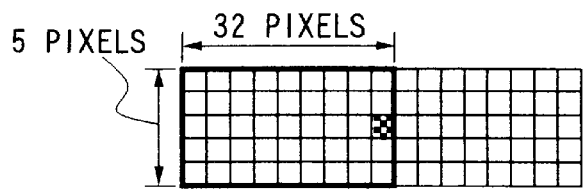
FIGS. 19A to 19I are views showing the shapes of a window in a count unit 2049.
Figure 19B:
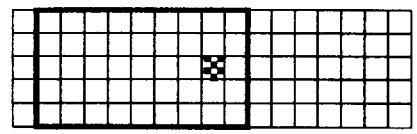
Figure 19C:
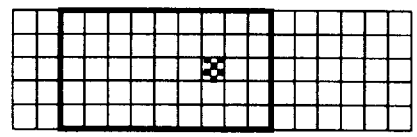
Figure 19D:
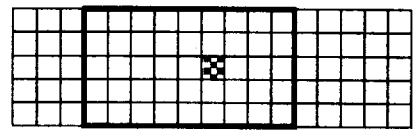
Figure 19E:
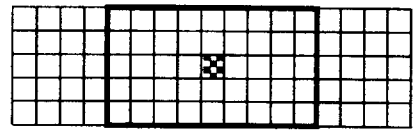
Figure 19F:
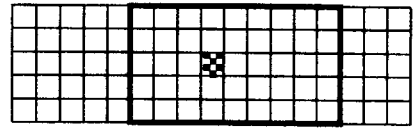
Figure 19G:
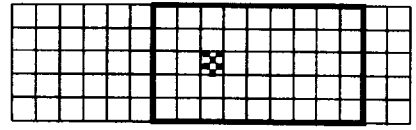
Figure 19H:
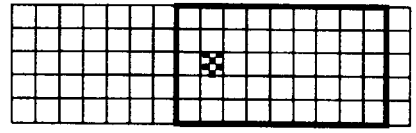
Figure 19I:
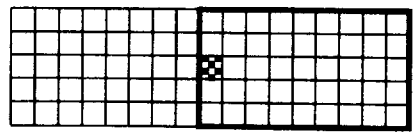

FIG. 15 is a block diagram showing the internal arrangement of the character/halftone area detection circuit 2013. As shown in FIG. 16, in the character/halftone area detection circuit, an adder 2030 adds an appropriate offset value OFST1, which is set by the CPU 102', to the value AVE5, and a comparator 2031 compares the sum with the value AVE3. A comparator 2032 compares the output from the adder 203 with an appropriate limit value LIM1. The output values from these comparators are input to an OR gate 2033.

An output signal BINGRA from the OR gate 2033 changes to logic "H" when one of relations below is satisfied:

$$AVE5 + OFST1 > AVE3 \quad (3)$$

or $$AVE5 + OFST1 > LIM1 \quad (4)$$

More specifically, when the character/halftone area detection circuit determines that a density change is present near the target pixel (a character edge portion) or that pixels near the target pixel have a density equal to or larger than a predetermined value and have no density change (inside a character and a halftone portion), the character/halftone area signal BINGRA changes to logic "H".

On the other hand, in a screen area detection unit 2014 whose detailed arrangement is shown in FIG. 16, in order to detect a screen area, an adder 2040 adds the value MINRGB detected by the minimum value detection circuit 2011 to an appropriate offset value OFST2, which is set by the CPU 102', and a comparator 2041 compares the sum with AVE3. A comparator 2042 compares the output from the adder 2040 with an appropriate limit value LIM2. The output values from these comparators are input to an OR gate 2043. An output signal BINAMI from the OR gate 2043 changes to logic "H" when one of relations below is satisfied:

$$MIN_{RGB} + OFST2 > AVE5 \quad (5)$$

or $$MIN_{RGB} + OFST2 > LIM2 \quad (6)$$

Using this signal BINAMI, an edge direction detection circuit 2044 detects the edge directions in units of pixels.

Note that the limit values LIM1 and LIM2 are calculated from the substrate level signals Rb, Gb, and Bb input from the UCR unit 1065, and are input via the CPU 102'.

Conversion formulas of these limit values are:

$$LIM1 = min(Rb, Gb, Bb) - 26$$

$$LIM2 = min(Rb, Gb, Bb) - 35$$

where min(Rb, Gb, Bb) yields the minimum value of Rb, Gb, and Bb.

Thus, optimal character judgment corresponding to the substrate level can be realized. More specifically, when the substrate level of an original is high (lighter), the values LIM are increased; when the substrate level is low (darker), the values LIM are decreased, thus achieving high-quality separation of a substrate and characters. OFST2 used for a host image is smaller than OFST2 used for a scanner image. Thus, a screen judgment signal AMI output from the screen area detection unit 2014 in correspondence-with a host image does not easily change to High level.

FIG. 17 shows the edge direction detection rules in the edge direction detection circuit 2044. More specifically, when eight pixels around the target pixel satisfy at least one of conditions (0) to (3) shown in FIGS. 17A to 17D, a corresponding one of bits 0 to 3 of an edge direction signal DIRAMI changes to logic "H". For example, when condition (0) in FIG. 17A and condition (2) shown in FIG. 17C are satisfied for a given target pixel, bits 0 and 2 of the edge direction signal DIRAMI of this target pixel are set to "1".

Furthermore, in an opposite direction (edge) detection circuit 2045 at the output side of the circuit 2044, opposing edges in a 5 (pixels)×5 (pixels) area including the target pixel are detected. The opposite edge detection rule in a coordinate system in which the DIRAMI signal value of the target pixel is set to be A33, as shown in FIG. 18, is as follows:

(1) bit 0 of at least one of A11, A21, A31, A41, A51, A22, A32, A42, and A33 is "H", and
   bit 1 of at least one of A33, A24, A34, A44, A15, A25, A35, A45, and A55 is "H";

(2) bit 1 of at least one of All, A21, A31, A41, A51, A22, A32, A42, and A33 is "H", and
   bit 0 of at least one of A33, A24, A34, A44, A15, A25, A35, A45, and A55 is "H";

(3) bit 2 of A11, A12, A13, A14, A15, A22, A23, A24, and A33 is "H", and
   bit 3 of at least one of A33, A42, A43, A44, A51, A52, A53, A54, and A55 is "H"; and (4) bit 3 of at least one of A11, A12, A13, A14, A15, A22, A23, A24, and A33 is "H", and bit 2 of at least one of A33, A42, A43, A44, A51, A52, A53, A54, and A55 is "H".

When at least one of conditions (1) to (4) above is satisfied, a signal EAAMI changes to "H" (when the opposite direction detection circuit 2045 detects opposing edges, the opposite edge signal EAAMI changes to "H").

An expansion circuit 2046 performs expansion to a 3 (pixels)×4 (pixels) area for a pixel with a signal EAAMI. If the 3 (pixels)×4 (pixels) area around the target pixel includes a pixel of EAAMI="H", the signal EAAMI of the target pixel is replaced by "H". Furthermore, using a contraction circuit 2047 and an expansion circuit 2048, any isolated detection result in a 5 (pixels)×5 (pixels) area is removed, thus obtaining an output signal EBAMI. Note that the contraction circuit 2047 outputs "H" only when all the input signals are "H".

A count unit 2049 counts the number of pixels corresponding to the output signals EBAMI ="H" from the expansion circuit 2048 within a window having an appropriate size. In this embodiment, a 5 (pixels)×64 (pixels) area including the target pixel is referred to. Note that FIGS. 19A to 19I show the patterns of the window.

Referring to FIGS. 19A to 19I, the number of sample points in the window is a total of 45, i.e., 9 points at 4-pixel intervals in the main-scan direction, and 5 lines in the sub-scan direction. Since the window moves relative to one target pixel in the main-scan direction, nine windows shown in FIGS. 19A to 19I are prepared. More specifically, the 5 (pixels)×64 (pixels) area including the target pixel as the center is consequently referred to. In these windows, the number of the signals EBAMI is counted, and when the number of EBAMI="H" exceeds an appropriate threshold value th_count, which is set by the CPU 102', the screen area detection unit 2014 shown in FIG. 14 outputs a screen area signal AMI of logic "H".

With this processing in the screen area detection unit 2014, a screen image, which is detected as a set of isolated points by the signal BINGRA, can be detected as an area signal. The detected character/halftone area signal BINGRA and screen area signal AMI are logically ORed by an OR gate 2015 in FIG. 14, thus generating a binary signal PICT of an input image. The signal PICT is input to an area size judgment circuit 2016, and the area size of the binary signal is judged. Note that the threshold value used for generating the binary signal PICT is set, so that the threshold value used for a host image is smaller than that used for a scanner image, since the host image has low possibility of substrate fogging.

A cluster of isolated points will be briefly described below.

The above-mentioned image area judgment is made based on a binary image obtained by binarizing an image by a certain density. At this time, dots or lines constituting a character or an area having an area are judged as a halftone area. However, when a screen image is simply binarized, a cluster of small points formed by dots as constituting elements of a screen area is generated.

Thus, by judging whether or not a cluster of isolated points is present in an area having a certain size, it can be judged whether or not dots define a screen image. More specifically, when a considerably large number of dots are present in a certain area, it is judged that the area corresponds to a screen image; when the target pixel is a portion of a dot but no dots are present around the target pixel, it is judged that the target pixel is a portion of a character.

FIG. 20 is a block diagram showing the internal arrangement of the area size judgment unit 2016. The circuit shown in FIG. 20 includes a plurality of pairs of contraction circuits 2081 and expansion circuits 2082, and these pairs have different area sizes to be referred to. The input signal PICT is line-delayed in correspondence with the sizes of the contraction circuits, and the delayed signals are input to the contraction circuits 2081. In this embodiment, seven different contraction circuits having sizes from 23 pixels×23 pixels to 35 pixels×35 pixels are prepared. Note that the area size can be appropriately changed via the CPU 102'.

The signals output from these contraction circuits 2081 are line-delayed, and are then input to the expansion circuits 2082. In this embodiment, seven different expansion circuits having sizes from 27 pixels×27 pixels to 39 pixels×39 pixels are prepared in correspondence with the outputs from the contraction circuits, and output signals PICT FH are obtained from these expansion circuits. Note that the area size can also be changed via the CPU 102'.

Figures 22, 23:
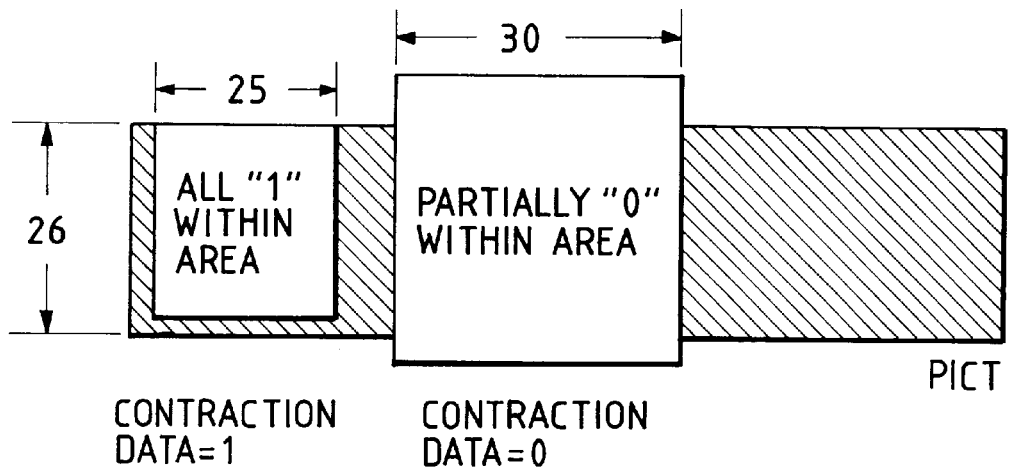
FIG. 22 is a view showing the state of determining an output PICT_FH in accordance with the thickness of a character.
FIG. 23 is a view showing the encode rule of an encoder 2083.

As for the output signals PICT_FH, when the target pixel is a portion of a character, the outputs PICT_FH are determined depending on the thickness of the character. FIG. 22 shows this state. For example, when signals PICT are present in a stripe pattern having a width of 26 pixels, if these signals are contracted to a size larger than 27×27, all the outputs become "0"; if these signals are expanded in correspondence with the size after they are contracted to a size smaller than 25×25, output signals PICT_FH in a stripe pattern having a width of 30 pixels are obtained.

By inputting these outputs PICT to an encoder 2083, an image area signal ZONE_P to which the target pixel belongs is obtained. Note that FIG. 23 shows the encode rule of the encoder 2083.

With this processing, a photograph image or a screen image in which signals PICT_FH are "H" over a wide area is defined as area 7 (maximum value), and a character or a line image whose area size is smaller (thinner) than the maximum value is defined as a multi-value image area corresponding to its size (thickness). In this embodiment, the signal ZONE consists of 3 bits to express the thickness of a character in eight steps. The thinnest character is expressed by 0, and the fattest character (including an area other than a character) is expressed by 7.

Figure 21:
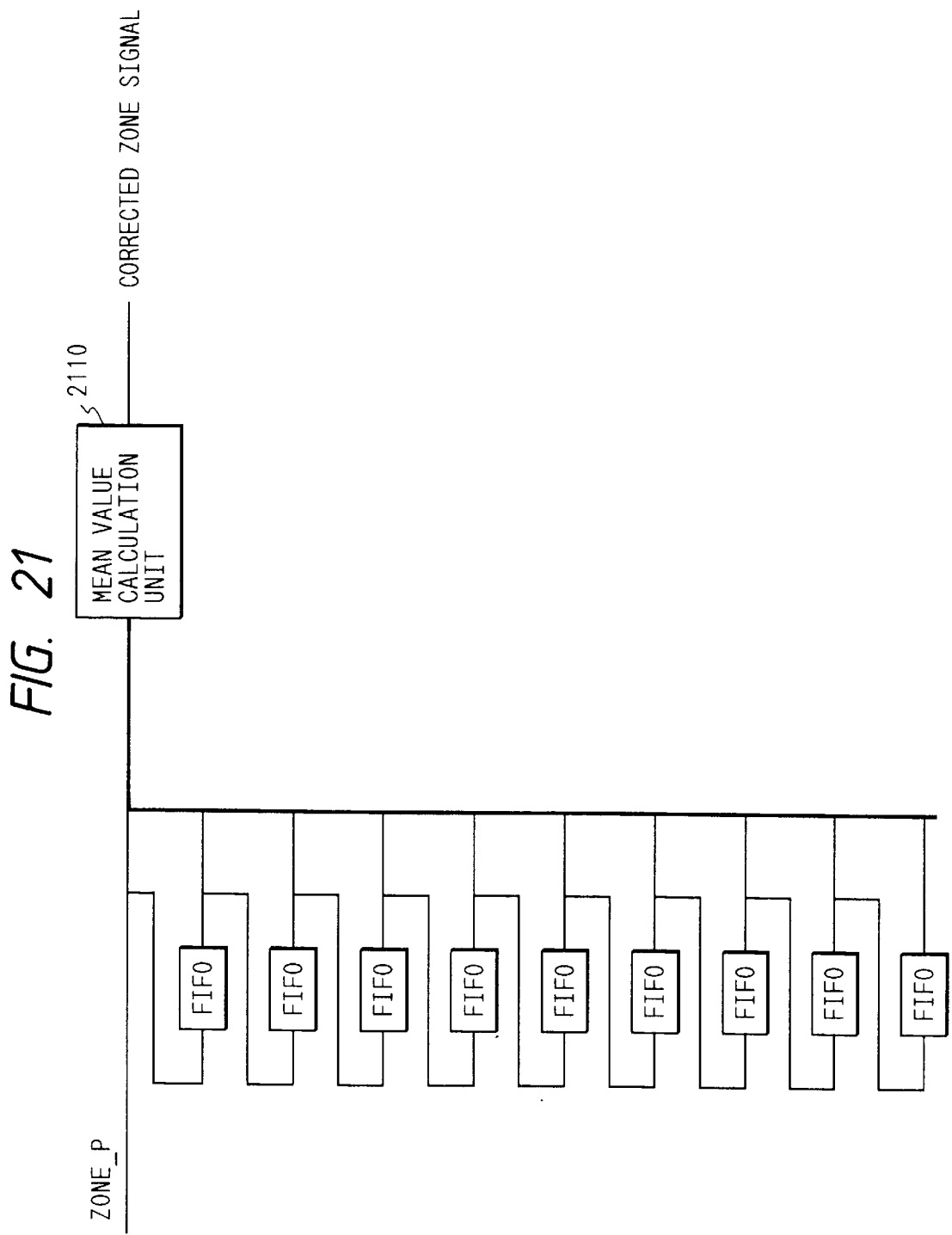
FIG. 21 is a block diagram showing the arrangement of a ZONE correction unit 2084.

A ZONE correction unit 2084 shown in FIG. 20 has a mean value calculation unit 2110 which receives signals ZONE_P line-delayed by a plurality of FIFOs, as shown in FIG. 21, and calculates a mean value of 10 pixels×10 pixels there. Since the signal ZONE_P assumes a larger signal value as the character is fatter and a smaller signal value as the character is thinner, the output from the mean value calculation unit can directly serve as a corrected ZONE signal.

Note that the block size used for correction is preferably determined in correspondence with the block size used for judging the thickness of a character. By executing the subsequent processing using the corrected ZONE signal, even in a portion where the thickness of a character/line abruptly changes, the judgment results of the thickness smoothly change, and deterioration of image quality due to a change in black character processing can be eliminated.

As described above, an area corresponding to the signal ZONE=step 7 can be considered as a halftone area. By utilizing this fact, characters/lines present in a screen or halftone area can be discriminated from those in other areas on the basis of the signal ZONE and the edge signals. This method will be described below.

FIG. 24 is a diagram showing the algorithm for character detection in a screen/halftone area. Expansion processing using a 5×5 block is performed for the above-mentioned PICT signals by a portion 2111. With this processing, the detection area of a screen area which tends to be incompletely detected is corrected.

Then, contraction processing using a 11×11 block is performed for the output signals from the portion 2111 by a portion 2112. FCH signals obtained as a result of these processing operations correspond to those obtained by contracting the PICT signals by three pixels.

FIG. 25 shows in detail the processing state of the above-mentioned algorithm. In FIG. 25, an original image 2301 is binarized to obtain PICT signals 2302. The PICT signals 2302 are subjected to 5×5 expansion to obtain signals 2303, which are subjected to 11×11 contraction to obtain FCH signals 2304. The area size judgment unit 2016 generates ZONE signals 2305 based on the PICT signals 2302. When pixels have FCH signals 2304="1" (halftone character portion), ZONE signals 2305="7" (screen/halftone area), and edge signals 2306 (extracted by the edge detection unit 115)="1", it is determined that these pixels constitute a character/line portion in a screen/halftone area, thus obtaining an image 2308. Therefore, in this embodiment, by combining the FCH, ZONE, and edge signals, an edge portion in a white substrate and an edge portion in a screen/halftone area can be discriminated from each other, and black character processing can be performed without emphasizing screen components in a screen image or without processing a portions, which does not require black character processing, such as the edge of a picture.

(Description of LUT)

The LUT 117 constituting the black character judgment unit 113 shown in FIG. 6B will be described below.

The LUT 117 receives the signals judged by the character-thickness judgment unit 114, the edge detection unit 115, and the saturation judgment unit 116 in FIGS. 6A and 6B, and outputs signals "ucr", "filter", and "sen" for processing in accordance with the table shown in FIGS. 26A and 26B. These signals are control signals for controlling the parameters of the masking UCR coefficients, spatial filter coefficients, and the printer resolution.

In the table shown in FIGS. 26A and 26B, the respective signals and the meanings of their values are:

edge-0: not judged as edge by threshold value th_edge
  1: no expansion judged by threshold value th_edge
  2: 3×3 expansion judged by threshold value th_edge
  3: 5×5 expansion judged by threshold value th_edge
  4: 7×7 expansion judged by threshold value th_edge
  5: not judged as edge by threshold value th_edge2
  6: no expansion judged by threshold value th_edge2 sen-0: 200 lines, 1: 400 lines filter-0: smoothing, 1: strong edge emphasis, 2: medium edge emphasis, 3: weak edge emphasis ucr-0 to 7: large black amount to small black amount FCH-0: edge of image, 1: not edge of image The features of the table shown in FIGS. 26A and 26B are as follows:

(1) Multi-value black character processing can be attained in correspondence with the thickness of a character.

(2) Since a plurality of ranges of edge areas are prepared, a black character processing area can be selected in correspondence with the thickness of a character. In this embodiment, the broadest area is processed for the thinnest character.

(3) Black character processing is performed with different degrees of processing for the edge of a character and the inner portion of the character, thereby realizing a smooth change in black amount.

(4) Processing for a character in a screen/halftone area is discriminated from that for a character in a white substrate.

(5) Different coefficients of the spatial filter are used in correspondence with the edge of a character, the inner portion of the character, and a screen/halftone image. For the character edge, coefficients are also changed in correspondence with the thickness.

(6) The resolution of the printer is changed in correspondence with the thickness of a character.

(7) Processing for a color character is substantially the same as that for a black character, except for the masking UCR coefficients.

Needless to say, the present invention is not limited to the processing in this embodiment, and various processing methods based on various combinations of processing operations may be used for an input signal.

On the other hand, the masking/UCR circuit 109 performs generation of a black signal Bk and output masking on the basis of the UCR control signal ucr output from the LUT 117.

FIG. 28 shows the masking/UCR formulas.

A minimum value $MIN_{CMY}$ of the signals C1, M1, and Y1 is obtained, and Bk1 is calculated using formula (2101). Then, 4×8 masking is performed using formula (2102) to output signals C2, M2, Y2, and Bk2. In formula (2102), coefficients m11 to m84 are masking coefficients determined by the printer used, and coefficients k11 to k84 are UCR coefficients determined by the UCR signal.

For a screen/halftone image (ZONE signal=7), all the UCR coefficients are 1.0. However, for the thinnest character (ZONE signal=0), the UCR coefficients are set to output Bk color alone. On the other hand, for a character having a medium thickness, the UCR coefficients are determined, so that the color tone smoothly changes in correspondence with the thickness, thereby controlling the Bk amount.

In the spatial filter processing unit 111, two 5 (pixels)×5 (pixels) filters are prepared, and the output signal from the first filter is connected to the input of the second filter. As the filter coefficients, four coefficients, i.e., smoothing 1, smoothing 2, edge emphasis 1, and edge emphasis 2 coefficients, are prepared, and these coefficients are switched in units of pixels in accordance with the signal filter from the LUT 117. Since the two filters are used, edge emphasis can be performed after smoothing to realize edge emphasis which can eliminate moire. Also, by combining two different edge emphasis coefficients, an image with higher quality can be output.

When a character in an original is to be preferentially processed, the character/photograph separation level shown in FIG. 29 is adjusted to the character priority side; when a photograph in an original is to be preferentially processed, the character/photograph separation level is adjusted to the photograph priority side, thus presenting an output according to a user's favor. In this embodiment, the character/photograph separation level can be adjusted in four steps in each of the two directions.

The contents of the processing parameters which change upon adjustment of the character/photograph separation level will be explained below.

Upon adjustment of the character/photograph separation level, judgement parameters for a character/photograph area and parameters for adjusting the degree of character processing are simultaneously adjusted.

FIG. 30 shows the judgment parameters to be adjusted for a character/photograph area. The parameters to be adjusted are a threshold value th_edge for detecting an edge in a white substrate, a threshold value th_edge2 for detecting an edge in a screen area, threshold values Cr_Bk, Cr_COL, and Cr_W for judging saturation, threshold values LIM1 and OFST1 for generating a character/halftone area signal BINGRA, threshold values LIM2 and th_count for screen area judgment, and the window size of the contraction circuit for thickness judgment.

By changing the threshold values for edge detection, light characters and fine characters can be detected. In the character priority mode, the threshold values are lowered to allow easy detection of light characters and fine characters. On the other hand, in the photograph priority mode, the threshold values are increased to make character detection difficult. In this embodiment, since the threshold value for detecting an edge in a white substrate and the threshold value for detecting an edge in a screen area can be independently set, the edge detection precision in a screen area may be changed while the edge detection precision in a white substrate is left unchanged, or vice versa. In this embodiment, when a large photograph priority step is selected, character processing in a screen area is inhibited.

By changing LIM1, OFST1, LIM2, and th_count, character detection can be attained in correspondence with the substrate density of an original. In the character priority mode, character detection is performed while an original with a high substrate density is considered as a white substrate original; in the photograph priority mode, character processing is performed while an original with a high substrate density is considered as a halftone image.

By changing the threshold value for saturation judgment, conditions for performing processing for outputting an image using black toner alone can be changed. In the character priority mode, even a character written by a pencil or a blurred character tends to be processed in black color alone. In the photograph priority mode, a character or line with a low saturation is not easily subjected to processing using black color alone.

By changing the window size of the contraction circuit for thickness judgment, the width of a line to be subjected to black character processing can be changed. In the character priority mode, the window size of the contraction circuit for thickness judgment is increased to easily apply the black character processing to a line with a large width and a fat character. In the photograph priority mode, the window size of the contraction circuit for thickness judgment is decreased so as not to easily apply the black character processing to a line with a large width and a fat character.

FIGS. 31A to 38B show the contents of the LUT corresponding to the degrees of character processing adjusted by adjusting the character/photograph separation level using the console unit 1011 shown in FIG. 29.

When the character priority mode is set, the processing area of an edge portion is broadened, and UCR control is performed for the inner portion of a character. For this reason, a black character can be reproduced more smoothly. In addition, control for outputting a character in a screen area more clearly is enhanced.

When the photograph priority mode is set, the processing area for an edge is narrowed, and the line width to be processed is decreased. When the priority level increases, character processing in a screen area is inhibited, thus maintaining the quality of a photograph prior to characters.

As described above, according to this embodiment, when the thickness of a character/line image portion in an image is judged, and image processing is performed by combining edge information and saturation information of a character/line image, since the judgment parameters for black character processing and the degree of processing can be simultaneously changed by adjusting the character/photograph separation level, the thickness of a character to be processed or the degree of processing changes, and an image can be reproduced according to a user's favor.

As images supplied from the host, not only an image read by a scanner, but also various other images such as rendered computer graphics image, a post-script file drawn by a drawing program, and the like are assumed. In order to apply high-quality black character processing to these images, image processing coefficients suitable for these images must be set.

In order to achieve this, the coefficients of black character processing are controlled by simultaneously designating the feature of an image from the host in addition to the character/photograph priority level. The features of images and the coefficients of black character processing to be operated will be exemplified below.

1. Scanner Image

Since a scanner image is assumed to have a feature similar to that of an image read by the image scanner of the main body, the coefficients of black character processing are not changed.

2. CG Image

An image created on a computer has features such as no mixed noise, sharp character edge, and the like. For this reason, of the coefficients of black character processing, the coefficients below are changed:

the saturation judgment parameters Cr_Bk, Cr_COL, and Cr_W shown in FIGS. 13A and 13B, the edge detection parameter th_edge of the edge detection unit 253 shown in FIG. 8, the offset OFST1 for binarizing a character shown in FIG. 15, and the screen judgment threshold value th_count.

For example, since the CG image does not have a large number of colors unlike in a scanner image, the GRY area in FIGS. 13A and 13B can be reduced, and the difference between the values Cr_Bk and Cr_COL can be decreased. In addition, since the CG image is free from color misregistration, the value Cr_W can be increased. Also, since the CG image allows relatively easy edge detection due to good MTF as compared to a scanner image, the value th_edge can be increased. Furthermore, since the possibility of a screen image is low, the value th_count can be decreased.

Of course, other image types may be set in addition to the above-mentioned images. The coefficients to be changed for each image are not limited to those described above. The above-mentioned parameters can be set by the host or the controller 227.

Also, for an image supplied from the host 228, setting data equivalent to input commands may be manually input from the console unit 101' of the main body.

As described above, in addition to the setting operation of parameters for detecting a line image of a specific color (e.g., black), the processing conditions for the detected line image of the specific color may be set by the host 228.

More specifically, for example, the host 228 may be allowed to set at least one of the output signals ucr, filter, and sen shown in FIGS. 26A and 26B to have different values for a scanner image and a host image in correspondence with identical input signals col, zone, edge, and FCH. Thus, the host 228 can also set the processing conditions corresponding to line image detection.

An image supplied from the host is assumed to be a full-color image +font characters. In this case, an area where font characters are present is one to be subjected to black character processing. In addition, the font characters have features in that they have sharper edges than those of character data read by the scanner, and their color information does not depend on the characteristics of the scanner.

When black character processing is applied to an image supplied from the host, image processing coefficients different from those for an image read by the scanner are automatically selected from a plurality of types of image processing coefficients, which are prepared in advance. Thus, image processing operations suitable for images from the scanner unit 201 and the host 228 can be performed without requiring the coefficient setting operation by the host 228 in each processing.

Furthermore, when the host 228 or the console unit 101' of the main body designates the degree of black character processing to be applied to an image supplied from the host 228, image processing coefficients (character/photograph area judgment parameters) are selected in correspondence with the designated degree of black character processing. FIG. 45 shows a list of image processing coefficients to be selected. Note that the.types of judgment parameters selected in FIG. 45 are the same as those in FIG. 30 above. The Adetermined image processing parameters are input to the respective image processing units via the CPU 102'.

Furthermore, the contents of the LUT 117 for controlling the masking UCR coefficients, spatial filter coefficients, and printer resolution on the basis of the degree of black character processing designated for an image supplied from the host 228 are determined. FIGS. 46A to 50B show the contents of the LUT for an image from the host 228.

With the above-mentioned control, even when an image supplied from the host 228 is assumed to be various kinds of images such as an image read using a scanner, a computer graphics image created on a computer, and the like, optimal black character processing can be applied to such images.

Of course, other image types may be set in addition to the above-mentioned images. The coefficients to be changed for each image are not limited to those described above. The above-mentioned parameters can be set by the host 228 or the controller 227.

Also, for an image supplied from the host 228, setting data equivalent to input commands may be manually input from the console unit 101' of the main body.

As described above, in addition to the setting operation of parameters for detecting a line image of a specific color (e.g., black), the processing conditions for the detected line image of the specific color may be set by the host 228. More specifically, the above-mentioned processing can be realized when the CPU 1021 fetches parameters or processing conditions generated by the controller 227 on the basis of an instruction from the host 228 or the judgment results in the controller 227 via the transmission line 232. At this time, for a host image, different parameters or processing conditions can be set in units of areas in correspondence with whether its source is an image scanner or computer graphics. Thus, the processing at the copying machine side can be attained in correspondence with the resolutions and color characteristics in units of sources.

More specifically, for example, the host 228 may be allowed to set at least one of the output signals ucr, filter, and sen shown in FIGS. 26A and 26B to have different values for a scanner image and a host image in correspondence with identical input signals col, zone, edge, and FCH. Thus, the host 228 can also set the processing conditions corresponding to line image detection.

Furthermore, when image synthesis is to be performed to mix a scanner image and an image from the host 228 in one frame, the above-mentioned black character detection parameters or processing conditions may be switched in units areas within one frame.

Figures 51, 51A:
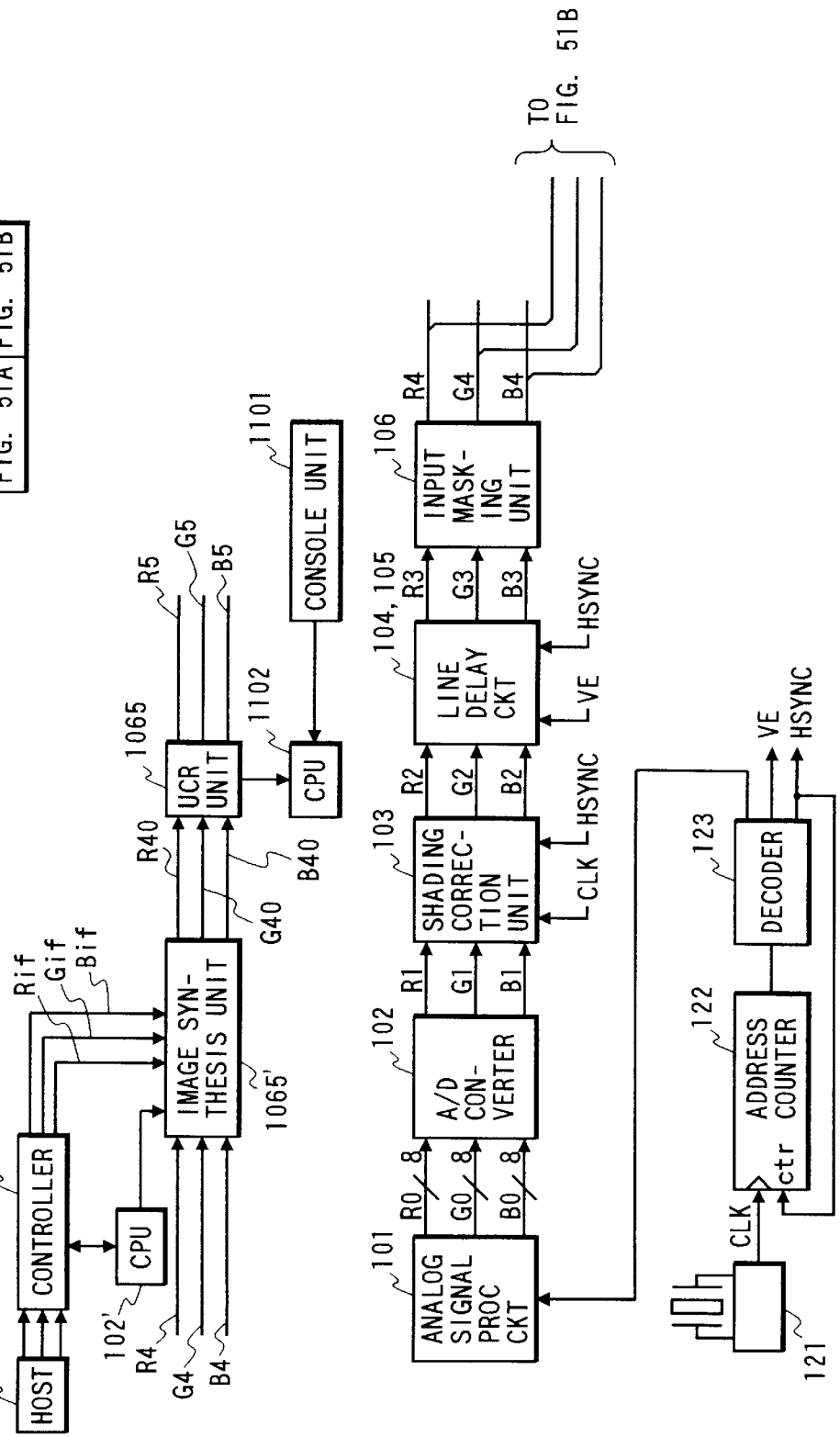
FIG. 51 is comprised of FIGS. 51A and 51B showing block diagrams of a modification of the first embodiment.
Figure 51B:
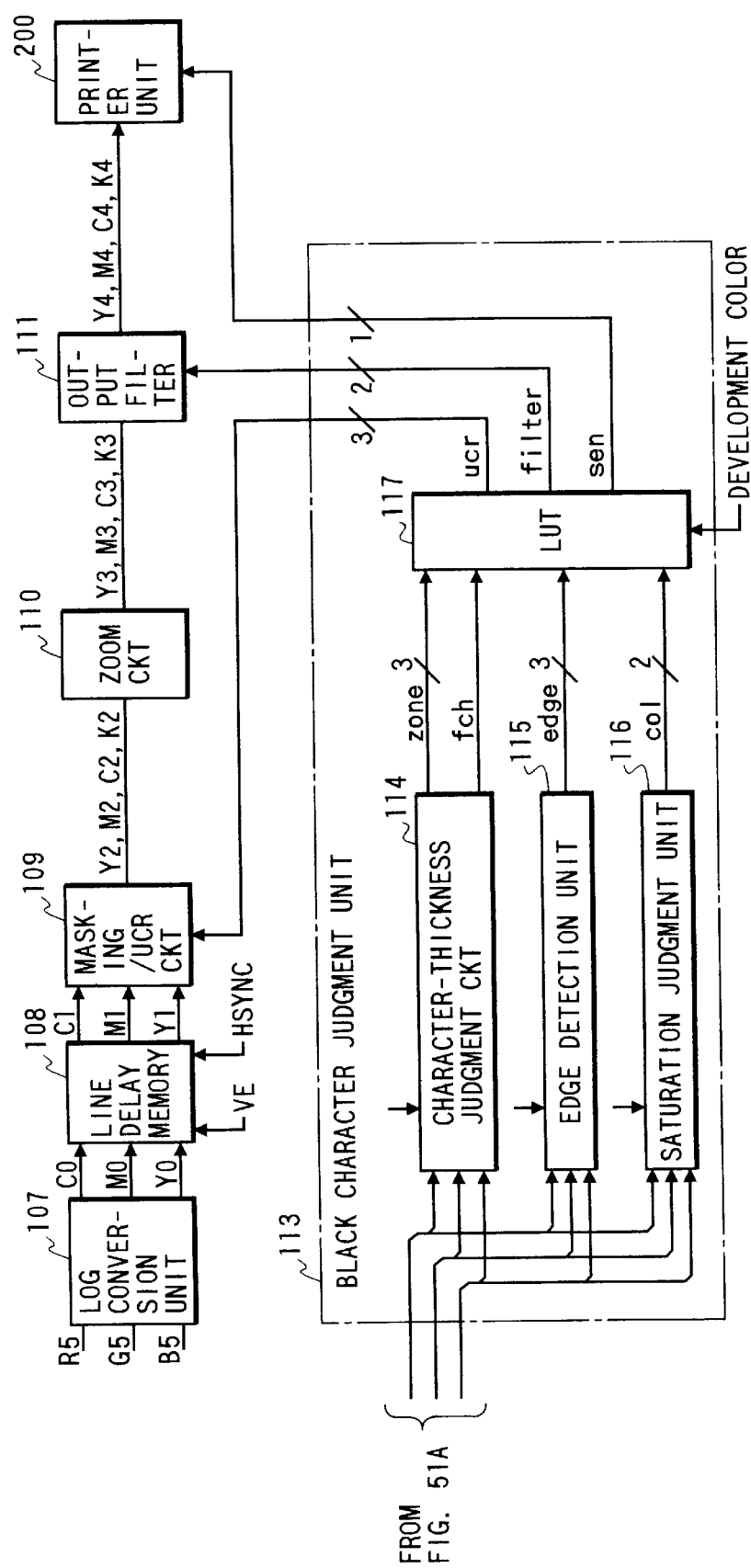

In place of the image signal switching unit 1064 in FIG. 4, an image synthesis unit 1065' shown in FIG. 51A may be arranged.

The image synthesis unit 1065' arithmetically adds the signals R4, G4, and B4 supplied from the image scanner unit and the image signals Rif, Gif, and Bif supplied from the host 228 via the controller 227 on the basis of a control signal supplied from the host 228. The arithmetic formulas are:

$R40 = R4 \times COMPR + Rif \times (1-COMPR)$ $G40 = G4 \times COMPG + Gif \times (1-COMPG)$ $B40 = B4 \times COMPB + Bif \times (1-COMPB)$ where COMPR, COMPG, and COMPB are designated by the host 228 or the console unit 101' of the main body. When all COMPR, COMPG, and COMPB are "1", a scanner image is output; when all COMPR, COMPG, and COMPB are "0", an image from the host 228 is output. When COMPR, COMPG, and COMPB are set to be values between "0" and "1", a scanner image and an image from the host are synthesized and output.

Which one of a scanner image and a host image is to be processed prior to the other is set in advance by the host 228, and an input operation permitting overlap of input areas may be attained. In this case, the CPU 102' judges a priority image, so that the black character judging standard for an image to be overwritten can be used for the overlapping area, and judging standards are set in units of areas.

Second Embodiment

In this embodiment, the control parameters based on black character judgment of the above-mentioned LUT 117 can be changed in units of areas in addition to the arrangement of the first embodiment.

As shown in FIGS. 40A and 40B, in this embodiment, a digitizer 100 is arranged, and the mode setting operation shown in FIG. 39 in the first embodiment can be performed in units of areas designated by the digitizer 100.

For example, time-divisional processing may be performed in such a manner that the black character processing described in the above-mentioned first embodiment is performed for pixels corresponding to area data "0" input from the digitizer 100, and fixed values ucr7, filter 0, and sen0 are used for pixels corresponding to area data "1" input from the digitizer 100, thereby inhibiting normal black character processing for some areas.

For pixels corresponding to area data "1", ZONE signals "0" and "7" may be used. More specifically, the ZONE signal "0" represents the thinnest character, and the ZONE signal "7" represents a screen/halftone image. Such binary processing may be performed for these pixels.

Area data need not always be designated by the digitizer 100. For example, when an interface with an external apparatus is arranged so that image data from an external apparatus such as an external storage apparatus can be input, area data supplied from the external apparatus may be used.

In the above embodiment, as shown in FIGS. 6A and 6B, R, G, and B signals are used as input signals to the black character judgment unit 113. However, the present invention is not limited to these signals. For example, C, M, and Y signals as the outputs from the LOG conversion unit 107 may be used.

In the above embodiment, R, G, and B signals are input to the character-thickness judgment circuit 114 constituting the black character judgment unit 113. However, the present invention is not limited to these signals. For example, as shown in FIG. 27, an L signal may be obtained via an Lab conversion unit 2010, and the subsequent processing may be performed using this signal. The same reference numerals in FIG. 27 denote the same parts constituting the character-thickness judgment circuit shown in FIG. 14.

In the above embodiment, a black character is exemplified as the feature of an image. As the feature, other features such as a chromatic color character, a halftone image in a specific color, and the like may be detected.

The printer unit is not limited to the above-mentioned electrophotographic printer. For example, a thermal transfer printer, an ink-jet printer, or the like may be used.

In particular, a so-called bubble-jet printer which ejects ink droplets by utilizing film boiling caused by heat energy may be used.

The present invention may be applied to either a system constituted by a plurality of apparatuses such as a scanner, a printer, and the like, or an apparatus consisting of a single device such as a copying machine. The present invention can also be applied to a case wherein the invention is attained by supplying a program stored in a storage medium such as a floppy disk to the system or the apparatus.

As described above, since the parameters of the respective judgment means for black character processing are set to be optimal values in correspondence with the substrate density of an original image, high-quality black character processing can be provided independently of the substrate density.

The host computer can satisfactorily control line image processing and UCR processing of the image forming apparatus.

The present invention is not limited to the above-mentioned embodiments, and various changes and modifications may be made within the scope of claims.

What is claimed is:

1. An image processing apparatus comprising:
   first input means for inputting a first set of plural color component signals from a sensor;
   second input means for inputting a second set of plural color component signals including a computer graphics image from an external apparatus;
   edge detection means for detecting an edge of an image represented by the first or second set of plural color component signals to detect a line image portion having a specific color; and
   setting means for setting a threshold value to be used by said edge detection means,
   wherein the threshold value for an image represented by the second set of plural color component signals is input from the external apparatus, and wherein said setting means sets a threshold value for an image represented by the first set of plural color component signals smaller than the threshold value for an image represented by the second set of plural color component signals.

2. An image processing apparatus according to claim 1, further comprising processing means for processing the first or second set of plural color component signals in accordance with the detection result of said edge detection means.

3. An image processing apparatus according to claim 2, wherein said processing means processes the first or second set of plural color component signals, such that the line image portion having a specific color is reproduced with high resolution.

4. An image processing apparatus according to claim 2, wherein said processing means performs at least one of spatial filter processing, under color removal processing, and halftone processing.

5. An image processing apparatus according to claim 1, further comprising extracting means for extracting a black component from the first or second set of plural color component signals.

6. An image processing apparatus according to claim 1, further comprising saturation judging means for judging a saturation from the first or second set of plural color component signals.

7. An image processing apparatus according to claim 1, further comprising thickness judging means for judging a thickness of a line image from the first or second set of plural color component signals.

8. An image processing apparatus according to claim 1, wherein the first set of plural color component signals are input from an image scanning device, and the second set of plural color component signals are input from a host computer.

9. An image processing apparatus according to claim 1, wherein the first and second sets of plural color component signals are mixed in one frame.

10. An image processing apparatus according to claim 1, wherein said setting means can be controlled by an external device.

11. An image processing apparatus according to claim 1, further comprising circuit means arranged common to both of the first and second sets of plural color component signals.

12. An image processing method comprising:
    a first input step for inputting a first set of plural color component signals from a sensor;
    a second input step for inputting a second set of plural color component signals including a computer graphics image from an external apparatus;
    an edge detection step for detecting an edge of an image represented by the first or second set of plural color component signals to detect a line image portion having a specific color; and
    a setting step for setting a threshold value to be used in said edge detection step,
    wherein the threshold value for an image represented by the second set of plural color component signals is inputted from-the external apparatus, and wherein said setting step sets a threshold value for an image represented by the first set of plural color component signals smaller than the threshold value for an image represented by the second set of plural color component signals.

13. An image processing apparatus comprising:
    receiving means for receiving a computer graphics image and a scanner image as data from a host computer;
    edge detection means for detecting an edge of an image represented by the received data; and
    setting means for setting a threshold value to be used by said edge detection means,
    wherein the threshold value for the computer graphics image is received from the host computer, and wherein said setting means sets a threshold value for the scanner image smaller than the threshold value for the computer graphics image.

14. An image processing apparatus according to claim 13, further comprising process means for receiving information relating to an under color removal for the received data and processing the received data by using the information relating to the under color removal.

15. An image processing apparatus according to claim 14, wherein the information relating to the under color removal is information to release the process by said process means.

16. An image processing apparatus according to claim 13, wherein the under color removal for the received data is controlled according to a judgment result of whether the received data is a document or pictorial.

17. An image processing apparatus according to claim 13, wherein the computer graphics image has no noise and edge of character of the computer graphics image is steep.

18. An image processing method comprising the steps of:
    receiving a computer graphics image and a scanner image as data from a host computer;
    detecting an edge of an image represented by the received data; and
    setting a threshold value to be used in said edge detecting step,
    wherein the threshold value for the computer graphics image is received from the host computer, and wherein a threshold value for the scanner image set in said setting step is smaller than the threshold value for the computer graphics image.

* * * * *

UNITED STATES PATENT AND TRADEMARK OFFICE
CERTIFICATE OF CORRECTION

PATENT NO. : 6,795,576 B2
DATED : September 21, 2004
INVENTOR(S) : Yoshiki Uchida et al.

It is certified that error appears in the above-identified patent and that said Letters Patent is hereby corrected as shown below:

Title page,
Item [56], References Cited, FOREIGN PATENT DOCUMENTS, "7203198" should read -- 7-203198 --.

Column 3,
Line 45, "LUT-repre-" should read -- LUT repre- --.

Column 9,
Line 15, "tit" should be deleted.

Column 10,
Line 34, "CO," should read -- C0, --.
Line 35, "MO, and YO." should read -- M0, and Y0. --.
Line 36, "CO, MO, and YO" should read -- C0, M0, and Y0 --.
Line 52, "of number" should be deleted.

Column 13,
Line 44, "MINRGB" should read -- $MIN_{RGB}$ --.

Column 14,
Line 11, "correspondence-with" should read -- correspondence with --.

Column 20,
Line 62, "the.types" should read -- the types --.
Line 64, "Adetermined" should read -- determined --.

UNITED STATES PATENT AND TRADEMARK OFFICE
CERTIFICATE OF CORRECTION

PATENT NO. : 6,795,576 B2
DATED : September 21, 2004
INVENTOR(S) : Yoshiki Uchida et al.

It is certified that error appears in the above-identified patent and that said Letters Patent is hereby corrected as shown below:

Column 24,
Line 21, "from-the" should read -- from the --.

Signed and Sealed this

Third Day of May, 2005

JON W. DUDAS
*Director of the United States Patent and Trademark Office*